United States Patent
Huang et al.

(10) Patent No.: US 12,229,898 B2
(45) Date of Patent: Feb. 18, 2025

(54) METHODS, SYSTEMS, AND COMPUTER PROGRAM PRODUCT FOR MANAGING AND DISPLAYING WEBPAGES IN A VIRTUAL THREE-DIMENSIONAL SPACE WITH A MIXED REALITY SYSTEM

(71) Applicant: MAGIC LEAP, INC., Plantation, FL (US)

(72) Inventors: Yi Huang, Plantation, FL (US); Genevieve Mak, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 33 days.

(21) Appl. No.: 17/804,394

(22) Filed: May 27, 2022

(65) Prior Publication Data
US 2022/0292788 A1 Sep. 15, 2022

Related U.S. Application Data

(63) Continuation of application No. 16/839,727, filed on Apr. 3, 2020, now Pat. No. 11,386,623.
(Continued)

(51) Int. Cl.
G06T 19/00 (2011.01)
G06F 3/14 (2006.01)
G06T 19/20 (2011.01)

(52) U.S. Cl.
CPC .......... *G06T 19/006* (2013.01); *G06F 3/1454* (2013.01); *G06T 19/20* (2013.01); *G06T 2219/2016* (2013.01)

(58) Field of Classification Search
CPC ........... G06F 3/011–015; G06F 3/1454; G06F 16/95–986; G06T 19/006; G06T 19/20; G06T 2219/2016
See application file for complete search history.

(56) References Cited

U.S. PATENT DOCUMENTS 5,923,318 A 7/1999 Zhai et al.
6,629,065 B1 * 9/2003 Gadh ...................... G06T 19/20
703/1
(Continued)

FOREIGN PATENT DOCUMENTS

AU 2018261328 B2 8/2022
AU 2022271460 B2 12/2022
(Continued)

OTHER PUBLICATIONS

Schmalstieg, Dieter, et al. "The studierstube augmented reality project." Presence: Teleoperators & Virtual Environments 11.1 (2002): 33-54. (Year: 2002).*
(Continued)

*Primary Examiner* — Diane M Wills
(74) *Attorney, Agent, or Firm* — Vista IP Law Group, LLP

(57) ABSTRACT

Disclosed are methods, systems, and articles of manufacture for managing and displaying web pages and web resources in a virtual three-dimensional (3D) space with an extended reality system. These techniques receive an input for 3D transform for a web page or a web page panel therefor. In response to the input, a browser engine coupled to a processor of an extended reality system determines 3D transform data for the web page or the web page panel based at least in part upon the 3D transform of the web page or the web page panel, wherein the 3D transform comprises a change in 3D position, rotation, or scale of the web page or the web page panel therefor in a virtual 3D space. A universe browser engine may present contents of the web page in a virtual 3D space based at least in part upon the 3D transform data.

20 Claims, 43 Drawing Sheets

Related U.S. Application Data

(60) Provisional application No. 62/976,254, filed on Feb. 13, 2020, provisional application No. 62/828,917, filed on Apr. 3, 2019.

(56) References Cited

U.S. PATENT DOCUMENTS

| | | |
|---|---|---|
| 6,720,949 B1 | 4/2004 | Pryor et al. |
| 8,912,979 B1 | 12/2014 | Gomez |
| 8,924,862 B1 | 12/2014 | Luo |
| 9,411,422 B1 | 8/2016 | McClendon et al. |
| 9,671,566 B2 | 6/2017 | Abovitz et al. |
| 9,734,633 B2 | 8/2017 | Bennett et al. |
| 9,761,055 B2 | 9/2017 | Miller |
| 10,803,663 B2 | 10/2020 | Wang et al. |
| 2002/0033845 A1 | 3/2002 | Elber et al. |
| 2006/0193510 A1 | 8/2006 | Matsumoto et al. |
| 2007/0226647 A1 | 9/2007 | Louch |
| 2008/0115081 A1 | 5/2008 | Sankaravadivelu et al. |
| 2009/0089364 A1 | 4/2009 | Hamilton, II et al. |
| 2012/0030617 A1 | 2/2012 | Louch |
| 2012/0131496 A1 | 5/2012 | Goossens et al. |
| 2012/0179426 A1 | 7/2012 | Fontes et al. |
| 2012/0212484 A1 | 8/2012 | Haddick et al. |
| 2012/0249741 A1 | 10/2012 | Maciocci et al. |
| 2012/0266101 A1 | 10/2012 | Shah |
| 2012/0294539 A1 | 11/2012 | Lim et al. |
| 2013/0278631 A1 | 10/2013 | Border et al. |
| 2013/0342572 A1 | 12/2013 | Poulos et al. |
| 2014/0002444 A1 | 1/2014 | Bennett et al. |
| 2014/0118397 A1 | 5/2014 | Lee et al. |
| 2014/0168262 A1 | 6/2014 | Forutanpour et al. |
| 2014/0184496 A1 | 7/2014 | Gribetz et al. |
| 2014/0195988 A1 | 7/2014 | Kramer et al. |
| 2014/0200863 A1 | 7/2014 | Kamat et al. |
| 2014/0225922 A1* | 8/2014 | Sbardella .............. G06T 19/006 345/633 |
| 2014/0232639 A1 | 8/2014 | Hayashi et al. |
| 2014/0237393 A1 | 8/2014 | Van Wie et al. |
| 2014/0248950 A1 | 9/2014 | Tosas Bautista |
| 2014/0267228 A1 | 9/2014 | Ofek et al. |
| 2014/0282274 A1 | 9/2014 | Everitt et al. |
| 2014/0306866 A1 | 10/2014 | Miller et al. |
| 2014/0337792 A1 | 11/2014 | Phang et al. |
| 2014/0375683 A1 | 12/2014 | Salter et al. |
| 2015/0143302 A1 | 5/2015 | Chang et al. |
| 2015/0163345 A1 | 6/2015 | Cornaby et al. |
| 2015/0185825 A1 | 7/2015 | Mullins |
| 2015/0206343 A1 | 7/2015 | Mattila et al. |
| 2015/0206349 A1 | 7/2015 | Rosenthal et al. |
| 2015/0253862 A1 | 9/2015 | Seo et al. |
| 2015/0268831 A1 | 9/2015 | Sripada |
| 2015/0277699 A1* | 10/2015 | Algreatly .............. G06F 3/0304 715/850 |
| 2015/0302651 A1 | 10/2015 | Shpigelman |
| 2015/0317831 A1 | 11/2015 | Ebstyne et al. |
| 2015/0331240 A1 | 11/2015 | Poulos et al. |
| 2015/0332509 A1 | 11/2015 | Jovanovic |
| 2016/0026253 A1 | 1/2016 | Bradski et al. |
| 2016/0027214 A1 | 1/2016 | Memmott et al. |
| 2016/0048204 A1 | 2/2016 | Scott et al. |
| 2016/0077677 A1 | 3/2016 | Valdes |
| 2016/0180602 A1 | 6/2016 | Fuchs |
| 2016/0210602 A1 | 7/2016 | Siddique et al. |
| 2016/0266386 A1 | 9/2016 | Scott et al. |
| 2016/0300392 A1 | 10/2016 | Jonczyk et al. |
| 2016/0321378 A1 | 11/2016 | Kagan et al. |
| 2017/0011557 A1 | 1/2017 | Lee et al. |
| 2017/0046881 A1 | 2/2017 | Kuribara |
| 2017/0052994 A1 | 2/2017 | Jain et al. |
| 2017/0054569 A1 | 2/2017 | Harms et al. |
| 2017/0060514 A1 | 3/2017 | Kaufthal |
| 2017/0109936 A1 | 4/2017 | Powderly et al. |
| 2017/0132835 A1 | 5/2017 | Halliday et al. |
| 2017/0235848 A1 | 8/2017 | Van Dusen et al. |
| 2017/0256096 A1 | 9/2017 | Faaborg et al. |
| 2017/0256099 A1 | 9/2017 | Li |
| 2017/0258526 A1 | 9/2017 | Lang |
| 2017/0287218 A1* | 10/2017 | Nuernberger ....... G06F 3/04845 |
| 2017/0322622 A1 | 11/2017 | Hong et al. |
| 2018/0004283 A1 | 1/2018 | Mathey-Owens et al. |
| 2018/0005034 A1 | 1/2018 | Kaehler et al. |
| 2018/0012330 A1 | 1/2018 | Holzer et al. |
| 2018/0033204 A1 | 2/2018 | Dimitrov et al. |
| 2018/0045963 A1 | 2/2018 | Hoover et al. |
| 2018/0082480 A1 | 3/2018 | White et al. |
| 2018/0095276 A1 | 4/2018 | Ng-Thow-Hing |
| 2018/0101994 A1 | 4/2018 | Da Veiga et al. |
| 2018/0131788 A1 | 5/2018 | Roberts |
| 2018/0144111 A1 | 5/2018 | Katingari |
| 2018/0144556 A1 | 5/2018 | Champion et al. |
| 2018/0150204 A1 | 5/2018 | Macgillivray |
| 2018/0210206 A1 | 7/2018 | Eronen et al. |
| 2018/0225885 A1* | 8/2018 | Dishno ............... G06F 16/9577 |
| 2018/0349485 A1 | 12/2018 | Carlisle et al. |
| 2018/0365897 A1 | 12/2018 | Pahud et al. |
| 2018/0374143 A1 | 12/2018 | Williamson et al. |
| 2019/0005724 A1 | 1/2019 | Pahud et al. |
| 2019/0025999 A1 | 1/2019 | Murphy et al. |
| 2019/0043259 A1 | 2/2019 | Wang et al. |
| 2019/0079648 A1 | 3/2019 | Karunamuni et al. |
| 2019/0156585 A1* | 5/2019 | Mott ...................... G06F 3/011 |
| 2019/0197785 A1 | 6/2019 | Tate-Gans et al. |
| 2021/0097775 A1 | 4/2021 | Zurmoehle et al. |

FOREIGN PATENT DOCUMENTS

| | | |
|---|---|---|
| CN | 103460256 | 12/2013 |
| CN | 105229719 | 1/2016 |
| EP | 1556805 | 8/2011 |
| EP | 2455858 | 5/2012 |
| JP | 2007-58332 | 3/2007 |
| JP | 2009-518699 | 5/2009 |
| JP | 2010-534974 | 11/2010 |
| JP | 2014-515962 | 7/2014 |
| JP | 2015-504616 | 2/2015 |
| JP | 2016-500891 | 1/2016 |
| JP | 2016-508257 | 3/2016 |
| JP | 2016-511492 | 4/2016 |
| KR | 10-2008-0047575 | 5/2008 |
| KR | 10-2014-0071086 | 6/2014 |
| KR | 10-2015-0130495 | 11/2015 |
| KR | 10-2017-0018930 | 2/2017 |
| WO | WO 2007/038090 | 4/2007 |
| WO | WO 2015/033377 | 3/2015 |
| WO | WO 2016/203792 | 12/2016 |
| WO | WO 2017/040442 | 3/2017 |
| WO | WO 2017/062289 | 4/2017 |

OTHER PUBLICATIONS

Szalavári, Zsolt, Erik Eckstein, and Michael Gervautz. "Collaborative gaming in augmented reality." Proceedings of the ACM symposium on Virtual reality software and technology. 1998. (Year: 1998).*

Foreign Response for CA Patent Appln. No. 3060209 dated Oct. 26, 2023.

Foreign Response for AU Patent Appln. No. 2022271460 dated Oct. 26, 2023.

Foreign Response for JP Patent Appln. No. 2021-559089 dated Oct. 30, 2023.

Foreign Response for JP Patent Appln. No. 2022-142067 dated Oct. 31, 2023.

Foreign OA for KR Patent Appln. No. 10-2023-7023782 dated Nov. 7, 2023.

Response After Final for U.S. Appl. No. 17/316,925 dated Nov. 14, 2023.

Foreign OA for JP Patent Appln. No. 2022-143449 dated Nov. 1, 2022 (with English translation).

Foreign NOA for JP Patent Appln. No. 2020-534227 dated Nov. 15, 2022.

(56) References Cited

OTHER PUBLICATIONS

Foreign Response for CN Patent Appln. No. 201880043910.4 dated Nov. 18, 2022.
Non-Final Office Action for U.S. Appl. No. 17/663,792 dated Nov. 22, 2022.
Foreign OA for KR Patent Appln. No. 10-2022-7027516 dated Dec. 5, 2022.
Foreign Exam Report for AU Patent Appln. No. 2022271460 dated Dec. 7, 2022.
Foreign NOA for IL Patent Appln. No. 275461 dated Nov. 9, 2022 in English.
Foreign Response for KR Patent Appln. No. 10-2020-7021106 dated Dec. 9, 2022.
Notice of Allowance for U.S. Appl. No. 17/368,495 dated Dec. 14, 2022.
Foreign Response for EP Patent Appln. No. 19756664.9 dated Dec. 20, 2022.
Non-Final Office Action for U.S. Appl. No. 17/241,977 dated Aug. 3, 2022.
Wade et al. "A Gaze-Contingent Adaptive Virtual Reality Driving Environment for Intervention in Individuals with Autism Spectrum Disorders", 2016, ACM (Year: 2016).
Extended European Search Report for EP Patent Appln. No. 20784393.9 dated Jun. 20, 2022.
Foreign OA for JP Patent Appln. No. 2020-544237 dated Aug. 4, 2022.
Foreign NOA for JP Patent Appln. No. 2019-559343 dated Aug. 12, 2022.
Foreign NOA for IL Patent Appln. No. 270249 dated Dec. 4, 2022 in English.
Foreign NOA for IL Patent Appln. No. 276629 dated Dec. 21, 2022 in English.
Foreign NOA for IL Patent Appln. No. 276621 dated Dec. 21, 2022 in English.
Foreign Response for JP Patent Appln. No. 2022-143449 dated Jan. 24, 2023.
Foreign NOA for CN Patent Appln. No. 201880043910.4 dated Jan. 11, 2023.
Foreign NOA for JP Patent Appln. No. 2022-143449 dated Apr. 4, 2023.
Amendment After Final for U.S. Appl. No. 17/241,977 dated Apr. 12, 2023.
Foreign NOA for KR Patent Appln. No. 10-2022-7027516 dated Apr. 10, 2023.
Foreign Decision of Rejection for CN Patent Appln. No. 202080026322.7 dated Mar. 18, 2023.
Final Office Action for U.S. Appl. No. 16/839,727 dated Jun. 30, 2021.
Non-Final Office Action for U.S. Appl. No. 16/839,727 dated Nov. 9, 2021.
Non-Final Office Action for U.S. Appl. No. 16/839,727 dated Feb. 10, 2021.
Notice of Allowance for U.S. Appl. No. 16/839,727 dated Feb. 28, 2022.
Notice of Allowance for U.S. Appl. No. 15/968,673 dated Jul. 15, 2020.
PCT Notification of the International Search Report and Written Opinion mailed Jul. 11, 2018 for PCT Application No. PCT/US2018/030535, Applicant Magic Leap, Inc., 14 pages.
Extended European Search Report for EP Appln. No. 18794284.2 dated Jan. 29, 2020 (7 pages).
Foreign Response to 70(2) for EP Patent Appln. No. 18794284.2 dated Aug. 28, 2020.
Non-Final Office Action for U.S. Appl. No. 15/968,673 dated Oct. 17, 2019.
Final Office Action for U.S. Appl. No. 15/968,673 dated Mar. 30, 2020.
Amendment Response to Non-Final Office Action for U.S. Appl. No. 15/968,673 dated Jan. 17, 2020.
Amendment Response to Final Office Action for U.S. Appl. No. 15/968,673 dated Jun. 26, 2020.
Non-Final Office Action for U.S. Appl. No. 16/281,540 dated May 4, 2020.
Amendment Response to Non-Final Office Action for U.S. Appl. No. 16/281,540 dated Aug. 4, 2020.
PCT International Search Report and Written Opinion for International Appln. No. PCT/US2019/018932, Applicant Magic Leap, Inc., forms PCT/ISA/210, 220, and 237, dated May 14, 2019.
Non-Final Office Action for U.S. Appl. No. 16/224,719 dated Feb. 6, 2020.
Final Office Action for U.S. Appln. No. 224,719 dated Jun. 18, 2020.
Amendment Response to Non-Final Office Action for U.S. Appl. No. 16/224,719 dated May 6, 2020.
IT Jungles, "iPhone—How to Move Re-arrange Home Screen Icons", 20150315, YouTube.com (Year: 2015).
PCT Invitation to Pay Additional Fees for International Patent Appln. No. PCT/US18/66331, Applicant Magic Leap Inc., form PCT/ISA/206, dated Mar. 13, 2019 (3 pages).
PCT International Search Report and Written Opinion for International Patent Appln. No. PCT/US18/66331, Applicant Magic Leap Inc., forms PCT/ISA/210, 220, and 237, dated May 8, 2019 (11 pages).
Amendment After Final for U.S. Appl. No. 16/224,719 dated Sep. 18, 2020.
Non-Final Office Actino for U.S. Appl. No. 16/224,719 dated Oct. 5, 2020.
Notice of Allowance for U.S. Appl. No. 15/968,673 dated Oct. 7, 2020.
Final Office Action for U.S. Appl. No. 16/281,540 dated Oct. 27, 2020.
Amendment Response to NFOA for U.S. Appl. No. 16/224,719 dated Jan. 5, 2021.
RCE and Response to Final Office Action for U.S. Appl. No. 16/281,540, filed Jan. 27, 2021.
Notice of Allowance for U.S. Appl. No. 16/224,719 dated Jan. 27, 2021.
Notice of Allowance for U.S. Appl. No. 16/281,540 dated Feb. 11, 2021.
Extended European Search Report for EP Appln. No. 18891755.3 dated Dec. 23, 2020 (9 pages).
Dieter Schmal stieg et al: "The 1-13 Studierstube Augmented Reality Project—TR-186-2-00-22", Technical Reports of the Technical University of Vienna, Dec. 31, 2000 (Dec. 31, 2000), pp. 1-24, XP055270593, Retrieved from the Internet: URL:https://www.cg.tuwien.ac.at/research/publications/2000/Schm-2000-Stb/TR-186-2-00-22Paper.pdf.
PCT International Search Report and Written Opinion for International Appln. No. PCT/US20/26656, Applicant Magic Leap, Inc., dated Jun. 22, 2020 (13 pages).
Amendment Response to NFOA for U.S. Appl. No. 16/839,727 dated May 10, 2021.
Notice of Allowance for U.S. Appl. No. 16/971,603 dated Feb. 18, 2021.
PCT International Search Report and Written Opinion for International Appln. No. PCT/US19/18920, Applicant Magic Leap, Inc., dated May 14, 2019.
Foreign OA for CN Patent Appln. No. 201880043910.4 dated May 31, 2021.
Non-Final Office Action for U.S. Appl. No. 17/142,210 dated Aug. 5, 2021.
Foreign Response for EP Patent Appln. No. 18891755.3 dated Jul. 29, 2021.
Extended European Search Report for EP Patent Appln. No. 19756664.9 dated Mar. 29, 2021.
RCE and Amendment Response to FOA for U.S. Appl. No. 16/839,727, filed Sep. 30, 2021.
Foreign Response for EP Patent Appln. No 19756664.9 dated Oct. 25, 2021.
Foreign Response for EP Patent Appln. No. 19757809.9 dated Oct. 22, 2021.

(56) References Cited

OTHER PUBLICATIONS

Foreign Exam Report for AU Patent Appln. No. 2018261328 dated Sep. 6, 2021.
Foreign OA for JP Patent Appln. No. 2019-559343 dated Oct. 6, 2021 (with English translation).
Uchiyama, H., et al., "Method for Displaying Images on Urban Structures by Augmented Reality," IEICE technical report, JP, the Institute of Electronics, Information and Communication Engineers, Mar. 22, 2012, vol. 111 No.499, 141-146.
Foreign OA for CN Patent Appln. No. 201880043910.4 dated Jan. 5, 2022.
Foreign OA for KR Patent Appln. No. 10-2019-7035273 dated Sep. 16, 2021.
Foreign OA for KR Patent Appln. No. 10-2019-7035273 dated Jan. 18, 2022.
Amendment Response for U.S. Appl. No. 16/839,727 dated Feb. 7, 2022.
Foreign Exam Report for IN Patent Appln. No. 201947046799 dated Feb. 11, 2022.
Notice of Allowance for U.S. Appl. No. 17/142,210 dated Feb. 18, 2022.
Non-Final Office Action for U.S. Appl. No. 17/368,495 dated Feb. 25, 2022.
Foreign OA for JP Patent Appln. No. 2020-544237 dated Feb. 21, 2022 (with English translation).
Foreign FOA for JP Patent Appln. No. 2019-559343 dated Mar. 8, 2022 (with English translation).
Foreign OA for IL Patent Appln. No. 270249 dated Jan. 28, 2022.
Foreign Response for CN Patent Appln. No. 201880043910.4 dated Mar. 16, 2022.
Foreign Response for KR Patent Appln. No. 10-2019-7035273 dated Mar. 15, 2022.
Foreign OA for JP Patent Appln. No. 2020-544190 dated Mar. 15, 2022 (with English translation).
Foreign Rejection Decision for CN Patent Appln. No. 201880043910.4 dated Apr. 29, 2022.
Foreign Response for JP Patent Appln. No. 2020-544237 dated May 17, 2022.
Foreign NOA for KR Patent Appln. No. 10-2019-7035273 dated May 9, 2022.
Amendment Response to NFOA for U.S. Appl. No. 17/368,495 dated May 25, 2022.
Foreign OA for JP Patent Appln. No. 2020-534227 dated May 20, 2022.
Foreign Response for IL Patent Appln. No. 270249 dated May 26, 2022.
Foreign Response for EP Patent Appln. No. 18794284.2 dated Jun. 3, 2022.
Foreign Response for JP Patent Appln. No. 2019-559343 dated Jun. 7, 2022.
Foreign Response for JP Patent Appln. No. 2020-544190 dated Jun. 13, 2022.
Foreign NOA for JP Patent Appln. No. 2020-544190 dated Jun. 24, 2022.
Foreign Response for AU Patent Appln. No. 2018261328 dated Jul. 20, 2022.
Final Office Action for U.S. Appl. No. 17/368,495 dated Jul. 27, 2022.
Foreign Exam Report for IN Patent Appln. No. 202047032176 dated Jul. 19, 2022.
Foreign NOA for AU Patent Appln. No. 2018261328 dated Aug. 10, 2022.
Foreign Exam Report for IN Patent Appln. No. 202047029094 dated Aug. 26, 2022.
Amendment After Final for U.S. Appl. No. 17/368,495 dated Sep. 22, 2022.
Foreign OA for CN Patent Appln. No. 201880043910.4 dated Sep. 23, 2022.
Foreign Response for KR Patent Appln. No. 10-2022-7027516 dated Feb. 3, 2023.
Foreign Response for CN Patent Appln. No. 202080026322.7 dated Feb. 9, 2023.
Non-Final Office Action for U.S. Appl. No. 17/316,925 dated Feb. 16, 2023.
Final Office Action for U.S. Appl. No. 17/241,977 dated Feb. 17, 2023.
Amendment Response to NFOA for U.S. Appl. No. 17/663,792 dated Feb. 22, 2023.
Foreign NOA for KR Patent Appln. No. 10-2020-7021106 dated Apr. 18, 2023.
Amendment Response to NFOA for U.S. Appl. No. 17/316,925 dated May 16, 2023.
Notice of Allowance for U.S. Appl. No. 17/241,977 dated May 12, 2023.
Amendment Response to NFOA for U.S. Appl. No. 17/241,977 dated Nov. 2, 2022.
Foreign Response for JP Patent Appln. No. 2022-117087 dated Nov. 17, 2023.
Foreign NOA for AU Patent Appln. No. 2022271460 dated Nov. 7, 2023.
Notice of Allowance for U.S. Appl. No. 17/316,925 dated Dec. 11, 2023.
Foreign Response for CN Patent Appln. No. 202080026322.7 dated Jun. 26, 2023.
Final Office Action for U.S. Appl. No. 17/663,792 dated May 24, 2023.
Foreign Exam Report for NZ Patent Appln. No. 758288 dated May 12, 2023.
Amendment After Final for U.S. Appl. No. 17/663,792 dated Jul. 24, 2023.
Extended European Search Report for EP Patent Appln. No. 23159324.5 dated Jun. 1, 2023.
Foreign Exam Report for CA Patent Appln. No. 3060209 dated Jun. 30, 2023.
Final Office Action for U.S. Appl. No. 17/316,925 dated Aug. 14, 2023.
Foreign Reexamination Decision for CN Patent Appln. No. 201880043910.4 dated Aug. 22, 2022.
Foreign OA for JP Patent Appln. No. 2021-559089 dated Aug. 10, 2023 (with English translation).
Foreign OA for JP Patent Appln. No. 2022-142067 dated Aug. 7, 2023 (with English translation).
Notice of Allowance for U.S. Appl. No. 17/663,792 dated Aug. 30, 2023.
Foreign OA for JP Patent Appln. No. 2022-117087 dated Aug. 14, 2023 (with English translation).
Foreign OA for CN Patent Appln. No. 202080026322.7 dated Oct. 12, 2022.
Schmalstieg, D., et al., "The Studierstube Augmented Reality Project," Presence, vol. 11, No. 1, Feb. 2002, 33-54, © 2002 by the Massachusetts Institute of Technology.
Foreign OA for KR Patent Appln. No. 10-2020-7021106 dated Oct. 14, 2022.
Foreign Response for KR Patent Appln. No. 10-2023-7023782 dated Dec. 28, 2023.
Foreign OA for JP Patent Appln. No. 2022-199311 dated Dec. 21, 2023 (with English translation).
Foreign NOA for JP Patent Appln. No. 2021-559089 dated Jan. 16, 2024.
Foreign Response for EP Patent Appln. No. 23159324.5 dated Jan. 19, 2024.
Foreign OA for CN Patent Appln. No. 201980014588.7 dated Dec. 28, 2023 (with English translation).
Foreign OA for JP Patent Appln. No. 2022-117087 dated Jan. 26, 2024 (with English translation).
Foreign OA for JP Patent Appln. No. 2022-142067 dated Jan. 25, 2024 (with English translation).
Foreign Response for CN Patent Appln. No. 201880088453.0 dated Feb. 28, 2024.
Foreign NOA for CA Patent Appln. No. 3060209 dated Feb. 1, 2024.
Foreign Response for JP Patent Appln. No. 2022-199311 dated Mar. 13, 2024.

(56) References Cited

OTHER PUBLICATIONS

Foreign NOA for JP Patent Appln. No. 2022-199311 dated Mar. 21, 2024.
Foreign Exam Report for EP Patent Appln. No. 19756664.9 dated Jan. 29, 2024.
Non-Final Office Action for U.S. Appl. No. 18/182,590 dated Apr. 2, 2024.
Foreign NOA for IL Patent Appln. No. 270249 dated Apr. 15, 2024 in English.
Foreign Response for JP Patent Appln. No. 2022-142067 dated Apr. 25, 2024.
Foreign Hearing Notice for IN Patent Appln. No. 201947046799 dated Apr. 26, 2024 in English.
Foreign OA for KR Patent Appln. No. 10-2020-7026917 dated Apr. 19, 2024.
Foreign Response for CN Patent Appln. No. 201980014588.7 dated May 13, 2024.
Foreign NOA for KR Patent Appln. No. 10-2023-7023782 dated May 14, 2024.
Foreign OA for KR Patent Appln. No. 10-2023-7023413 dated May 20, 2024 (with English translation).
Foreign Response for JP Patent Appln. No. 2022-117087 dated May 28, 2024.
Foreign Response for EP Patent Appln. No. 19756664.9 dated May 29, 2024.
Foreign Refusal Order for IN Patent Appln. No. 201947046799 dated Jun. 6, 2024 in English.
Foreign NOA for JP Patent Appln. No. 2022-117087 dated Jun. 25, 2024.
Foreign OA for CN Patent Appln. No. 201980014719.1 dated Jun. 24, 2024 (with English translation).
Foreign NOA for JP Patent Appln. No. 2022-142067 dated Jun. 26, 2024.
Foreign NOA for JP Patent Appln No. 2023-76383 dated Jun. 12, 2024 (with English translation).
Amendment Response for U.S. Appl. No. 18/182,590 dated Jul. 1, 2024.
Foreign OA for CN Patent Appln. No. 201880088453.0 dated Jun. 28, 2024.
Foreign OA Response for KR Patent Appln. No. 10-2023-7023413 dated Jul. 22, 2024 (with English translation).
Foreign OA for KR Patent Appln. No. 10-2020-7026920 dated Jul. 28, 2024 (with English translation).
Non-Final Office Action for U.S. Appl. No. 18/523,763 dated Aug. 15, 2024.
Foreign NOA for KR Patent Appln. No. 10-2023-7023413 dated Aug. 21, 2024.
Foreign Response for JP Patent Appln. No. 2023-76383 dated Aug. 27, 2024.
Foreign OA for CN Patent Appln. No. 201980014588.7 dated Aug. 15, 2024 (with English translation).
Foreign Response for KR Patent Appln. No. 10-2020-7026920 dated Sep. 20, 2024.
Foreign Response for CN Patent Appln. No. 201980014588.7 dated Oct. 11, 2024.
Foreign Response for CN Patent Appln. No. 201880088453.0 dated Oct. 12, 2024.
Foreign Response for CN Patent Appln. No. 201980014719.1 dated Oct. 17, 2024.
Foreign OA for CN Patent Appln. No. 201980014588.7 dated Dec. 6, 2024.
Notice of Allowance for U.S. Appl. No. 18/182,590 dated Oct. 29, 2024.
Amendment Response to NFOA for U.S. Appln. No. 18/523.763 dated Nov. 12, 2024.
Foreign OA for JP Patent Appln. No. 2024-21089 dated Oct. 24, 2024 (with English translation).
Foreign NOA for CN Patent Appln. No. 201880088453.0 dated Nov. 6, 2024.
Final Office Action for U.S. Appl. No. 18/523,763 dated Nov. 25, 2024.

* cited by examiner

METHODS, SYSTEMS, AND COMPUTER PROGRAM PRODUCT FOR MANAGING AND DISPLAYING WEBPAGES IN A VIRTUAL THREE-DIMENSIONAL SPACE WITH A MIXED REALITY SYSTEM

CROSS REFERENCE TO RELATED U.S. PATENT APPLICATIONS

The present application is a continuation of U.S. patent application Ser. No. 16/839,727, filed Apr. 3, 2020, entitled "METHODS, SYSTEMS, AND COMPUTER PROGRAM PRODUCT FOR MANAGING AND DISPLAYING WEBPAGES IN A VIRTUAL THREE-DIMENSIONAL SPACE WITH A MIXED REALITY SYSTEM," which claims the benefit of U.S. Provisional Patent Application Ser. No. 62/828,917, filed Apr. 3, 2019 entitled, "METHODS, SYSTEMS, AND COMPUTER PROGRAM PRODUCT FOR MANAGING AND DISPLAYING WEBPAGES IN A VIRTUAL THREE-DIMENSIONAL SPACE WITH A MIXED REALITY SYSTEM" and U.S. Provisional Patent Application Ser. No. 62/976,254, filed Feb. 13, 2020, entitled "METHODS, SYSTEMS, AND COMPUTER PROGRAM PRODUCT FOR MANAGING AND DISPLAYING WEBPAGES IN A VIRTUAL THREE-DIMENSIONAL SPACE WITH A MIXED REALITY SYSTEM".

The present disclosure is related to U.S. patent application Ser. No. 16/224,719 entitled "METHODS AND SYSTEM FOR MANAGING AND DISPLAYING VIRTUAL CONTENT IN A MIXED REALITY SYSTEM" and filed on Dec. 18, 2018 under and U.S. patent application Ser. No. 14/205,126 entitled "SYSTEM AND METHOD FOR AUGMENTED AND VIRTUAL REALITY" and filed on Mar. 11, 2014, U.S. patent application Ser. No. 14/702,736 entitled "ADJUSTING PIXELS TO COMPENSATE FOR SPACING IN AUGMENTED OR VIRTUAL REALITY SYSTEMS" and filed on May 3, 2015, U.S. patent application Ser. No. 14/690,401 entitled "SYSTEMS AND METHODS FOR AUGMENTED AND VIRTUAL REALITY" and filed on Apr. 18, 2015, U.S. patent application Ser. No. 14/704,765 entitled "METHOD AND SYSTEM FOR RENDERING VIRTUAL CONTENT" and filed on May 5, 2015, and U.S. Prov. Pat. App. Ser. No. 62/828,917 entitled "A MIXED REALITY SYSTEM" and filed on Apr. 3, 2019.

The contents of the patent applications and patents identified herein are hereby expressly and fully incorporated by reference in their entirety, as though set forth in full.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In modern computing era, the Internet provides a plethora of resources to devices worldwide through the Internet protocol suite. For example, the World Wide Web (or simply the Web) provides interconnected documents, services, resources, etc. by hyperlinks and Uniform Resource Locators (URLs) so that users may use web browsers to, for example, view web pages, access web resources, etc.

Web pages are typically displayed in a two-dimensional (2D), stationary window. This planar representation of web pages, web resources, etc. imposes a limitation on website designs, etc. and hence provided limited user experiences and usefulness. Some entities have envisioned and created so called three-dimensional (3D) browsers such as Microsoft's SurfCube, Mootools' 3DBrowser (or 3DB), etc. that present a perspective view of some limited web pages on computer display screens. Nonetheless, these so called "3D browsers" render contents in a perspective view on a two-dimensional display screen so the rendered contents merely appear to have some three-dimensional effects with the perspective views yet are nevertheless presented in a planar view. These 3D browsers thus do not really address, alleviate, or relax the limitations imposed by conventional 2D web pages. Some legacy techniques allow the browser to rotate in-plane. For example, these legacy techniques may rotate the browser window together with all the web pages opened therein with respect to the normal direction of the planar view of the browser. Nonetheless, these legacy techniques are not only limited to the two-dimensional display but also to the rotation of the entire browser window (and hence the open web pages) and thus lack the capability of rotating each web page individually and both in the in-plane and out-of-plane manner.

Modern computing and display technologies have facilitated the development of systems for so-called "virtual reality" (VR), "augmented reality" (AR) experiences, and/or "mixed reality" experiences (hereinafter collectively referred to as "mixed reality" and/or "MR"), where digitally reproduced images or portions thereof are presented to a user in a manner where they seem to be, or may be perceived as, real. A VR scenario typically involves presentation of digital or virtual image information without transparency to other actual real-world visual input, whereas an AR or MR scenario typically involves presentation of digital or virtual image information as an augmentation to visualization of the real world around the user such that the digital or virtual image (e.g., virtual content) may appear to be a part of the real world. However, MR may integrate the virtual content in a contextually meaningful way, whereas AR may not.

Applications of mixed reality technologies have been expanding from, for example, gaming, military training, simulation-based training, etc. to productivity and content creation and management. A mixed reality system has the capabilities to create virtual objects that appear to be, or are perceived as, real. Such capabilities, when applied to the Internet technologies, may further expand and enhance the capability of the Internet as well as the user experiences so that using the web resources is no longer limited by the planar, two-dimensional representation of web pages.

Therefore, there exists a need for methods, systems, and computer program products for managing and displaying web pages and web resources in a three-dimensional virtual space with a mixed reality system.

SUMMARY

The contents of the aforementioned patent applications are hereby expressly and fully incorporated by reference in their entirety, as though set forth in full. Disclosed are method(s), system(s), and article(s) of manufacture for managing and displaying web pages and web resources in a three-dimensional virtual space with a mixed reality system in one or more embodiments. Some embodiments are directed at a method for managing and displaying web pages and web resources in a three-dimensional virtual space with a mixed reality system.

In some embodiments, these techniques receive an input for 3D transform for a web page or a web page panel therefor. In response to the input, a browser engine coupled to a processor of an extended reality system determines 3D transform data for the web page or the web page panel based at least in part upon the 3D transform of the web page or the web page panel, wherein the 3D transform comprises a change in 3D position, rotation, or scale of the web page or the web page panel therefor in a virtual 3D space. A universe browser engine may present contents of the web page in a virtual 3D space based at least in part upon the 3D transform data.

In some of these embodiments, a browser engine further identifies a web page to be displayed in the virtual 3D space, wherein the virtual 3D space is or includes a prism. The browser engine further stores the 3D transform data in a non-transitory computer readable medium accessible by the browser engine. The 3D transform data may be transmitted from the browser engine to a universe browser engine.

In some embodiments, these techniques further optionally receive, from the web page or a website hosting the web page, the input for the 3D transform for the web page, wherein a boundary of the web page is constrained by a web browser that is configurable to be displayed or suppressed in the virtual 3D space. The input for a 3D transform for the web page may be alternatively, optionally received from a user, wherein the boundary of the web page is constrained by the web browser that is configurable to be displayed or suppressed in the virtual 3D space. In addition or in the alternative, the input for 3D transform for the web page or the web page panel may be identified from code of the web page, wherein a developer of the web page constrains the 3D position, rotation, or scale of the web page to be displayed by the browser engine.

In addition or in the alternative, the 3D transform data may be transmitted from the browser engine to the universe browser engine; and the change in the 3D position, rotation, or scale of the web page or a web page panel therefor may be received at the universe browser engine. In some of the immediately preceding embodiments, the universe browser engine may further update the 3D transform data into updated 3D transform data and synchronize the 3D transform data accessible to the browser engine with the updated 3D transform data.

A virtual three-dimensional volume having a three-dimensional boundary in the virtual 3D space created by the extended reality system for the web page may be identified or generated based in part or in whole upon one or more behavior types; and these techniques further initialize the browser engine and determine a unique identifier for the browser engine. A listener instance for the browser engine may then be registered with the universe browser engine.

The universe browser engine may further associate the virtual three-dimensional volume with the listener instance. The virtual three-dimensional volume may also be assigned to the browser engine; and the virtual three-dimensional volume may then be positioned or placed in the virtual 3D space by using at least a scene graph structure.

Some embodiments receive a first user input indicative of a user's interest in contents of the web page. In response to the first user input, at least the browser engine may be executed for generating the contents; and a virtual three-dimensional volume may be determined in the virtual three-dimensional space for rendering the contents into. In some of these embodiments, a second user input indicative of the 3D transform for the web page or the web page panel therefor may be received, and the contents may be rendered into the virtual three-dimensional volume based at least in part upon the second user input.

In addition or in the alternative, a transform tree structure and a node in the transform tree structure may be identified for the web page; a determination of whether the node has a parent node in the transform tree structure may be made; and the 3D transform data may be received from the browser engine for the web page or the web page panel; and a 3D position or rotation input may be received for the web page from the universe browser engine.

In some of these embodiments, the universe browser engine may determine updated 3D position, rotation, or scale for the web page or the web page panel based at least in part upon the 3D position, rotation, or scale input; and the 3D position, rotation, or scale data accessible by the browser engine with the updated 3D position, rotation, or scale data.

To determine the updated 3D position, rotation, or scale data, one or more transforms of a parent of the web page may be identified; one or more transform characteristics for the web page may also be identified based at least in part upon the 3D position, rotation, or scale input; and the 3D position, rotation, or scale input may be identified for the web page.

In some of the immediately preceding embodiments, these techniques determine a set of transforms for the web page or the web page panel therefor based at least in part upon one or more of the 3D position, rotation, or scale input, the one or more transforms of the parent of the web page or the web page panel therefor, or the one or more transform characteristics for the web page or the web page panel therefor. The updated 3D position, rotation, or scale data may be determined by applying the set of transforms to the web page or the web page panel therefor. In some embodiments, the 3D transform is limited to modify only an orientation of the web page or the web page panel therefor.

Some embodiments are directed at a hardware system that may be invoked to perform any of the methods, processes, or sub-processes disclosed herein. The hardware system may include a mixed reality system having at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 1O illustrates an example of a prism in one or more embodiments.

FIG. 1AA illustrates the part of a universe browser engine (126Y) in example flow for a 3D orientation update of a web page panel in a virtual 3D space (e.g., a prism) in some embodiments.

FIGS. 1AB-1AC illustrate an example high-level flow diagram for an event dispatch flow in some embodiments.

FIGS. 2G-2I illustrate various transform trees and group trees in some embodiments.

DETAILED DESCRIPTION

Figure 1A:
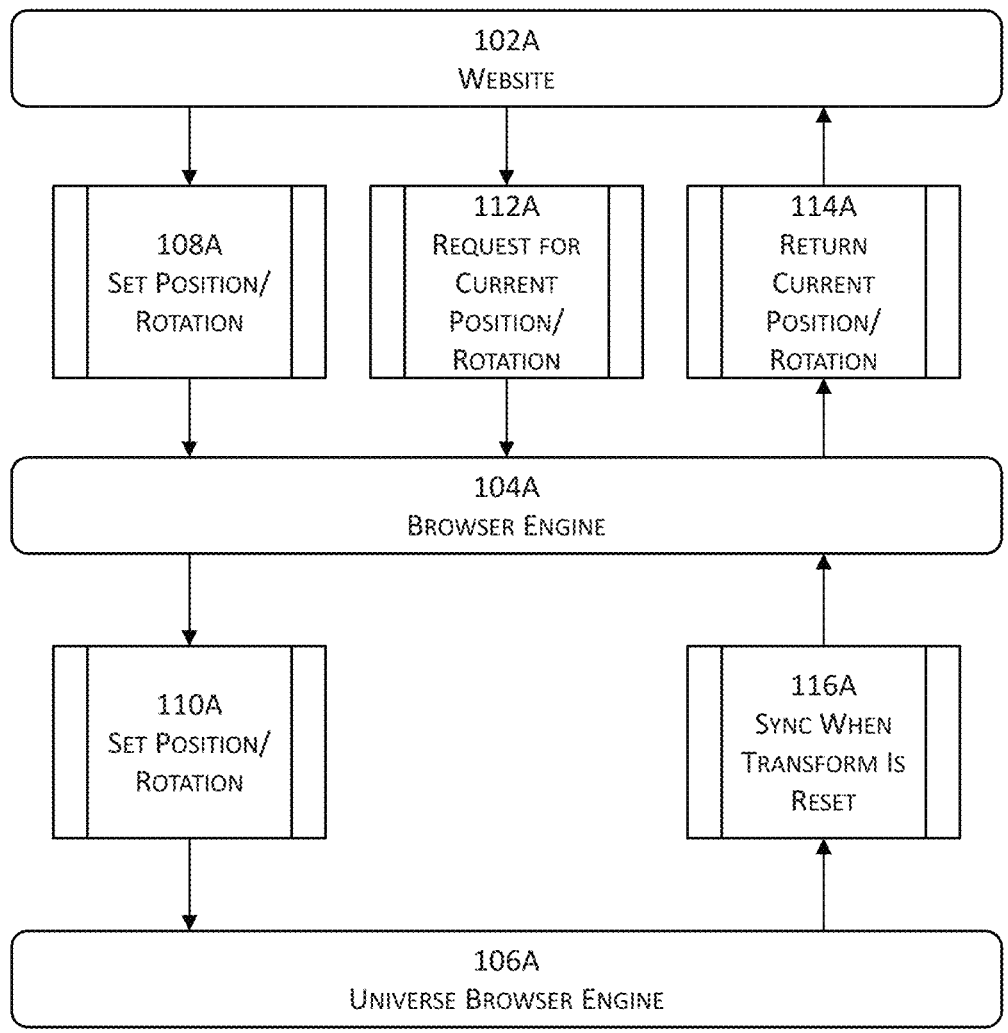
FIG. 1A illustrates a high-level block diagram of a simplified system that interacts with a website for managing and displaying web pages and web resources in a three-dimensional virtual space with a mixed reality system in one or more embodiments.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments.

It shall be noted that, unless the context requires otherwise, throughout the specification and claims which follow, the word "comprise" and variations thereof, such as, "comprises" and "comprising" are to be construed in an open, inclusive sense, that is as "including, but not limited to."

It shall be further noted that Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Furthermore, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Various techniques are directed to managing and displaying web pages and web resources in a three-dimensional virtual space with a virtual reality ("VR"), augmented reality ("AR"), mixed reality ("MR"), and/or extended reality ("XR") system (collectively referred to as an "XR system") in various embodiments.

In these various embodiments, a VR system is devised and configured to provide an immersive experience in a virtual reality or a computer-simulated reality. A virtual reality system employs computer technologies using, for example, reality headsets to generate simulated yet realistic sounds, images, and other sensations that replicate a real environment or create an imaginary world. An AR system is devised and configured to provide a live, direct, or indirect view of a physical, real-world environment whose elements are augmented (or supplemented) by computer-generated sensory input such as sound, video, graphics, or sensory data (e.g., GPS data, etc.) As augmented reality exists on top of the physical, real-world environment, an AR system described herein provides as much freedom as a user is given within a user's normal life. A MR system described herein provides hybrid reality and merges real and virtual worlds to produce new environment(s) and visualizations where physical and digital objects co-exist and interact in real-time or nearly real-time (e.g., to account for the temporal difference in signal transmission, processing time, etc.) An MR system provided herein provides new imagery within a real space in such a way that the new imagery is able to interact, at least to some extent, with what is real in the physical world. One of the characteristics of a described MR system is that the synthetic content and the real-world content are able to react to each other in real-time or nearly real-time (e.g., to account for the temporal difference in signal transmission, processing time, etc.) An extended reality or XR system provided herein provides all or nearly all real-and-virtual combined environments and human-machine interactions generated by computer technologies and devices (e.g., wearable electronics, etc.) An extended reality system provided herein is devised and/or configured to provide all or nearly all descriptive forms like an AR system, a VR system, and an MR system. In some embodiments, the term XR is used as an umbrella that brings all three reality (AR, VR, MR) together under one term.

In some embodiments, the system includes at least a mixed reality apparatus, a browser engine, and a universe browser engine and interacts with a website. In some of these embodiments, a developer of a website may incorporate a set of application programming interfaces (APIs) pertaining to one or more embodiments described herein into the code of the website; and this set of APIs communicates with a browser to obtain and to set the position and rotation of a web page. A developer may set the position and rotation data (e.g., x-, y-, and z-coordinates) in a three-dimensional space of a webpage that the developer would like end users to perceive through this set of APIs.

In some other embodiments, some or all APIs in the aforementioned set of APIs may be hosted in or referenced locally by the browser engine and/or the universe browser engine that is a part of a mixed reality system that projects image data of a webpage as virtual contents to the eye(s) of a user. This set of APIs may include, for example, a first API that sets and gets the three-dimensional position data for a web page and a second API that sets and gets the three-dimensional rotation data for the web page. It shall be noted that the terms "web page" and "web page panel" may be used interchangeably in this application although strictly speaking, a web page panel includes the two- and/or three-dimensional region in a browser window for a web page or a portion thereof to display its contents.

An example use case includes the scenario a user of a mixed reality system opens a browser and enters a URL of a website or a search criterion in the designated field(s). Various embodiments described herein allow the universe browser engine to function in conjunction with the browser engine to adjust the rotation and/or position of an individual web page in a virtual three-dimensional space based on the HTML code for the particular web page.

More particularly, in the aforementioned example, when the user launches the browser in the user's mixed reality system, the browser acts as an intermediary between the website and the universe engine. The browser engine updates the position and rotation data (e.g., x-, y-, and z-coordinates) for the requested web page by using the stored position and rotation data in some embodiments. In some of these embodiments, the universe browser engine may store the position and rotation data of a web page panel (for displaying a web page) in the browser engine. In an example where Chromium's Blink is used as a browser engine, the universe browser engine may store the position and rotation data in the RenderWidget class.

One of the purposes of storing the position and rotation data with the browser engine is that the browser may quickly communicate this most recently cached position and rotation data to the website in response to the request for positioning and/or rotating the web page form the website, without further delay from, for example, obtaining the position and/or rotation data from the universe browser. RenderWidget is a class in the Chromium project, WebKit, etc. and implements the abstract interface (e.g., a two-dimensional window or a three-dimensional volume in the virtual three-dimensional space) in the mixed reality display to receive input events and to paint or render contents into.

In some embodiments where the developer of the webpage has already set the position and rotation data for the web page, the browser engine may set the position and rotation data for the web page to be rendered and pass the position and rotation data to the universe browser engine that is a part of the mixed reality system and interfaces with the user. The browser engine and the universe browser engine may synchronize the position and rotation data. The browser engine may then invoke a function call to render the web page by using the position and rotation data.

In some embodiments, the user may further manipulate the web page panel by, for example, repositioning and/or rotating the web page panel or even the web page on display in the three-dimensional virtual space (e.g., a prism that will described in greater details later) by, for example, manipulating a positioning handle and/or a rotation handle associated with the web page or web page panel on display. In these embodiments, the user effectively changes the position and/or rotation of the web page; and the universe browser engine may also synchronize the new position and/or rotation data with the browser engine.

In some embodiments, the mixed reality system may display a placeholder (e.g., a solid or translucent bounding box or a transparent bounding box with partial or full boundaries) in the virtual three-dimensional space before rendering the desired web page by the browser engine. In some other embodiments, a mini-view of the desired web page may be first presented in the virtual three-dimensional space before the full rendering of the web page. Yet in some other embodiments, a web page may be fully rendered and displayed with the three-dimensional coordinates in the virtual three-dimensional space before any changes, either by the developer or by an end user, are performed to change the position and/or rotation of the web page.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1A illustrates a high-level block diagram of a simplified system that interacts with a website for managing and displaying web pages and web resources in a three-dimensional virtual space with a mixed reality system in one or more embodiments. More particularly, the universe browser engine 106A may transmit the position and rotation data of a web page to the browser engine 104A to store such data in the browser engine 104A. A universe browser engine (e.g., 106A) may serve as a 3D windows manager that is analogous to a 2D windows manager that is running on a laptop or desktop computer for managing 2D windows displayed on a display screen of the laptop or desktop computer.

A universe browser engine or application (e.g., 106A) functioning in conjunction with a universe browser engine also manages the generation, placement, and display of virtual contents in a user's landscape via the mixed reality system. When a browser engine 104A initializes (e.g., when a user launches the browser) to display a web page or contents therein of a website 102A, the browser 102A may set the position and rotation data of the web page to be rendered by the browser engine 104A when the website is coded to incorporate a set of APIs that are coded to both set the position and rotation data to a client's browser and to obtain the position and rotation data from the client browser (108A).

In some embodiments, a universe browser engine provides the function of a 3D windows manager and manages (e.g. how and where) virtual contents to be displayed as well as the how and where a prism, which will be described in greater details, are to be generated for an extended reality system. For example, a universe browser engine may provide a persistence functionality. As a nonlimiting example, an entity (e.g., a software application or an instance thereof, a virtual object, etc.) placed on a user's kitchen counter may appear on the kitchen counter unless and until a user changes the placement of the entity. The user may not have to re-launch the entity every time the system is turned on/off or every time the user leaves the room and comes back in some embodiments. In these embodiments, the universe browser engine stores prism information or data in a passable world, the universe browser engine may restart the entity placed on the user's kitchen each time the user uses the extended reality system and is in a close proximity to the entity application in the user's kitchen.

A universe browser engine may also maintain or change a state of a software application (or an instance thereof) relative to a user of an XR system including the universe browser engine. For example, an application may start, suspend/pause, and/or re-start automatically without requiring any explicit user actions. In contrast to a 2D windows manager, where a user interaction is required in order to change the operation state of an application (e.g., user clicks the close button). This aspect is unlike other windows managers that require a user interaction in order to change the state of an application (e.g., user clicks on the close button of an application). Also, unlike other windows, a 3D prism (or even the 3D virtual space in which a prism resides) may be both interactive and private. For example, a universe browser engine may enable both privacy and interactive features of a prism (or a 3D virtual space). In contrast, conventional windows are either interactive or private but cannot be both interactive and private.

A browser engine is often a software component of a web browser that performs tasks such as transforming HTML and/or other resources of a web page into an interactive visual representation on a user's device (e.g., a mixed reality headset). The following description may reference Chromium or Chromium-based browsers although other browsers (e.g., Mozilla's Firefox, Apple's Safari, Microsoft's Edge and Internet Explorer, Google's Chrome, Opera, 3D browsers, etc.) are also contemplated; and the techniques apply with full, equal effects to different browsers that correspond to their respective browser engines (e.g., Gecko for Mozilla, WebKit for Safari, Blink for Chrome, Chromium-based browsers, Microsoft's Edge, and Opera, and Trident for Internet Explorer, etc.)

The browser engine 104A may include any publicly available browsers such as the browsers mentioned immediately above or any custom browsers (e.g., 3D browsers).

One of the functions of the browser engine 104A is to provide the functions including, for example, transforming HTML documents and other resources of a web page into an interactive visual representation on a user's device with the position and rotation data for the web page, calculating the graphical coordinates for the visual representation using the position and rotation data provided either by the website or by the universe browser engine 106A, painting or rendering the prism (or a portion thereof), etc.

This set of APIs pertaining to one or more embodiments for managing and displaying webpages described herein may include an API that complies with the Portable Operating System Interface (POSIX) API standard and is platform- or operation system-independent to provide spatial computing functionality. This set of APIs may be incorporated into the code of a website in some embodiments as previously described above and/or may be integrated into a part of the operation system or software applications residing on the mixed reality system in some other embodiments.

This set of APIs not only sets and gets the position and rotation data between the website 102A, the browser engine 104A, and the universe browser engine 106A but also functions in conjunction with a runtime layer and one or more 3D engines between the operating system and software applications (or more precisely between the operating system service layer and software applications). This runtime layer includes libraries, applications, services, etc. and provides (either alone or in conjunction with a 3D engine) an advanced graphical user interface for the underlying mixed reality system as well as various computing functionalities such as three-dimensional translation and rotation transforms, 3D models with material and skeletal 3D model animations, 2D sprite animation, high fidelity spatialized text rendering for spatial computing, 2D and Soundfield Audio, 2D and stereoscopic video, rigid body collision physics, real-time particle FX, input events and haptics control, hand gestures, speech recognition and speech-to-text, real-time spatial computing technology for rendering objects, lighting, shadows, and real-world occlusion, etc.

For example, this runtime layer may include a set of three-dimensional translation and rotation transforms that may be applied to, for example, a prism (which will be described later), a virtual object, a browser window, a rendered web page, etc. displayed in the virtual three-dimensional space such that the virtual object, browser window, rendered web pages, etc. or any attributes thereof (e.g., display coordinates, sizes, shapes, perspective, lighting effects, etc.) appear to be or are perceived to be real or close to real by a user. More details about these transforms will be described later with reference to FIGS. 2E-2I below.

Returning back to FIG. 1A, with the set of APIs, the website 102A may send a position and/or rotation request (112A) from the browser engine 104A. In this case, the browser engine 104A may transmit the most recent position and rotation data to the website (114A). As described above, the universe browser engine 106A may store the position and rotation data in or with the browser engine 104A (e.g., in a cache accessible by the browser engine 104A) so that the browser engine 104A may respond to such requests from websites 102A without additional delay from, for example, obtaining such position and rotation data from the universe browser engine 106A.

In addition to returning the latest position and rotation data (114A) to the website 102A, the browser engine 104A may transmit the position and rotation data (110A) either alone or together with a rendered web page to the universe browser engine 106A. The universe browser engine 106A creates or identifies a prism (or a smaller, virtual 3D volume thereof) based in part or in whole on the position and rotation data received via 110A; and the universe browser engine 106A synchronizes the position and rotation data (116A) with the browser engine (104A). The universe browser engine 106A may call the browser engine 104A to invoke its native functions, libraries, and/or APIs (e.g., RenderWidget, OpenGL APIs, OpenGL ES 2.0 APIs, etc. in Chromium or WebKit, Almost Native Graphics Layer Engine, Direct3D APIs, WebGL, Gfx API's, etc., or any combinations thereof) to render the contents of a webpage for display in the prism or a portion thereof based on the position and rotation data.

In some embodiments, the universe browser engine may invoke one or more 3D engines running above the operating system core and the operating system services in the operating system stack to render 3D contents. These one or more 3D engines may include commercially or publicly available 3D engines (e.g., Unreal Engine 4, Unreal Engine 3, CryEngine V, Unity 3D, Source Engine, Source Engine 2, etc.) that provide an abstraction layer of the graphics processing unit (GPU), any custom 3D engines for 3D and/or 2D graphics. In some of these embodiments, a mixed reality system needs not incorporate the entire 3D engine. Rather, the mixed reality system may incorporate a smaller portion such as a rendering engine or rendering APIs, a physics engine for emulating the laws of physics, a scripting engine for parsing and executing scripts such as JavaScript scripts, a memory management module, and/or a threading module, etc. In some embodiments, a mixed reality system described herein may invoke a renderer for rendering 2D contents and a separate renderer for rendering 3D graphics.

The user may further alter the position and/or rotation of the webpage displayed in the virtual 3D space through the mixed reality system. For example, a user may freely move and/or rotate the displayed webpage, a placeholder therefor, or a mini-preview version of the webpage by grabbing the software handles that are respectively associated with positioning and rotating the displayed webpage, a placeholder therefor, or a mini-preview version of the webpage. The position and/or rotation data of the web page is thus modified; and the universe browser engine 106A may further synchronize (116A) the position and/or rotation data with the browser engine 104A. Once the browser engine 104A then replaces the original position and/or rotation data with this modified position and/or rotation data.

Figure 1B:
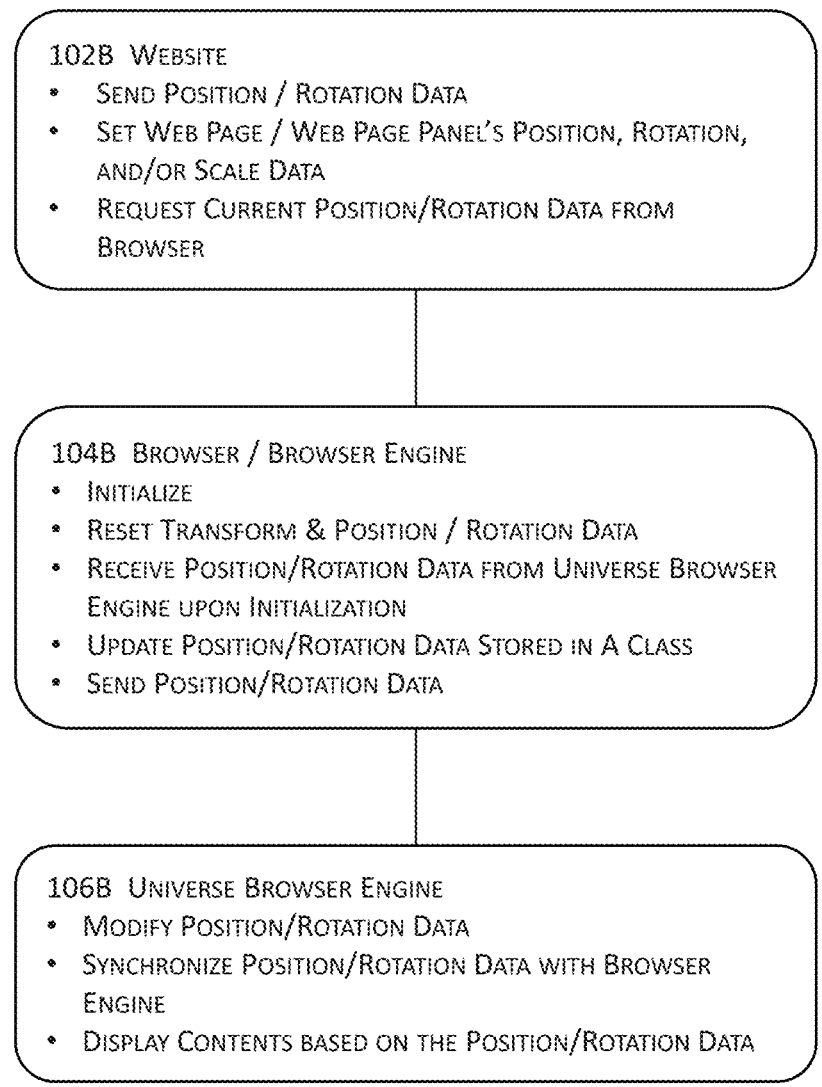
FIG. 1B illustrates another high-level block diagram of a simplified system that interacts with a website for managing and displaying web pages and web resources in a three-dimensional virtual space with a mixed reality system in one or more embodiments.

FIG. 1B illustrates another high-level block diagram of a simplified system that interacts with a website for managing and displaying web pages and web resources in a three-dimensional virtual space with a mixed reality system in one or more embodiments. More particularly, FIG. 1B illustrates the interactions between a browser panel for a web page 102B, a browser engine 104B, and a universe browser engine 106B as well as respective tasks and functions performed by the browser 102B, the browser engine 104B, and the universe browser engine 106B in some embodiments. A browser or web browser is a software application for accessing information on the World Wide Web where web resources (e.g., individual web pages, images, videos, etc.) are identified by Uniform Resource Locators to enable the web browser to retrieve these web resources from web servers and display them on a user's device. A browser engine is a software component of a web browser that performs tasks such as transforming HTML and/or other resources of a web page into an interactive visual representation on a user's device (e.g., a mixed reality headset). Various embodiments described herein leverage any publicly or commercially available browsers and their respective engines for developers and users to manage and display Internet contents and to utilize web resources by using at least the aforementioned set of APIs, a mixed reality system, and the software applications and libraries (e.g., a universe browser engine).

The website may set the position, rotation, and/or scale data for the web page of interest or the panel of the web page (102B) and may further request the current position, rotation, and/or scale of a current web page (102B). In some embodiments where the developer of a web page may have desired to present the web page of interest in a certain manner including certain position, rotation, and/or scale data, the website may further send such position, rotation, and/or scale data to the browser (102B)

In some embodiments, when a browser is launched for displaying contents from the Internet, the browser initializes to render and display a web page or contents therein of a website (104B). The browser may also send the position and rotation data of the web page to be rendered by the browser engine (104B). For example, when the website is coded to incorporate the aforementioned set of APIs that are coded to both set the position and rotation data to a client's browser and to obtain the position and rotation data from the client browser, the browser may receive this position and rotation data from the website and set the position and rotation data for the web panel for displaying the contents from the website.

The browser may reset the transform(s), the position data, and/or the rotation data for the web panel for the web page (104B). For example, the browser may reset the 3D transform(s) (e.g., 3D translation transform(s), 3D rotation transform(s), and/or 3D scaling transform(s)) for the web page panel to default value(s) or state(s). The default value(s) or state(s) may be stored in a non-transitory memory (e.g., cache memory) accessible by the renderer (e.g., RenderWidget for WebKit and Chromium) in one embodiment. The browser may relay a position and/or rotation request from the website to its browser engine (104B). A browser engine acts as an intermediary between a website and a universe browser engine residing in a mixed reality system. In some embodiments where the position and rotation data of the web page panel is stored in the aforementioned non-transitory memory, the browser or its browser engine may respond quickly to the position and/or rotation request from the website, without additional delay from, for example, obtaining such data from the universe browser engine. This position and rotation data accessible by the browser engine may be synchronized when a website or a browser changes the data or a portion thereof. In addition or in the alternative, this position and rotation data accessible by the browser engine may be initialized and reset by the browser. In some embodiments, this position and rotation data may be updated by a website's request (see 102B) for position and rotation data. In some embodiments where the browser engine receives the position and/or rotation data from the website, the browser engine may further pass the data to the browser.

The browser may also send position and rotation data to the universe browser engine (104B) either alone or together with the rendered contents (e.g., a web page). The universe browser engine may create a 3D virtual volume (e.g., a prism) having a virtual boundary in a virtual 3D space that may correspond to a real-world 3D space for displaying the rendered webpage based at least in part upon the position and rotation data from the browser engine. In addition or in the alternative, some embodiments may provide users with the capability to manipulate a rendered webpage (or contents) in a virtual 3D space created by a mixed reality system.

The user may thus move and/or rotate the rendered webpage in the virtual 3D space so that a new set of transform(s) need to be applied to the rendered webpage. The operation system of the mixed reality system may include the runtime layer and a 3D engine to apply the new set of transform(s) to the rendered webpage based at least in part upon the position and rotation data received from the browser engine. After the new set of transform(s) is applied, the universe browser engine may also communicate the new position and rotation data back to the browser engine (at 106B) to update the previous position and rotation data therein.

When the browser initializes or when a user manipulates a rendered web page and hence changes the position and/or rotation data, the browser engine may receive the position and rotation data, if available, from the universe browser engine (at 104B). The browser engine may thus update the position and/or rotation data stored in a non-transitory memory (e.g., cache) with the refreshed position and/or rotation data received from the universe browser engine (at 104B) and stored in, for example, the cache memory. The browser engine may also set the position and rotation data for the web page panel (at 104B). In an example where the developer of a web page has set the position and rotation of a web page (e.g., the developer has set the rotation of a web page displaying an online chess game), the browser may also set the position and rotation data of the web page panel according to the position and rotation data received from the website.

In addition, the browser engine may send the position and rotation data to the universe browser engine (at 104B) so that the universe browser engine may determine (e.g., by creating anew or identifying from existing) a virtual 3D space (e.g., a prism) for presenting the rendered web page via a mixed reality system. In some embodiments where the user is provided with the capability to further manipulate the rendered web page, the browser engine may provide the position and rotation data of a rendered web page to the universe browser engine which, in turn, provides the software handles for the user to manipulate the rendered web pages and performs the corresponding transform(s) to respond to the user's manipulation.

A universe browser engine also includes or functions in conjunction with the operating system, the operating system services, a set of runtime applications and libraries, one or more 3D engines, and a suite of applications of a mixed reality system to provide an advanced graphical user interface and functionality for a user to manage and display web pages and other contents and/or resources in a virtual 3D space (e.g., one or more prisms) at 106B. For example, one of the functions of a universe browser engine is to provide position and rotation data of a web page (or other virtual contents) to the browser engine (at 104B). The universe browser engine also synchronizes (at 106B) the most recent position and/or rotation data with the browser engine so that the most recent position and/or rotation data may be pushed (from the universe browser engine) to the browser engine or pulled (by the browser engine) from the universe browser engine.

Figure 1C:
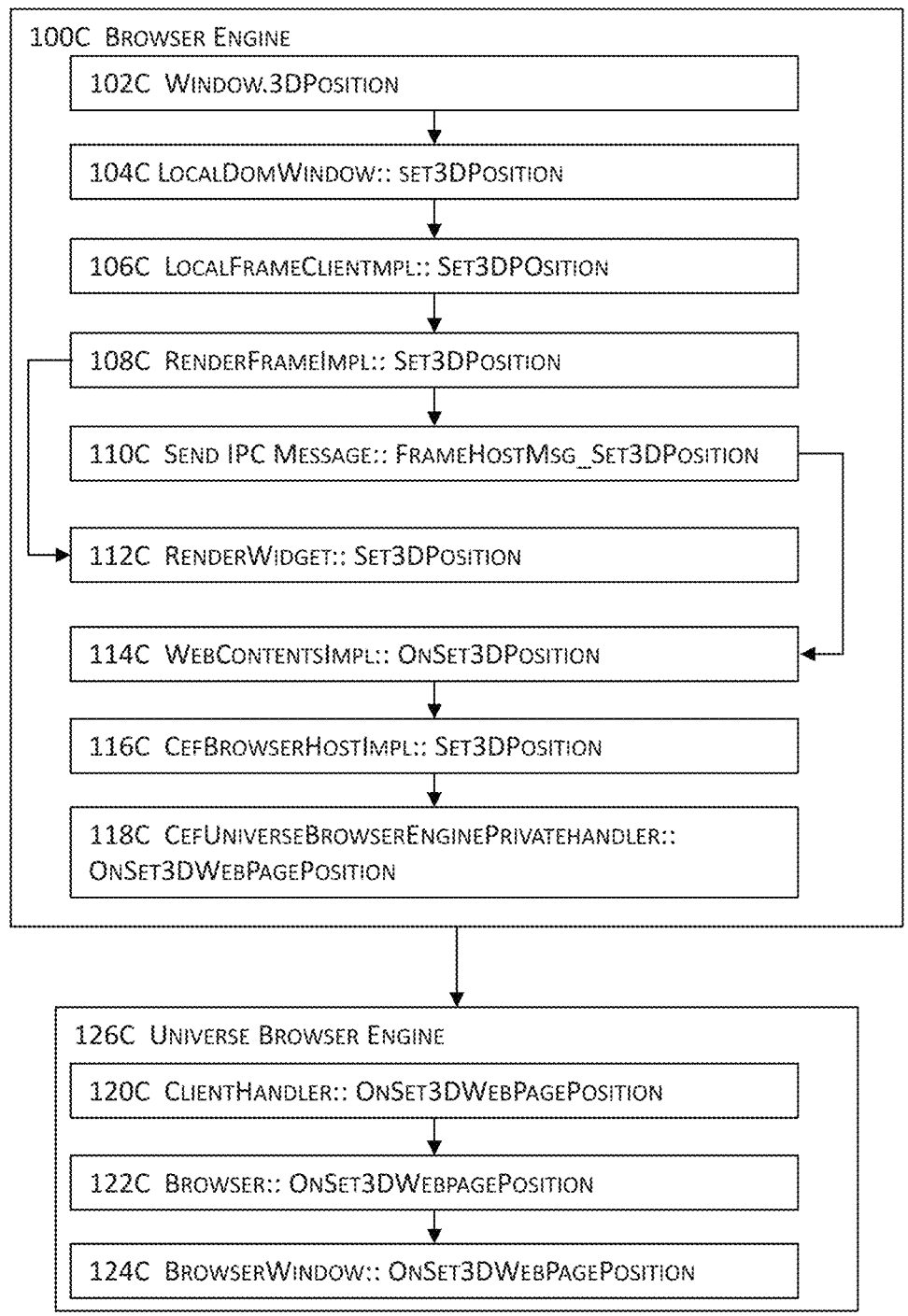
FIGS. 1C-1E illustrate more detailed block diagrams for an example browser engine and a universe browser engine that may be used in managing and displaying web pages and web resources in a three-dimensional virtual space with a mixed reality system in one or more embodiments.
Figure 1D:
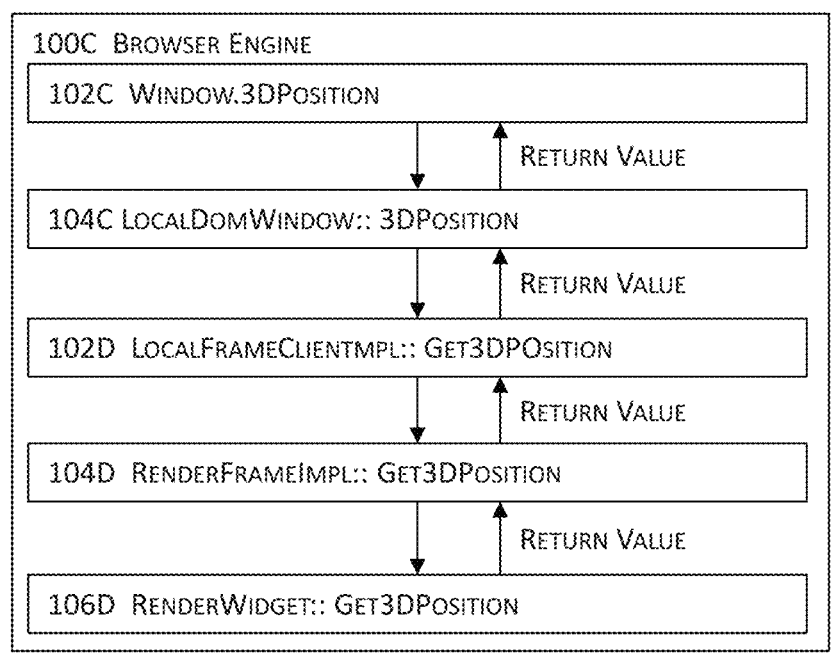
Figure 1E:
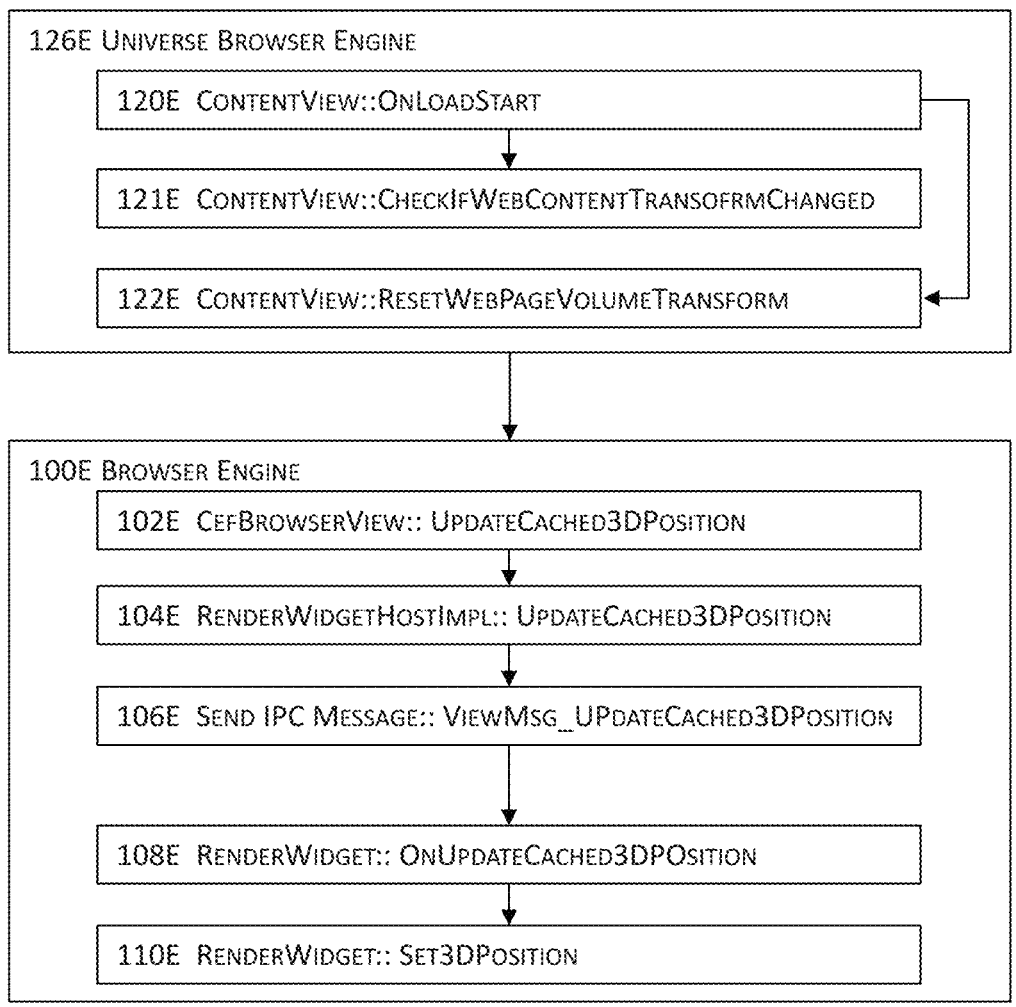

FIGS. 1C-1E illustrate more detailed block diagrams for an example browser engine and a universe browser engine that may be used in managing and displaying web pages and web resources in a three-dimensional virtual space with a mixed reality system in one or more embodiments. More specifically, FIG. 1C illustrates simplified, pseudo code for setting the 3D position and/or rotation data of a web page panel in a virtual 3D space (e.g., a prism) in some embodiments. In these embodiments, the pseudo code is based on a similar set of code for Chromium although the code for other web browsers is also contemplated, and the techniques described herein can be applied with full, equal effects.

For example, a browser engine 100C may execute Window.VirtualWorld.3DPosition and/or Window.VirtualWorld.3DRotation at 102C to initialize the process for setting the 3D position and/or rotation data of a web page panel in a universe browser engine. Window.VirtualWorld.3DPosition and Window.VirtualWorld.3DRotation may utilize, for example, OpenGL Mathematics (GLM) (or any other mathematics libraries) to set and obtain the position data (e.g., by the pseudo code "glm::vec3 old_pos(0.0f)", "glm::quat rotation (glm::vec3(0.0f))", "glm::vec3 scale(1.0f)", and "glm::mat4 transform=web_container_→getCurrentVolumeTransform( )") as well as the rotation data (e.g., by the pseudo code "glm::vec3 position(0.0f)", "glm::quat old_rot(glm::vec3(0.0f))", "glm::vec3 scale(1.0f)", and "glm::mat4:transform=web_container_→getCurrentVolumeTransform( )") of a web page panel based in part or in whole on the 3D position data, the 3D rotation data, the scale, and one or more transforms for 2D and 3D entities in a 2D or 3D space. It shall be noted that the pseudo-code, the programming language, and the names of various classes, variables, etc. are used in this application for illustration and explanation purposes, and that any other suitable programming language(s), names, etc. serving identical or substantially similar purposes are also contemplated and may also be used to achieve such purposes.

The browser engine 100C may further execute VirtualWorld::Set3DPosition at 104C for setting and obtaining position data and/or rotation data (not shown) of a web page panel, where VirtualWorld is a class in Blink (browser engine for Chromium) for frames that are in-process. It shall be noted that FIG. 1C illustrates the example of setting and determining position data but not rotation data, and that setting and determining rotation data may be done in an identical or substantially similar manner with the corresponding code. In some embodiments, the browser engine may also include the RemoteDomWindow class (which does not have a document object or widget) for the proxies that reside in other renderer processes. The construct VirtualWorld::3DPosition may uses, for example, a low-level graphics abstraction layer such as Gfx (a simple graphics library for CSE20211) or Gfx-rs (e.g., via "gfx::Point3f pos(x-coordinate, y-coordinate, z-coordinate)", "gfx::Point3f rot(x-rotation, y-rotation, z-rotation)", gfx::Point3F rot=local_frame_client→GetVirtualWorldRotation( ), or gfx::Point3F flat_rot{-M_P1_2, 0.0 f, 0.0f}, etc.) to obtain and set the position and/or rotation data.

The browser engine 100C may further execute the LocalFrameClientImpl::Set3DPosition (106C), RenderFrameImpl:Set3DPosition (108C), and send an inter-process communication (IPC) message—FrameHostMsg_Set3DPosition. The construct RenderFrameImpl:Set3DPosition may be used to call RenderWidget::Set3DPosition and to send IPC messages. The construct LocalFrameClientImpl::Set3DPosition is derived from the C++ LocalFrameClientImpl.cpp and uses, for example, a low-level graphics abstraction layer such as Gfx or Gfx-rs as well as the position and rotation data to set and obtain the position and/or rotation for a client frame. LocalFrameClientImpl::Set3DPosition may be implemented to obtain and set the position and rotation data of a web page panel with the following pseudo code:

```
void LocalFrameClientImpl::Set3DPosition(const gfx::Point3F&
position) {
    if (web_frame_->Client( ))
        web_frame_->Client( )->Set3DPosition(position);
}
void LocalFrameClientImpl::Get3DPosition(const gfx::Point3F&
position) {
    if (web_frame_->Client( ))
        web_frame_->Client( )->Get3DPosition(position);
}
void LocalFrameClientImpl::Set3DRotation(const gfx::Point3F&
rotation) {
    if (web_frame_->Client( ))
        web_frame_->Client( )->Set3DRotation(rotation);
}
void LocalFrameClientImpl::Get3DRotation(gfx::Point3F* rotation) {
    if (web_frame_->Client( ))
        web_frame_->Client( )->Get3DRotation(rotation);
}
```

The construct RenderFrameImpl::Set3DPosition is derived from the C++ RenderFrameImpl.cpp and is configured to invoke the renderer (e.g., RenderWidget for Chromium-based browsers) based on Gfx and the position and/or rotation data and pass the frame back to the browser engine (e.g., Blink for Chromium-based browsers). The browser engine 100C may also invoke the renderer by executing RenderWidget::Set3DPosition at 112C to "paint" or render the content of the web page of interest according to the 3D position and rotation data (e.g., position and rotation data set by the developer of the web page). More particularly, the renderer process, RenderWidget, may use a glue interface (e.g., WebWidgetDelegate) and implements the abstract interface in the glue interface. This abstract interface may include, for example, a 2D window or 3D volume in the display space to receive input events and to render contents into. In some of these embodiments where auxiliary display items (e.g., a selection box with up/down arrows showing a list of options, a tab, a pop-up window, navigation commands, etc.) are to be rendered, the browser engine 100C may further execute another render process (e.g., RenderView) for such display items.

In some embodiments where a Chromium or Chromium-based browser is used, the browser engine 100C uses its rendering system ("views") to render web pages where the user interface is constructed as a tree of components called "views" that are responsible for rendering, layout, and event handling. Each view in a tree of components has its own bounds and represents a different component of the user interface; and a widget (a native 2D window or 3D volume) is located at the root of such a tree. Some embodiments create a virtual 3D space (or a 2D window) with the position and position data and passes the virtual 3D space (or 2D window) to the RootView and then propagate events into the tree. Some display items may be rendered using the operating system's controls that are hosted in a special kind of view that knows how to display and size a native widget. These display items include, for example, buttons, tables, radio buttons, checkboxes, text fields, other controls, etc. More details about such trees of components are described below with reference to FIGS. 2G-2I.

The browser engine further executes WebContentsImpl::OnSet3DPosition (114C), CefBrowserHostImpl::Set3DPosition (116C) that uses "delegate_→Set3DPosition (position)" and "delegate_→Set3DPosition(position)" based at least in part on the position and rotation data. The browser engine further executes CefUniverseBrowserEnginePrivateHandler::OnSet3DWebPagePosition (118C) with a universe browser engine specific interface that allows for custom interactions between CEF (Chromium Embedded Framework) and the universe browser engine. A CEF-based application may include components such as an entry point to initialize CEF and run the CEF message loop, a CEFApp derived class to handle process-specific callbacks, a CEFClient derived class to handle browser-instance-specific callbacks (e.g., callbacks for browser lifespan, context menus, dialogs, display notifications, drag events, focus events, keyboard events, etc.), one or more CEFBrowser instances created by CefBrowserHost::CreateBrowser( ) etc.

The browser engine 100C may further execute the construct CefBrowserHostImpl::Set3DPosition (116C) and CefBrowserHostImpl::Set3DRotation to determine the handler (e.g., with "CefRefPtr<CefUniverseBrowserEnginePrivateHandler>handler=client_→GetUniverseBrowserEnginePrivateHandler( )" and "handler→OnSetVirtualWebPagePosition(this, position.x( ) position.y( ) position.z( ) )", "handler→OnSetVirtualWebPageRotation(this, rotation.x( ) rotation.y( ) rotation.z( ) )"). The browser engine may also execute the public function CefUniverseBrowserEnginePrivateHandler::OnSet3DWebPagePosition and CefUniverseBrowserEnginePrivateHandler::OnSet3DWebPageRotation to set the 3D position and rotation of a web page panel.

The universe browser engine 126C may execute ClientHandler:OnSet3DWebPagePosition and ClientHandler::OnSet3DWebPageRotation (120C), Browser::OnSet3DWebPagePosition, and Browser::OnSet3DWebPageRotation (122C), and BrowserWindow::OnSet3DWebPagePosition and BrowserWindow::OnSet3DWebPageRotation (124C) with the 3D position and rotation data received from the browser engine 100C. ClientHandler includes an event handler that runs in the browser without needing a call back to the server to provide a means to define rules (e.g., declarative conditions and actions that may be evaluated in the browser to reduce roundtrip delay or latencies. ClientHandler may also use GLM (OpenGL Mathematics) and delegate to set the web page position and rotation in the virtual 3D space (e.g., a prism).

FIG. 1D illustrates the communications between some of the aforementioned blocks in FIG. 1C to illustrate how to obtain, at the browser engine 100C, the 3D position and/or rotation data in the virtual 3D space (e.g., a prism) from the universe browser engine 126C. The downward arrowheads indicate the sequence of execution and/or passing of execution results; and the upward arrowheads indicate the returns of values.

In these embodiments, a browser engine 100C may execute Window.VirtualWorld.3DPosition and/or Window.VirtualWorld.3DRotation at 102C to initialize the process for setting the 3D position and/or rotation data of a web page panel in a universe browser engine in a similar manner as that described with reference to FIG. 1C above. Moreover, the browser engine 100C may further execute VirtualWorld::Set3DPosition at 104C for setting and obtaining position data and/or rotation data (not shown) of a web page panel, where VirtualWorld is a class which represents one of the platform's XR devices. It shall be noted that FIG. 1D illustrates an example of setting and determining position data but not rotation data, and that setting and determining rotation data may be done in an identical or substantially similar manner with the corresponding code.

Unlike the browser engine 100C illustrated in FIG. 1C, the browser engine 100C in FIG. 1D may further execute the LocalFrameClientImpl::Get3DPosition (102D) and RenderFrameImpl:Set3DPosition (104D). Like the description of FIG. 1C, the construct RenderFrameImpl:Get3DPosition may be used to call RenderWidget::Get3DPosition and to send IPC message(s) and/or to return value(s) to VirtualWorld::3D Position to return the position and/or orientation data. The construct LocalFrameClientImpl::Get3DPosition, like LocalFrameClientImpl::Get3DPosition in FIG. 1C, may be derived from the C++ LocalFrameClientImpl.cpp and uses, for example, a low-level graphics abstraction layer such as Gfx or Gfx-rs as well as the position and rotation data to set and obtain the position and/or rotation for a client frame.

Like the RenderWidget::Set3DPosition in FIG. 1C, the browser engine 100C may also invoke the renderer by executing RenderWidget::Get3DPosition at 106D return position and/or orientation data (e.g., the position and/or orientation data of a webpage) to RenderFrameImpl::Get3DPosition (104D) and further to "paint" or render the content of the web page of interest according to the 3D position and rotation data (e.g., position and rotation data set by the developer of the web page). In some embodiments, the renderer process, RenderWidget, may use a glue interface (e.g., WebWidgetDelegate) and implements the abstract interface in the glue interface. This abstract interface may include, for example, a 2D window or 3D volume in the display space to receive input events and to render contents into. In some of these embodiments where auxiliary display items (e.g., a selection box with up/down arrows showing a list of options, a tab, a pop-up window, navigation commands, etc.) are to be rendered, the browser engine 100C may further execute another render process (e.g., RenderView) for such display items.

FIG. 1E illustrates a simplified block diagram with pseudo code for synchronizing the 3D position and rotation data between the browser engine and the universe browser engine in some embodiments. For example, a web page in the virtual 3D space may be modified (e.g., by a user who moved and rotated the web page in the virtual 3D space). The block diagram in FIG. 1E illustrates how the most recent 3D position and rotation data of the web page is synchronized between the browser engine 100E and the universe browser engine 126E. FIG. 1E may also illustrate the embodiments where the universe browser engine 126E sends the position and rotation data to the browser engine 100E upon the initialization of the browser.

As illustrated in FIG. 1E, the universe browser engine 126E, when initialized (120E) or upon receiving modified 3D position and/or rotation data of a web page (not shown), may reset the transform(s) of the web page volume, the rendered browser, and/or the prism (122E). The 3D position and rotation data are then passed to the browser engine 100E where the browser engine 100E executes CefBrowserView::UpdateCached3DPosition and CefBrowserView::UpdateCached3DRotation (102E). The browser engine 100E further executes RenderWidgetHostImpl::UpdateCached3DPosition and RenderWidgetHostImpl::UpdateCached3DRotation to update the position and/or rotation data with the most recent position and/or rotation data from the universe browser engine 126E.

In some embodiments, the universe browser engine 126E may also check whether the Web content transform has been changed at 121E. The universe browser engine 126E may execute the following example code/pseudo code to determine whether the Web content transform has been changed with the corresponding class definition in the header file—"void CheklfWebContentTransformChanged( )".

```
void WebContentsView::CheckIfWebContentTransformChanged( ) {
    if (!cef_window_) {
        return;
    }
    auto diff = web_contents_node_->getCurrentVolumeTransform( ) -
            web_contents_node_transform_;
    const glm::mat4::value_type* pDiff =
        static_cast<const glm::mat4::value_type*>(glm::value_ptr(diff));
    for (int i = 0; i < 16; ++i) {
        if (std::abs(pDiff[i]) > 0.0001f) {
                web_contents_node_transform_ =
                    web_contents_node_->getCurrentVolumeTransform( );
                cef_window_->WebContentTransformChanged( );
                return;
        }
    }
    return;
}
```

In the above example, if the "cef_window" does not exist, some embodiments retain uninitialized values of a transform without performing additional operations. Furthermore, the code segment "if (std::abs(pDiff[i])>0.0001f) . . . " indicates a conditional statement to determine whether the pertinent transform has changed significantly.

The universe browser engine may determine whether the cursor position acknowledge by the system (e.g., an AR system) is the same as or different from the actual cursor position and to update the stage and the 3D volume in the virtual three-dimensional space with the class definition "virtual void UpdateLoop (float/*delta*/);".

```
void BrowserWindowBase::UpdateLoop(float /* delta */) {
    if (cursor_manager_ != nullptr) {
        cursor_manager_->UpdateCursorPosition( );
    }
    content_view_->CheckIfWebContentTransformChanged( );
}
```

In some embodiments, a threshold value may be determined for "delta" so that no update will be performed when the discrepancy between the aforementioned two cursor positions is below the threshold value. Some embodiments pool for node transform changes with "content_view_→CheckIfWebContentTransformChanged( )" to update the stage and the detached volume positions.

The browser engine 100E further sends IPC (inter-process communication) message(s) (e.g., ViewMsg_UpdateCached3DPosition, ViewMsg_UpdateCached3DRotation, etc.) and execute RenderWidget:OnUPdateCached3D Position and RenderWidget:OnUPdateCached3DRotation (108E) as well as RenderWidget::Set3DPosition and RenderWidget:: Set3DRotation (110E).

In some embodiments, the universe browser engine 126E may store the 3D position and rotation data in a non-transitory computer readable medium (e.g., cache memory) accessible by the browser engine 100E. The universe browser engine 126E and the browser engine 100E are thus synchronized every time when a web page panel's position and/or rotation in the virtual 3D space is modified. In order to initialize and reset the position and rotation variables in RenderWidget, every time when the web page starts loading, the web page panel's transform(s) may be reset to default, and stored values in RenderWidget will be updated as well.

Figure 1F:
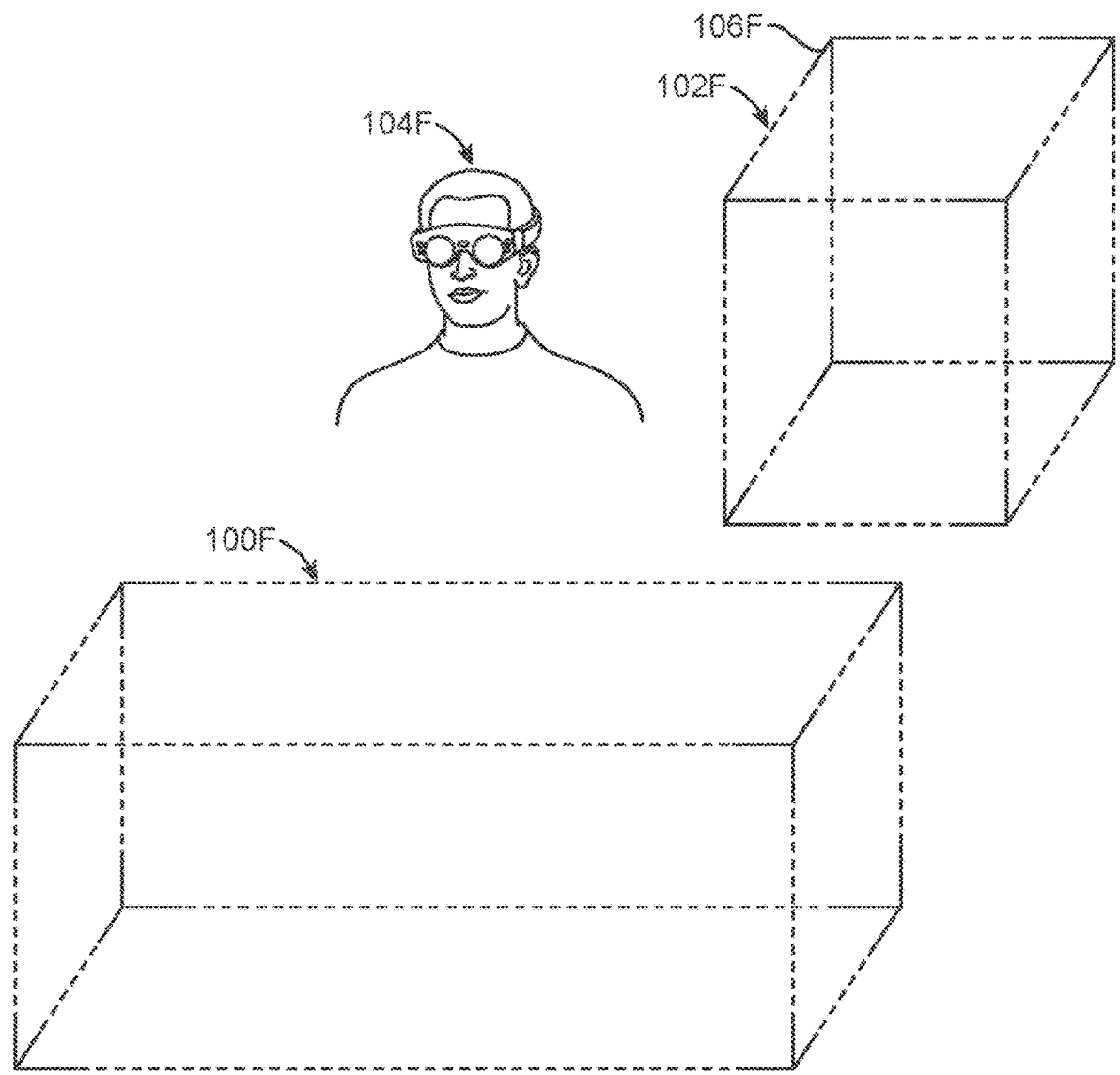
FIG. 1F illustrates an example of universe browser prisms in one or more embodiments.

FIG. 1F illustrates a simplified example of universe browser prisms in one or more embodiments. In this example, two universe browser prisms (or simply prisms) 100F and 102F are created in a virtual 3D space for a user 104F wearing a mixed reality device. It shall be noted that although prisms 100F and 102F appear to be rectangular prisms, a prism may be of any shapes and sizes (e.g., cylinder, cube, sphere, tetrahedron, etc. or even irregular 3D volumes).

A prism is a three-dimensional volumetric space that virtual content is rendered and displayed into. A prism exists in a virtual 3D space provided by an extended reality system, and the virtual 3D space provided by an extended reality system may include more than one prism in some embodiments. In some embodiments, the one or more prisms by be placed in the real world (e.g. user's environment) thus providing one or more real world locations for the prisms. In some of these embodiments, the one or more prisms may be placed in the real world relative to one or more objects (e.g., a physical object, a virtual object, etc.), one or more two-dimensional surface (e.g., a surface of a physical object, a surface of a virtual object, etc.), and/or one or more one-dimensional points (e.g., a vertex of a physical object, a surface of a virtual object, etc.) In some embodiments, a single software application may correspond to more than one prism. In some embodiments, a single application corresponds to a single prism.

In some embodiments, a prism may represent a sub-tree of a multi-application scene graph for the current location of a user of an extended reality system in some embodiments. Retrieving the one or more prisms previously deployed at the current location of a user may comprise retrieving instance data for the one or more prisms, from an external database for example (e.g., a database storing a passable world model in a cloud environment), and reconstructing a local database (e.g., an internal passable world model database that comprises a smaller portion of the passable world model stored externally) with the instance data for the one or more prisms.

In some of these embodiments, the instance data for a prism includes a data structure of one or more prism properties defining the prism. The prism properties may comprise, for example, at least one of a location, an orientation, an extent width, an extent height, an extent depth, an anchor type, and/or an anchor position. In addition or in the alternative, the instance data for a prism may include key value pairs of one or more application specific properties such as state information of virtual content previously rendered into a prism by an application. In some embodiments, data may be entirely stored locally so that an external database is not needed.

A prism includes a 3D bounded space with a fixed and/or adjustable boundary upon creation in some embodiments although degenerated 3D prisms having a lower dimensionality are also contemplated. A prism, when generated, may be positioned (e.g., by a universe browser engine or an instance thereof) in the virtual 3D space of an XR system and/or a location in the user's environment or anywhere else in the real world. The boundary of a prism may be defined by the system (e.g., a universe browser engine), by a user, and/or by a developer of a Web page, based at least in part upon the size or extents of the content that is to be rendered within the prism. In some embodiments, only an XR system (e.g., a universe browser engine thereof) may create and/or adjust the boundary of a prism on the XR system. The boundary of a prism may be displayed (e.g., in a graphically deemphasized manner) in some embodiments. In some other embodiments, the boundary of a prism is not displayed.

The boundary of a prism defines a space within which virtual contents and/or rendered contents may be created. The boundary of a prism may also constrain where and how much a web page panel may be moved and rotated in some embodiments. For example, when a web page panel is to be positioned, rotated, and/or scaled such that at least a portion of the web page panel will be outside the prism, the system (e.g., a universe browser engine) may prevent such positioning, rotation, and/or scaling.

In some embodiments, the system may position, rotate, and/or scale the web page panel at the next possible position that is closest to or close to the original position, rotation, or scale in response to the original positioning, rotation, or scaling request in some embodiments. In some of these embodiments, the system may show a ghost image or frame of this next possible position, rotation, or scale and optionally display a message that indicates the original position, rotation, or scale may result in at least a portion of the web page panel being outside a prism.

Applications may render graphics into a prism via, at least in part, a universe browser engine. In some embodiments, a universe browser engine renders scene graphs and/or has full control over the positioning, rotation, scale, etc. of a prism. Moreover, a universe browser engine may provide the ability to attach one or more prisms to physical objects such as a wall, a surface, etc. and to register a prism with a passable world that may be shared among a plurality of XR system users described herein.

In addition or in the alternative, a universe browser engine may control sharing of contents between the plurality of XR system users. In some embodiments, a universe browser engine may also manage a prism. For example, a universe browser engine may create a prism, manage positioning and/or snapping rules relative to one or more physical objects, provide user interface controls (e.g., close button, action bar, navigation panel, etc.), keep track of records or data of a prism (e.g., what application owns or invokes which prism, where to place a prism, how a prism is anchored—body centric, world fixed, etc.)

In some embodiments, prism behavior may be based in part or in whole upon one or more anchors. In some embodiments, prism behaviors may be based, in part, on positioning, rotation, and/or scaling (e.g. user placement of web page content or the prism itself through a user interaction, a developer's positioning, rotation, and/or scaling of a web page panel, etc.) and/or body dynamics (e.g. billboard, body centric, lazy headlock, etc.) A prism may move within a 3D virtual space in some embodiments. In some of these embodiments, a universe browser engine may track the movement of a prism (e.g., billboarding to user/body-centric, lazy billboarding, sway when move, collision bounce, etc.) and manage the movement of the prism.

In addition or in the alternative, a prism including a browser, web page panels, and any other virtual contents, may be transformed in many different ways by applying corresponding transforms to the prism. For example, a prism can be moved, rotated, scaled, and/or morphed in the virtual 3D space. In some embodiments, a set of transforms is provided for the transformation of web pages, web page panels, browser windows, and prisms, etc. In some embodiments, a prism may be created automatically having a set of functionalities. The set of functionalities may comprise, for example, a minimum and/or maximum size allowed for the prism, and/or an aspect ratio for resizing the prism in some embodiments. The set of functionalities may comprise an association between a prism to the object (e.g., a virtual object, a physical object, etc.) in the virtual or physical 3D spatial environment. Additional virtual contents may be rendered into one or more additional prisms, wherein each virtual content may be rendered into a separate prism in some embodiments or two or more virtual contents may be rendered into the same prism in some other embodiments.

A prism may be completely transparent and thus invisible to the user in some embodiments or may be translucent and thus visible to the user in some other embodiments. Unlike conventional web pages that are displayed within a browser window, a browser window may be configurable (e.g., via the universe browser engine) to show or hide in the virtual 3D space. In some embodiments, the browser window may be hidden and thus invisible to the user, yet some browser controls (e.g., navigation, address bar, home icon, reload icon, bookmark bar, status bar, etc.) may still be visible in the virtual 3D space to the user. These browser controls may be displayed to be translated, rotated, and transformed with the corresponding web page in some embodiments or may be displayed independent of the corresponding web page in some other embodiments.

In some embodiments, a prism may not overlap with other prisms in a virtual 3D space. A prism may comprise one or more universal features to ensure different software applications interact appropriately with one another, and/or one or more application-specific features selected from a list of options.

In some embodiments, the vertices (106F) of the prism may be displayed in a de-emphasized manner (e.g., reduced brightness, etc.) to the user so that the user is aware of the confines of the prism within which a virtual object or a rendered web page may be translated or rotated. In some embodiments where, for example, a web page or a web page panel is translated or rotated so that a portion of the web page or a web page panel falls outside of the confines defined by the prism, the system may nevertheless display the remaining portion of the web page or the web page panel that is still within the prism, but not display the portion of the web page that falls outside the confines of the prism. In some other embodiments, the mixed reality system confines the translation, rotation, and transformation of a web page or a web page panel so that the entire web page or web page panel can be freely translated, rotated, or transformed, yet subject to the confines of the boundaries of the prism.

As illustrated in FIG. 1F, a virtual 3D space may include one or more prisms. Furthermore, a prism can also include one or more other prisms so that the prism may be regarded as the parent of the one or more other prisms in some embodiments. In some of these embodiments, a prism tree structure may be constructed where each node represents a prism, and the edge between two connected nodes represents the parent-child relationship between these two connected nodes. Two prisms can be moved in such a way to overlap one another or even to have one prism entirely included within the other prism. The inclusive relation between two prisms may or may not indicate that there is a parent child relationship between these two prisms, although the mixed reality system can be configured for a user to specify a parent-child relationship between two prisms. Furthermore, a first prism may or may not have to be entirely included in a second prism in order for a parent-child relationship to exist. In some embodiments, all child prisms inherit the transforms, translation, and rotation that have been or are to be applied to the parent prism so that the parent prism and its child prisms are transformed, translated, and rotated together.

Figure 1G:
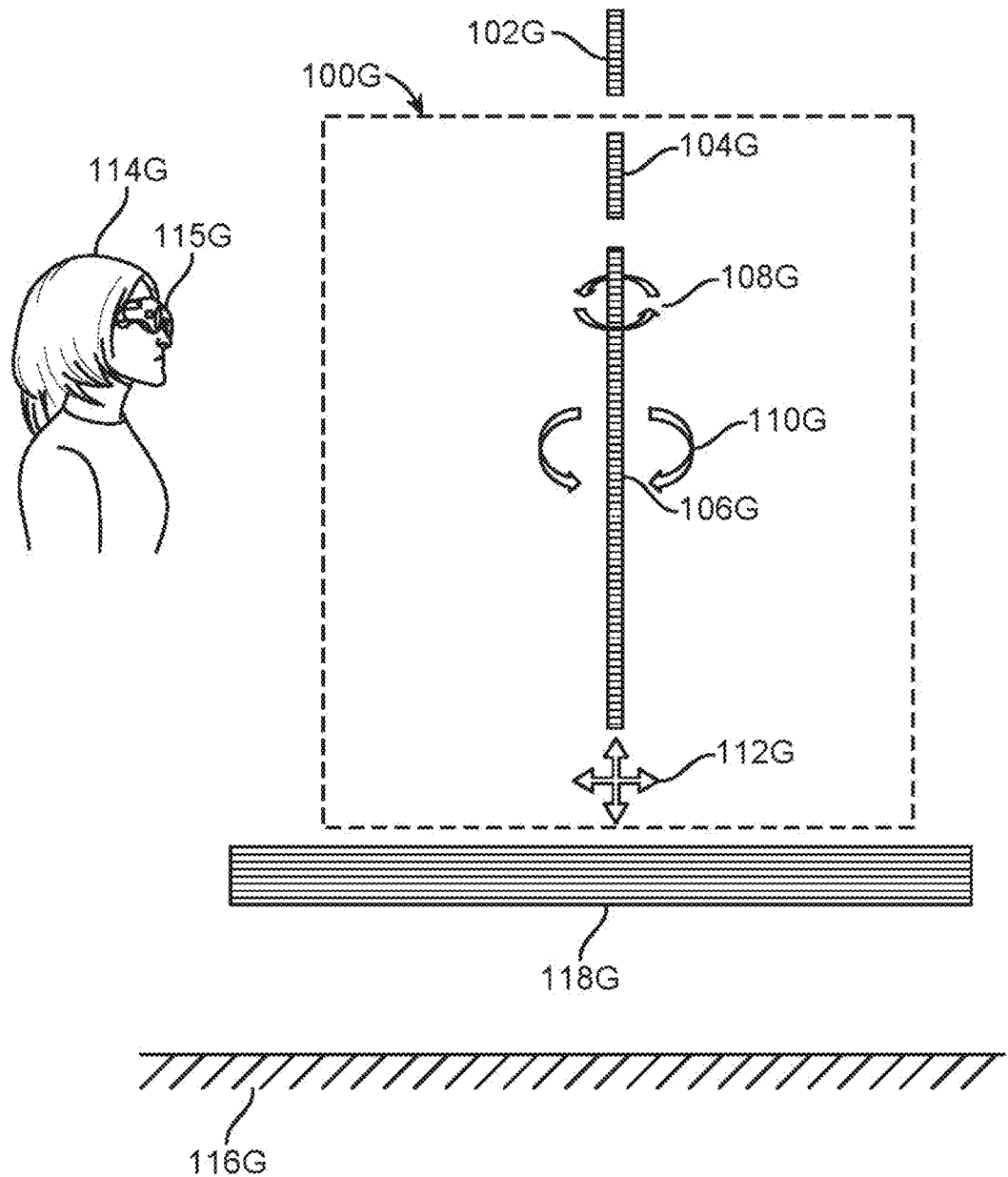
FIGS. 1G-1I illustrate the projected views of some simplified examples of managing and displaying web pages and web resources in a three-dimensional virtual space with a mixed reality system in some embodiments.
Figure 1H:
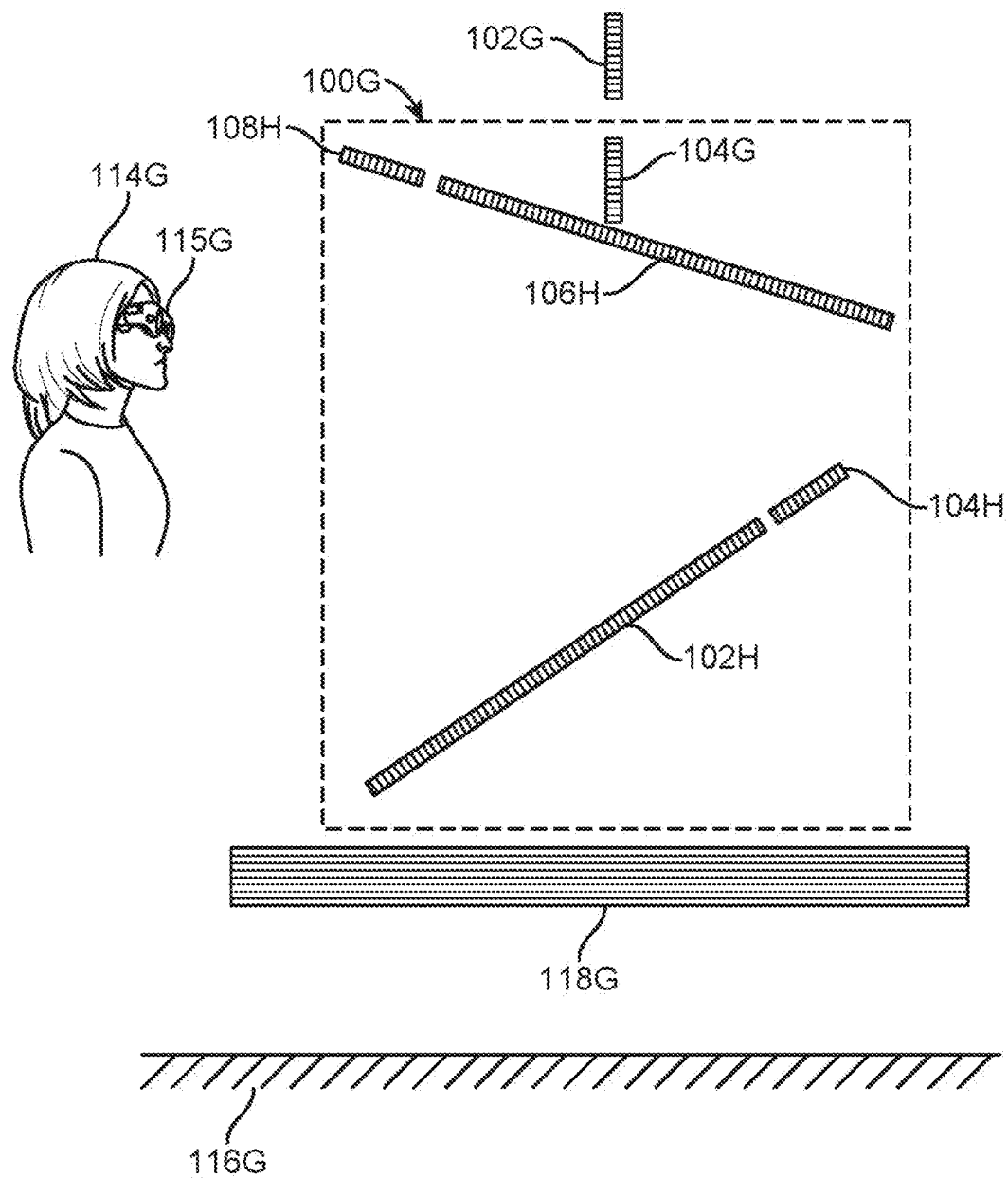
Figure 1I:
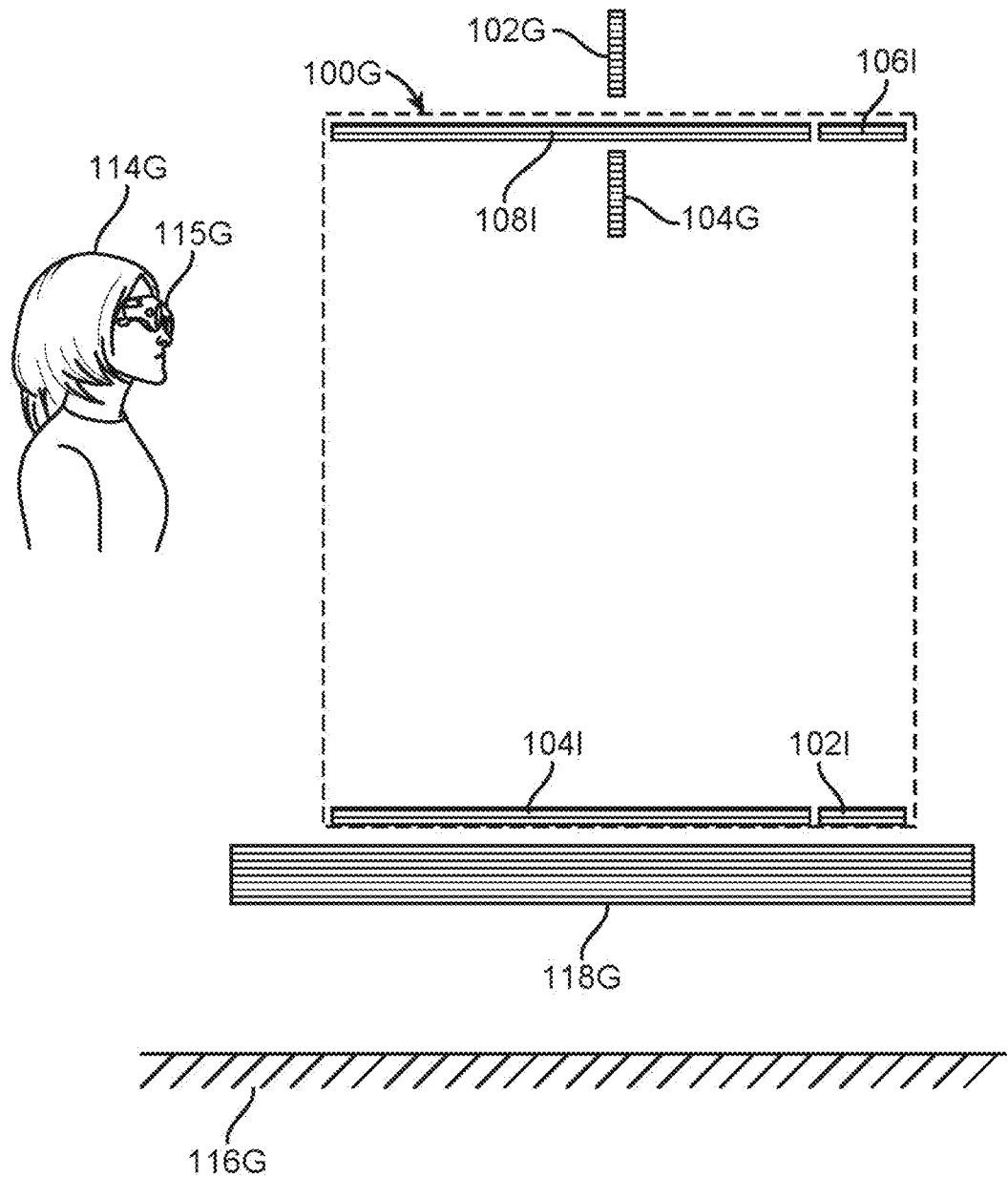

FIGS. 1G-1I illustrate the projected views of some simplified examples of managing and displaying web pages and web resources in a three-dimensional virtual space with a mixed reality system in some embodiments. FIG. 1G illustrates a sideview of a 3D rectangular prism 100G that is created in the physical environment of a user 114G relative to a physical object (e.g., a desk) 118G above the floor 116G in the physical environment. A mixed reality system may apply various techniques described herein to display a web page 106G in the prism 100G.

As described above, the display of the web browser window is suppressed in FIG. 1G so the browser window is invisible to the user 114G. The controls (104G) of the browser may nevertheless be displayed to the user for the user 114G to control the behaviors of the browser. In addition, the name or other identification of the application (e.g., the name of the browser, the name or identification of the web page, etc.) 102G may also be rendered either within or outside of the prism 100G. In some embodiments, 102G may be contained within a separate prism with a relationship (e.g., fixed relative location, or parent-child relationship, etc.) to the prism 100G.

With a mixed reality headset 115G, the user is enabled to view virtual contents such as the webpage 106G and the browser controls 104G that are projected to the eyes of the user 114G via the mixed reality headset 115G. The mixed reality system or a component thereof (e.g., the universe browser engine) may further provide the translation handle 112G, the rotation handles 108G and 110G, a scale handle (not shown), or one or more other transform handles (not shown) for the user to translate, rotate, scale, and transform the prism 100G, the browser window (hidden), the web page 106G, the controls 104G, etc. in the virtual 3D space.

FIG. 1H illustrates the scenario where the user 114G moves and rotates the web page and controls in FIG. 1G downward and in a first slanted orientation (102H and 104H). The web page and controls may be separately or jointly moved, rotated, and transformed in a full 360-degree fashion in the prism 100G, wherein FIG. 1H illustrates that the web page and controls are jointly moved and rotated. For example, rather than moving down and tilting up the web page and the controls, a web page and the controls may be moved up and rotated downward to end up with the configuration shown as 106H and 108H in FIG. 1H.

FIG. 1I illustrates the scenario where the user 114G wearing the mixed reality headset 115G moves and rotates the web page and controls in FIG. 1G downward and in a first orientation (102I and 104I) so that the web page 104I and controls 102I appear to rest on top of the desk 118G. The user 114G may also move the web page and controls upward in a second orientation (106I and 108I) so that the web page 108I and the controls 106I appear to sit above the user 114G. The web page and controls may be separately or jointly moved, rotated, and transformed in a full 360-degree fashion in the prism 100G, wherein FIG. 1I illustrates that the web page (104I and 108I) and controls may be jointly moved and rotated (106I and 102I). FIG. 1I further illustrates the configuration where the controls 104G can be separately manipulated by the user 114G.

Figure 1J:
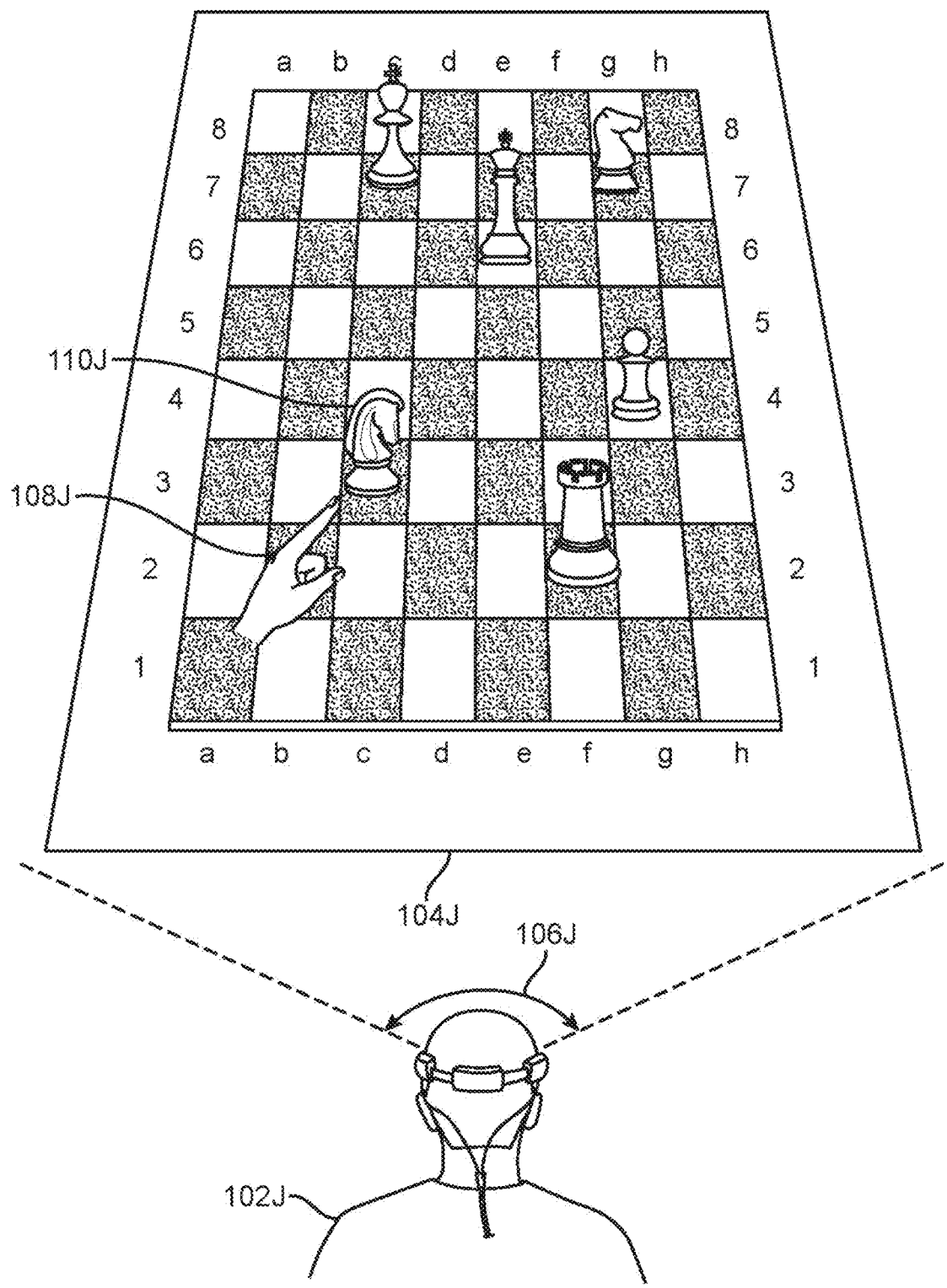
FIGS. 1J-1L illustrates three simplified examples of managing and displaying a web page and web resources in a three-dimensional virtual space with a mixed reality system.
Figure 1K:
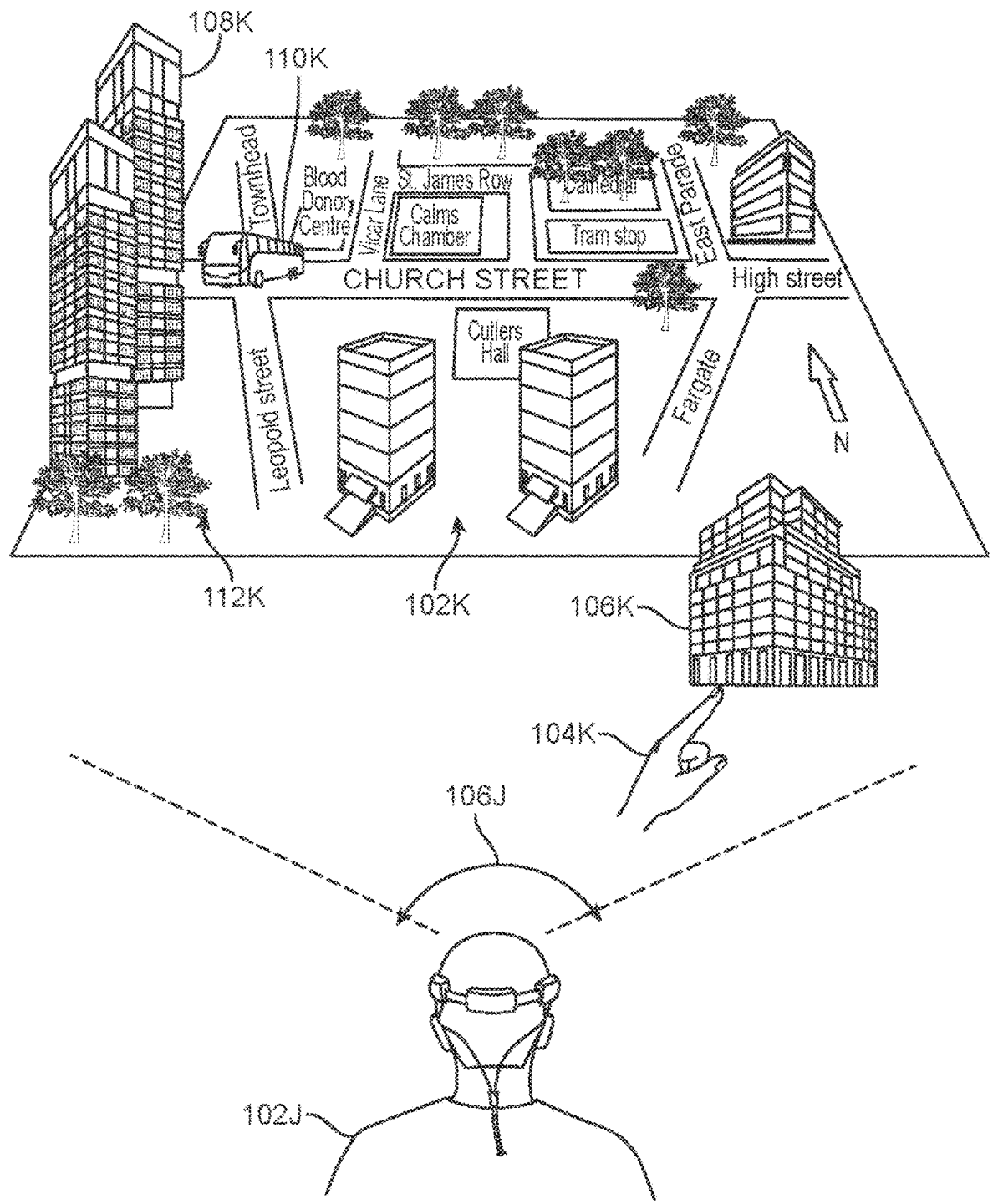
Figure 1L:
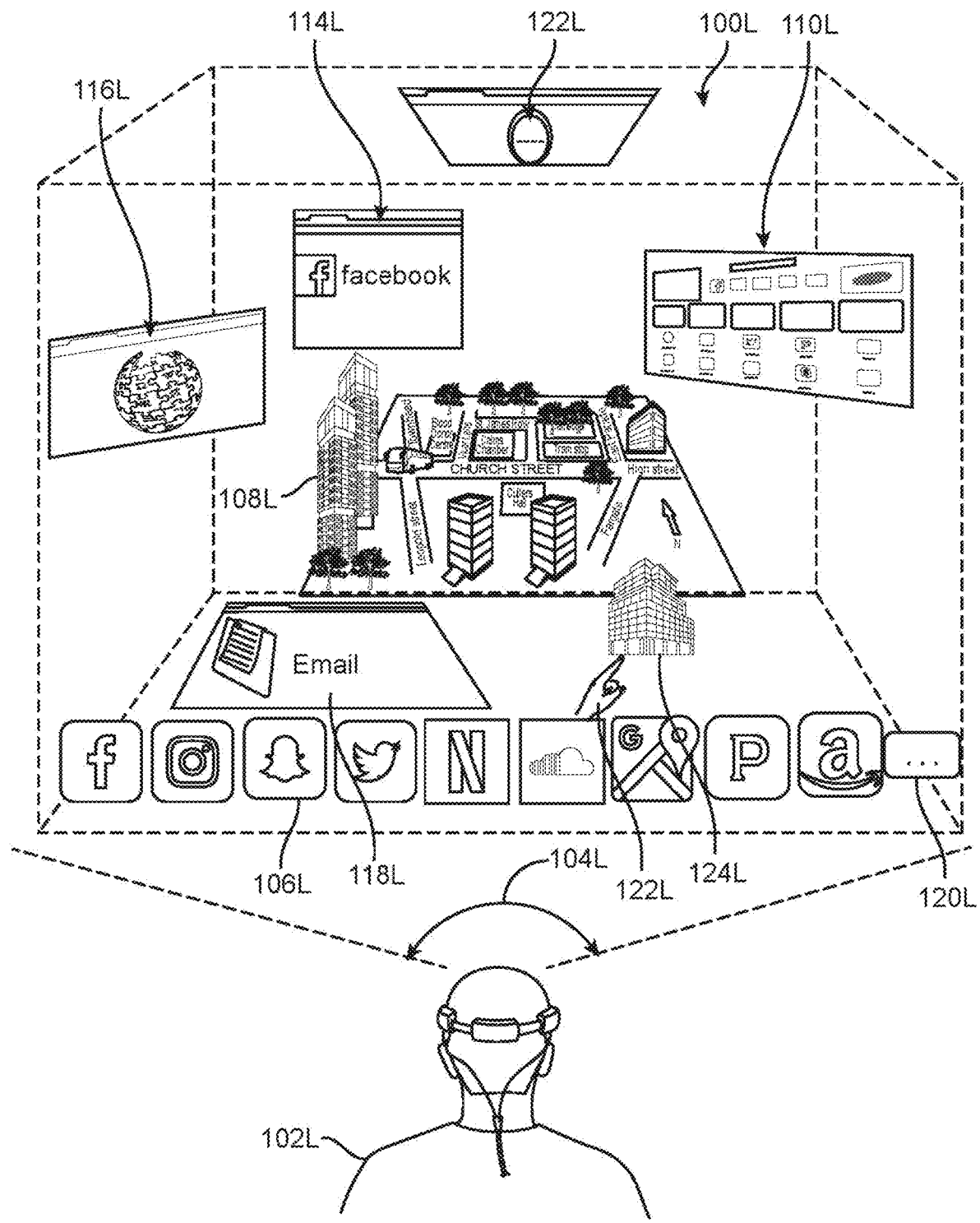

FIGS. 1J-1L illustrates three simplified examples of managing and displaying a web page and web resources in a three-dimensional virtual space with a mixed reality system. FIG. 1J illustrates a working example of the application of various techniques described herein for managing and displaying a web page in a 3D virtual space. In this example, a developer 102J may code the web page in such a way to rotate and move the chessboard 104J so that the chessboard 104J, when projected by a mixed reality system to the eyes of users, appear to be sitting on desk or table (not shown) in the correct perspective within the field of view 106J of the developer or user 102J.

This example may further illustrate the scenario where a planar web page view (or other 3D perspective view) of the chessboard is originally presented in the virtual 3D space to a user 102J. The user 102J may use the techniques described herein to move and/or rotate the web page 104J to the desired position and/or orientation by, for example, manipulating positioning and rotation handles (not shown). With the web resources (e.g., the 16 chess pieces for each player) provided by the web page and its website, the mixed reality system may enable the user 102J to either use the user's hand, a totem, or a controller (108J) to place the virtual 3D chess pieces on the chessboard 104J that has been positioned and/or rotated as the user 102J desires. It shall be noted that in this example, the boundaries of the web page, the browser window, and the prism are suppressed (e.g., hidden) so these boundaries are invisible to the user. In this example, a parent-child relationship may be created between the chessboard 104J (parent) and the virtual 3D models of the chess pieces 110J (children) so that the virtual 3D chess pieces are transformed, translated, and rotated with the chessboard 104J displayed in the web page.

FIG. 1K illustrates another working example of the application of various techniques described herein for managing and displaying a web page in a 3D virtual space. In this example, a developer 102J may code the web page in such a way to rotate and move the map 104M showing the neighborhood of a development project so that the map 104J, when projected by a mixed reality system to the eyes of an architect, appear to be sitting on desk or table (not shown) in the correct perspective (e.g., horizontal) within the field of view 106J of the architect 102J.

In addition, the developer 102J may use the techniques described herein to move and/or rotate the web page 104J (and hence the map displayed therein) to the desired position and/or orientation. The developer may position a virtual 3D model of an office building 106K, which is built by the developer or provided from other resources, by moving and rotating the 3D virtual office building 106K onto the correct location in the map by using the developer's hand, a totem, or a controller (104K). The developer may further populate other virtual 3D models such as trees 112K, office buildings 108K, vehicles 110K, etc. onto the map to build a virtual 3D project or 3D map for project development or 3D navigation.

With at least some virtual objects populated onto the map, the developer may further rotate the web page showing the map. For example, with the office buildings 108K populated onto the map, these two office buildings 108K may have blocked the developer's view to a portion of the map. In this example, the developer may further rotate the map so that the blocked portion is exposed to the developer for the developer to further populate other virtual objects onto the blocked portion. Similar to the example illustrated in FIG. 1J, a parent-child relationship may also be created between the map 102K (parent) and the virtual 3D objects 106K, 108K, and 110K (children) so that the virtual objects are transformed, translated, and rotated with the map 102K displayed in the web page.

FIG. 1L illustrates another working example of the application of various techniques described herein for managing and displaying a web page in a 3D virtual space. In this example, a user 102L wearing a mixed reality headset (not shown) may be presented, within the user's field of view 104L, with a prism 100L including an optional array or launch pad of website icons 106L (or launcher) that may be, for example, rendered from the bookmarks toolbar of a browser or provided by the universe browser engine of a mixed reality system described herein. The user may launch the home web page of the corresponding website with the respective icons via, for example, hand gestures, voice commands, etc.

This example further illustrates that the user may be primarily working on the virtual development project or 3D map 108L by populating 3D virtual objects (e.g., 124L) with the developer's hand, totem, or controller 122L as illustrated in FIG. 1K and described above. The user 102L may also open several other web pages and further manipulate and arrange these web pages (e.g., a streaming video web page 110L, an online dictionary web page 112L, a social media web page 114L, an online wiki web page 116L, an email client 118L, etc.) to the user's desired positions and orientations in the prism 100L by using the techniques described herein.

As it can be seen from the examples illustrated in FIGS. 1J-1L, various virtual contents may be displayed across multiple depth-planes or focal planes due to the movement and rotation of the corresponding web pages in the virtual 3D space. The mixed reality systems described herein provide the capability to render these virtual contents by using the multiple depth-planes or focal-planes with its variable focusing mechanism. More details about the mixed reality systems are described in the U.S. patent applications referenced in the first paragraph of the present application.

Figure 1M:
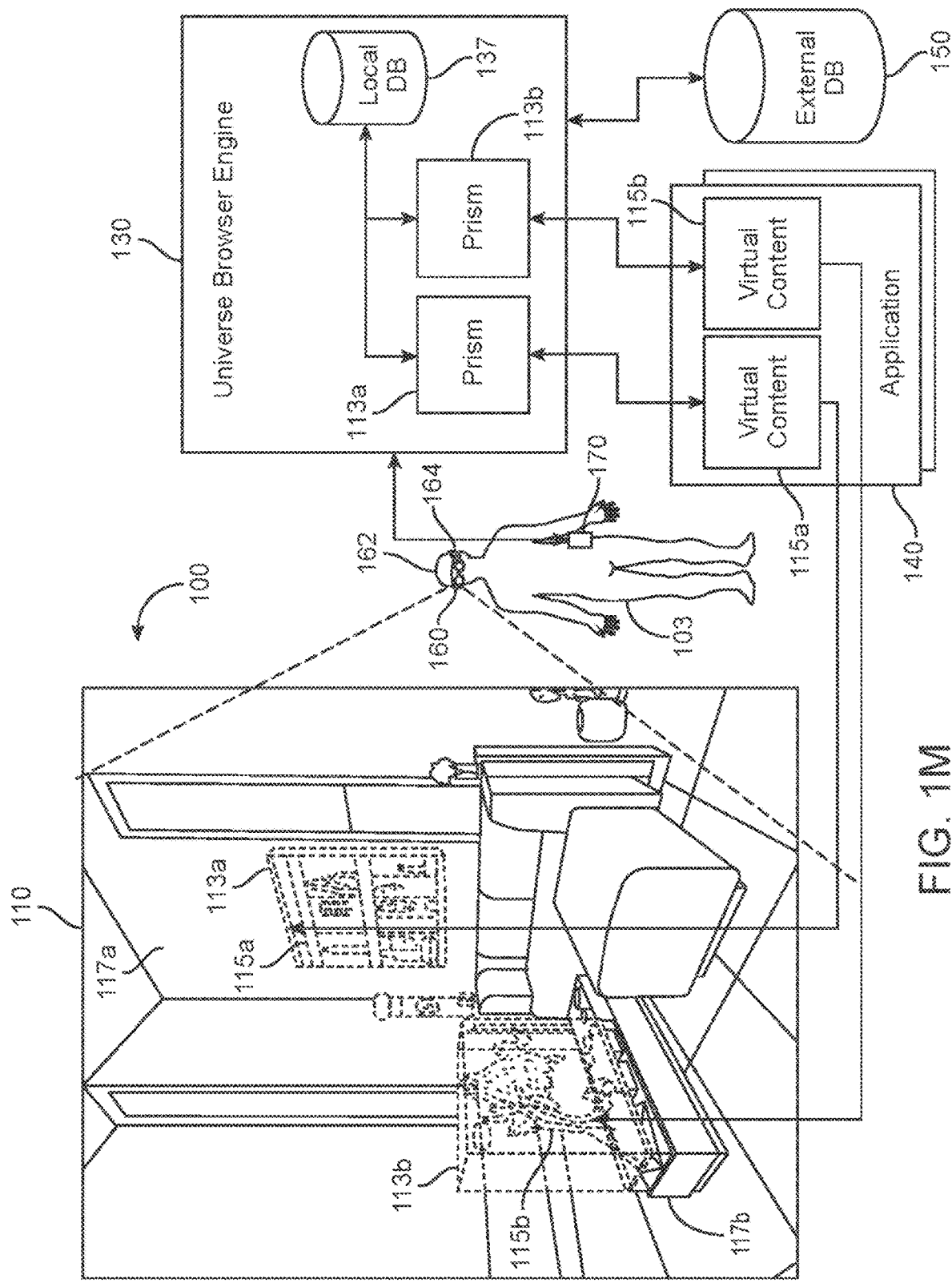
FIG. 1M illustrates an example user physical environment and system architecture for managing and displaying web pages and web resources in a three-dimensional virtual space with a mixed reality system in one or more embodiments.

FIG. 1M illustrates an example user physical environment and system architecture for managing and displaying web pages and web resources in a virtual 3D space with a mixed reality system in one or more embodiments. The representative environment 100 includes a user's landscape 110 as viewed by a user 103 through a head-mounted system 160. The user's landscape 110 is a 3D view of the world where user-placed content may be composited on top of the real world. The representative environment 100 further includes accessing a universe application or universe browser engine 130 via a processor 170 operatively coupled to a network (not shown).

Although the processor 170 is shown as an isolated component separate from the head-mounted system 160, in an alternate embodiment, the processor 170 may be integrated with one or more components of the head-mounted system 160, and/or may be integrated into other system components within the representative environment 100 such as, for example, a network to access a computing network (not shown) and external storage device(s) 150. In some embodiments, the processor 170 may not be connected to a network. The processor 170 may be configured with software (e.g., a universe application or universe browser engine 130) for receiving and processing information such as video, audio, and/or other data (e.g., depth camera data) received from the head-mounted system 160, a local storage device 137, application(s) 140, a computing network, and/or external storage device(s) 150.

The universe application or universe browser engine 130 may be a 3D windows manager that is analogous to a 2D windows manager running on, for example, a desktop computer for managing 2D windows displayed on the display screen of the desktop computer. However, the universe application or universe browser engine 130 (hereinafter may be referred to as "the Universe" for simplicity) manages the creation, placement and display of virtual content 115 in a 3D spatial environment, as well as interactions between a plurality of virtual content 115 displayed in a user's landscape 110. Virtual content 115 from applications 140 are presented to users 103 inside of one or more 3D window display management units such as bounded volumes and/or 3D windows, hereinafter may be referred to as prisms 113.

A bounded volume/3D window/prism 113 may be a rectangular, cubic, cylindrical, or any other shape volume of space that may be positioned and oriented in space. A prism 113 may be a volumetric display space having boundaries for content (e.g., virtual content) to be rendered/displayed into, wherein the boundaries are not displayed. In some embodiments, the boundaries may be displayed. The prism 113 may present a standard base level of interaction and control over an application's content and its placement. The prism 113 may represent a sub-tree of a multi-application scene graph, which may be embedded inside of the universe browser engine 130, or may be external to but accessed by the universe browser engine. A scene graph is a general data structure commonly used by vector-based graphics, editing applications and modern gaming software, which arranges the logical and often (but not necessarily) spatial representation of a graphical scene. A scene graph may be considered a data-structure that defines how content is positioned and transformed relative to each other within its structure. Application(s) 140 are given instances of prisms 113 to place content within. Applications may render 2D/3D content within a prism 113 using relative placement algorithms and arbitrary transforms, but the universe browser engine (130) may still ultimately be in charge of gross interaction patterns such as content extraction. Multiple applications may render to the universe browser engine (130) via the prisms 113, with process boundaries separating the prisms 113. There may be n number of bounded volumes/prisms 113 per application process, but this is explicitly an n:1 relationship such that only one process for each application may be running for each bounded volume/prism 113, but there may be a number of m processes running, each with their own bounded volume/prism 113.

The universe browser engine (130) operates using a prism/distributed scene graph approach for 2D and/or 3D content. A portion of the universe browser engine's scene graph is reserved for each application to render to. Each interaction with an application, for example the launcher menu, the landscape, or body-centric application zones (all described in more detail below) may be done through a multi-application scene graph. Each application may be allocated 1 to N rectangular prisms that represent a sub-tree of the scene graph. prisms are not allocated by the client-side applications, but instead are created through the interaction of the user inside of the universe browser engine (130), for example when the user opens a new application in the landscape by clicking a button on a controller. In some embodiments, an application can request a prism from the universe browser engine (130), but the request may be denied. In some embodiments, if an application requests and is allowed a new prism, the application may only transform the new prism relative to one of its other prisms.

The universe browser engine (130) comprises virtual content 115 from application(s) 140 in objects called prisms 113. Each application process or instance may render its virtual content into its own individual prism 113 or set of prisms. The universe browser engine (130) manages a world space, sometimes called a landscape, where prisms 113 are displayed. In some embodiments, the universe browser engine (130) provides the ability to attach applications to walls and surfaces, place prisms at an arbitrary location in space, register them with the mixed reality system's world database, and/or control sharing of content between multiple users of the mixed reality system.

In some embodiments, the purpose of the prisms 113 is to provide behaviors and control over the rendering and display of the content. Much like a 2D display, where a window may be used to define location, menu structures, and display of 2D content within a 2D window, with 3D virtual display, the prism allows the mixed reality system (e.g., the universe browser engine (130)) to wrap control relating to, for example, content locations, 3D window behavior, and/or menu structures around the display of 3D content. For example, controls may include at least placing the virtual content in a particular location in the user's landscape 110, removing the virtual content from the landscape 110, copying the virtual content and/or placing the copy in a different location, etc. In some embodiments, prisms may be created and destroyed by the user and only the user. This may be done explicitly to help control abuse of the interfaces provided and to help the user maintain control of the user's content.

Additionally, in some embodiments, application(s) 140 do not know where their volumes are placed in the landscape—only that they exist. In some embodiments, applications may request one or more prisms, and the request may or may not be granted. After the new prism is created, the user may change the position, and/or the application may automatically position the new prism relative to a currently existing prism associated with the application. In some embodiments, each application 140 making use of the universe browser engine's service to render 3D content (e.g. composited 3D content) into the universe browser engine process may be required to first register a listener with the universe browser engine. This listener may be used to inform the application 140 of creation and destruction of rendering prisms, based upon user movement and user interaction with those prisms. A listener is an interface object that receives messages from an inter-process communication system. For example, in the Android operating system, a listener is an object that receives messages through an Android Binder interface. However, any IPC system may be used such that a Binder is not always used.

In some embodiments, prisms may be created from the following interactions: (1) The user has extracted content from an extractable node (disclosed further below); (2) The user has started an application from the launcher; (3) The user has downloaded a nearby passable world map tile that includes a placed instance of an application that the user has permission to see; (4) The user has downloaded a nearby passable world map tile that includes an object that the passable world object recognizer infrastructure has detected, that a given application must render content for; and/or (5) The user has triggered a dispatch from another application that must be handled in a different application. In some embodiments, a passable world model allows a user to effectively pass over a piece of the user's world (e.g., ambient surroundings, interactions, etc.) to another user.

Extractable Content is content inside a prism (including but not limited to an icon, 3D icon, word in a text display, and/or image) that can be pulled out of the prism using an input device and placed in the landscape. For example, a prism might display a web page showing a running shoe for sale. To extract the running shoe, the shoe can be selected and "pulled" with an input device. A new prism would be created with a 3D model representing the shoe, and that prism would move out of the original prism and towards the user. Like any other prism, the user may use an input device to move, grow, shrink or rotate the new prism containing the shoe in the 3D space of the landscape. An Extractable Node is a node in the prism's scene graph that has been tagged as something that can be extracted. In the universe browser engine, to extract content means to select an extractable node, and use an input device to pull the content out of the prism. The input to initiate this pull could be aiming a 6dof pointing device at extractable content and pulling the trigger on the input device.

Each user's respective individual mixed reality system (e.g., mixed reality devices) captures information as the user passes through or inhabits an environment, which the mixed reality system processes to produce a passable world model. More details regarding a passable world are described in U.S. patent application Ser. No. 14/205,126, filed on Mar. 11, 2014, entitled "SYSTEM AND METHOD FOR AUGMENTED AND VIRTUAL REALITY", which has been previously incorporated by reference. The individual mixed reality system may communicate or pass the passable world model to a common or shared collection of data, referred to as the cloud. The individual mixed reality system may communicate or pass the passable world model to other users, either directly or via the cloud. The passable world model provides the ability to efficiently communicate or pass information that essentially encompasses at least a field of view of a user. In one embodiment, the system uses the pose and orientation information, as well as collected 3D points described above in order to create the passable world.

In some embodiments, the passable world model allows the user the ability to integrate content (e.g., virtual and/or physical content) with the real world. A passable world system may include one or more mixed reality systems or mixed reality user devices that are able to connect to a cloud network, a passable world model, a set of object recognizers, and a database (e.g., external database 150). The passable world model may be configured to receive information from the mixed reality user devices and also transmit data to them through the network. For example, based on the input from a user, a piece of the passable world may be passed on from one user to another user. The passable world model may be thought of as a collection of images, points and other information (e.g., real-world information) based on which the mixed reality system is able to construct, update and build the virtual world on the cloud, and effectively pass pieces of the virtual world to various users. For example, a set of real-world points collected from a mixed reality user device may be collected in the passable world model. Various object recognizers may crawl through the passable world model to recognize objects, tag images, etc., and attach semantic information to the objects. The passable world model may use the database to build its knowledge of the world, attach semantic information, and store data associated with the passable world.

In the case of a prism that is visible to the user but whose controlling application is not currently installed, the universe browser engine may render a temporary placeholder for that application that, when interacted with, redirects the user to the application store page for that application. In some embodiments, prisms may be destroyed in similar interactions: (1) The user has walked far enough from a passable world map tile that the placed instance of an application has been unloaded (i.e. removed) from volatile memory; (2) The user has destroyed a placed instance of an application; and/or (3) An application has requested that a prism be closed.

In some embodiments, if no prisms for an application are visible and/or loaded, then the process associated with those prisms may be paused or ended. Once a placed prism for that application is visible again, the process may be restarted. prisms may also be hidden, but, in some embodiments, this may only happen at the behest of the universe browser engine and the user. In some embodiments, multiple prisms may be placed at the same exact location. In such embodiments, the universe browser engine may only show one instance of a placed prism in one place at a time, and manage the rendering by hiding the visibility of a prism (and its associated content) until a user interaction is detected, such as the user "swipes" to the next visible element (e.g., prism) in that location.

In some embodiments, each prism 113 may be exposed to the application 140 via a volume listener interface with methods for accessing properties of the prism 113 and registering content in a scene graph sub-tree for shared resources such as meshes, textures, animations, and so on. In some embodiments, since the application 140 does not know where a given prism 113 is placed in 3D space, the volume listener interface may provide accessor methods to a set of hints that help to define where the given prism is present in the universe browser engine, for example hand centric, stuck in the landscape, Body Centric, etc. These properties additionally specify expected behavior of the prisms, and may be controlled in a limited fashion either by the user, the application 140, or the universe browser engine. A given prism can be positioned relative to another prism that an application owns. Applications can specify that prisms should snap together (two sides of their bounding volumes touch) while prisms from that application are being placed. Additionally, prisms may provide an API for key-value data storage. Some of these key-value pairs are only writable by privileged applications.

In some embodiments, application(s) 140 are client software applications that provide content that is to be displayed to the user 103 in the user's landscape 110. For example, an application 140 may be a video streaming application, wherein video data may be streamed to the user to be displayed on a 2D planar surface. As another example, an application 140 may be a Halcyon application that provides 3D imaging of physical objects that may denote a period of time in the past that was idyllically happy and peaceful for the user. Application 140 provides the content that a user may want to include in the user's landscape 110. The universe browser engine via the prisms 113 manages the placement and management of the content that is generated by application 140.

When a non-immersive application is executed/launched in the user's landscape 110, its content (e.g., virtual content) is rendered inside of a prism 113. A non-immersive application may be an application that is able to run and/or display content simultaneously with one or more other applications in a shared 3D environment. Although the virtual content may be contained within the prism, a user may still interact with the virtual content, such as, for example, hovering over an object, clicking on it, etc. The prism 113 may also bound application 140's displayed content so different applications 140 do not interfere with each other or other objects in the user's landscape 110. prisms 113 may also provide a useful abstraction for suspending, pausing, and/or minimizing virtual content from application(s) 140 that are out of view or too far away from the user.

The prisms 113 may be anchored/attached/pinned to various objects within a user's landscape 110, including snapping or anchoring to another prism. For example, prism 113a, which displays virtual content 115 (e.g., a video 115a from a video streaming application), may be anchored to a vertical wall 117a. As another example, prism 113b, which displays a 3D tree 115b from a Halcyon application, is shown in FIG. 1 to be anchored to a table 117b. Furthermore, a prism 113 may be anchored relative to a user 103 (e.g., body-centric), wherein the prism 113 which displays virtual content 115 may be anchored to a user's body, such that as the user's body moves, the prism 113 moves relative to the movement of the user's body. A body-centric content may be application content such as planes, meshes, etc. that follow the user and remain positionally consistent with the user. For example, a small dialog box that follows the user around but exists relative to the user's spine rather than the landscape 110. Additionally, a prism 113 may also be anchored to a virtual object such as a virtual display monitor displayed within the user's landscape 110. The prism 113 may be anchored in different ways, which is disclosed below.

The universe browser engine may include a local database 137 to store properties and characteristics of the prisms 113 for the user. The stored prism information may include prisms activated by the user within the user's landscape 110. Local database 137 may be operatively coupled to an external database 150 that may reside in the cloud or in an external storage facility. External database 150 may be a persisted database that maintains information about the mixed reality environment of the user and of other users.

For example, as a user launches a new application to display virtual content in the user's physical environment, the local database 137 may store information corresponding to a prism that is created and placed at a particular location by the universe browser engine, wherein an application 140 may render content into the prism 113 to be displayed in the user's landscape 110. The information corresponding to the prism 113, virtual content 115, and application 140 stored in the local database 137 may be synchronized to the external database 150 for persistent storage.

In some embodiments, the persisted storage may be important because when the mixed reality system is turned off, data stored in the local database 137 may be erased, deleted, or non-persisted. Thus, when a user turns on the mixed reality system, the universe browser engine may synchronize with the external database 150 to retrieve an instance of the local database 137 corresponding to the user 103 and the user's landscape 110 prior to the mixed reality system being turned off. The local database 137 may be an instance of the external database 150, wherein the instance of the local database 137 includes information pertinent to the user 103 and the user's current environment. The external database 150 may additionally store instances of local databases of other users, multiple users, the same user over time, and/or other environments. The external database 150 may contain information that is used to manage and share virtual content between multiple users of the mixed reality system, whereas the local database 137 stores and maintains information corresponding to the user 103.

The universe browser engine may create a prism 113 for application 140 each time application(s) 140 needs to render virtual content 115 onto a user's landscape 110. In some embodiments, the prism 113 created by the universe browser engine allows application 140 to focus on rendering virtual content for display while the universe browser engine focuses on creating and managing the placement and display of the prism 113 having the virtual content 115 displayed within the boundaries of the prism by the application 140.

Each virtual content 115 rendered by an application 140, displayed in the user's landscape 110, may be displayed within a single prism 113. For example, if an application 140 needs to render two virtual contents (e.g., 115*a* and 115*b*) to be displayed within a user's landscape 110, then application 140 may render the two virtual contents 115*a* and 115*b*. Since virtual contents 115 include only the rendered virtual contents, the universe browser engine may create prisms 113*a* and 113*b* to correspond with each of the virtual content 115*a* and 115*b*, respectively. The prism 113 may include 3D windows management properties and characteristics of the virtual content 115 to allow the universe browser engine to manage the virtual content 115 inside the prism 113 and the placement and display of the prism 113 in the user's landscape 110.

The universe browser engine may be the first application a user 103 sees when the user 103 turns on the mixed reality device. The universe browser engine may be responsible for at least (1) rendering the user's world landscape; (2) 2D window management of planar applications and 3D windows (e.g., prisms) management; (3) displaying and executing the application launcher menu; (4) allowing the user to place virtual content into the user's landscape 110; and/or (5) managing the different states of the display of the prisms 113 within the user's landscape 110.

The head-mounted system 160 may be a mixed reality head-mounted system that includes a display system (e.g., a user interface) positioned in front of the eyes of the user 103, a speaker coupled to the head-mounted system and positioned adjacent the ear canal of the user, a user-sensing system, an environment sensing system, and a processor (all not shown). The head-mounted system 160 presents to the user 103 the display system (e.g., user interface) for interacting with and experiencing a digital world. Such interaction may involve the user and the digital world, one or more other users interfacing the representative environment 100, and objects within the digital and physical world.

The user interface may include viewing, selecting, positioning and managing virtual content via user input through the user interface. The user interface may be at least one or a combination of a haptics interface devices, a keyboard, a mouse, a joystick, a motion capture controller, an optical tracking device, an audio input device, a smartphone, a tablet, or the head-mounted system 160. A haptics interface device is a device that allows a human to interact with a computer through bodily sensations and movements. Haptics refers to a type of human-computer interaction technology that encompasses tactile feedback or other bodily sensations to perform actions or processes on a computing device.

An example of a haptics controller may be a totem (not shown). In some embodiments, a totem is a hand-held controller that tracks its position and orientation relative to the headset 160. In this example, the totem may be a six degree-of-freedom (six DOF or degrees of freedom) controller where a user may move a prism around in altitude and azimuth (on a spherical shell) by moving the totem up or down. In some embodiments, to move the object closer or farther away, the user may use the joystick on the totem to "push" or "pull" the prism, or may simply move the totem forward or backward. This may have the effect of changing the radius of the shell. In some embodiments, two buttons on the totem may cause the prism to grow or shrink. In some embodiments, rotating the totem itself may rotate the prism. Other totem manipulations and configurations may be used, and should not be limited to the embodiments described above.

The user-sensing system may include one or more sensors 162 operable to detect certain features, characteristics, or information related to the user 103 wearing the head-mounted system 160. For example, in some embodiments, the sensors 162 may include a camera or optical detection/scanning circuitry capable of detecting real-time optical characteristics/measurements of the user 103 such as, for example, one or more of the following: pupil constriction/dilation, angular measurement/positioning of each pupil, sphericity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's landscape 110. Objects or information detected by the sensors 164 may be provided as input to the head-mounted system 160. In some embodiments, this input may represent user interaction with the virtual world. For example, a user (e.g., the user 103) viewing a virtual keyboard on a desk (e.g., the table 188) may gesture with their fingers as if the user were typing on the virtual keyboard. The motion of the fingers moving may be captured by the sensors 164 and provided to the head-mounted system 160 as input, wherein the input may be used to change the virtual world or create new virtual objects.

The sensors 164 may include, for example, a generally outward-facing camera or a scanner for capturing and interpreting scene information, for example, through continuously and/or intermittently projected infrared structured light. The environment-sensing system may be used for mapping one or more elements of the user's landscape 110 around the user 103 by detecting and registering one or more elements from the local environment, including static objects, dynamic objects, people, gestures and various lighting, atmospheric and acoustic conditions, etc. Thus, in some embodiments, the environment-sensing system may include image-based 3D reconstruction software embedded in a local computing system (e.g., the processor 170) and operable to digitally reconstruct one or more objects or information detected by the sensors 164.

In some embodiments, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system may include other components other than those discussed above.

As mentioned above, the processor 170 may, in some embodiments, be integrated with other components of the head-mounted system 160, integrated with other components of the system of the representative environment 100, or may be an isolated device (wearable or separate from the user 103) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., a computing network, and the user-sensing system and the environment-sensing system from the head-mounted system 160) into image and audio data, wherein the images/video and audio may be presented to the user 103 via the user interface (not shown).

The processor 170 handles data processing for the various components of the head-mounted system 160 as well as data exchange between the head-mounted system 160 and the software applications such as the universe browser engine, the external database 150, etc. For example, the processor 170 may be used to buffer and process data streaming between the user 103 and the computing network, including the software applications, thereby enabling a smooth, continuous and high-fidelity user experience. The processor 170 may be configured to execute a set of program code instructions. The processor 170 may include a memory to hold the set of program code instructions, in which the set of program code instructions comprises program code to display virtual content within a subset of available 3D displayable space by displaying the virtual content within a volumetric display space, wherein boundaries of the volumetric display space are not displayed. In some embodiments, the processor may be two or more processors operatively coupled.

In some embodiments, the mixed reality system may be configured to assign to a prism universal features and application selected/application-specific features from a list of pre-approved options for configurations of display customizations by an application. For example, universal features ensure different applications interact well together. Some example of universal features may include max/min size, no overlapping prisms (excluding temporary overlap from collision behavior), no displaying content outside the boundaries of the prism, applications need permission from user if the application wants to access sensors or sensitive information. Application selected/application-specific features enable optimized application experiences.

Application-selected/application-specific features may include max/min size (within limits from the system), default size (within limits from the system), type of body dynamic (e.g., none/world lock, billboard, edge billboard, follow/lazy headlock, follow based on external sensor, fade—discussed below), child prism spawn location, child head pose highlight, child prism relational behavior, on surface behavior, independent transformation control, resize vs. scale, idle state timeout, collision behavior, permission/password to access application, etc. In another embodiment, the mixed reality system may be configured to display virtual content into one or more prisms, wherein the one or more prisms do not overlap with one another, in some embodiments.

In some embodiments, one or more prisms may overlap in order to provide specific interactions. In some embodiments, one or more prisms may overlap, but only with other prisms from the same application. In another embodiment, the mixed reality system may be configured to change a state of a prism based at least in part on a relative position and location of the prism to a user. In another embodiment, the mixed reality system may be configured to manage content creation in an application and manage content display in a separate application. In another embodiment, the mixed reality system may be configured to open an application that will provide content into a prism while simultaneously placing the prism in a mixed reality environment.

In some embodiments, the mixed reality system may be configured to assign location, orientation, and extent data to a prism for displaying virtual content within the prism, where the virtual content is 3D virtual content. In some embodiments, the mixed reality system may be configured to pin a launcher application to a real-world object within a mixed reality environment. In some embodiments, the mixed reality system may be configured to assign a behavior type to each prism, the behavior type comprising at least one of a world lock, a billboard, an edge billboard, a follow headlock, a follow based on external sensor, or a fade (described below in more detail). In some embodiments, the mixed reality system may be configured to identify a most used content or an application that is specific to a placed location of a launcher application, and consequently re-order to the applications from most to least frequently used, for example. In another embodiment, the mixed reality system may be configured to display favorite applications at a placed launcher application, the favorite applications based at least in part on context relative to a location of the placed launcher.

Figure 1N:
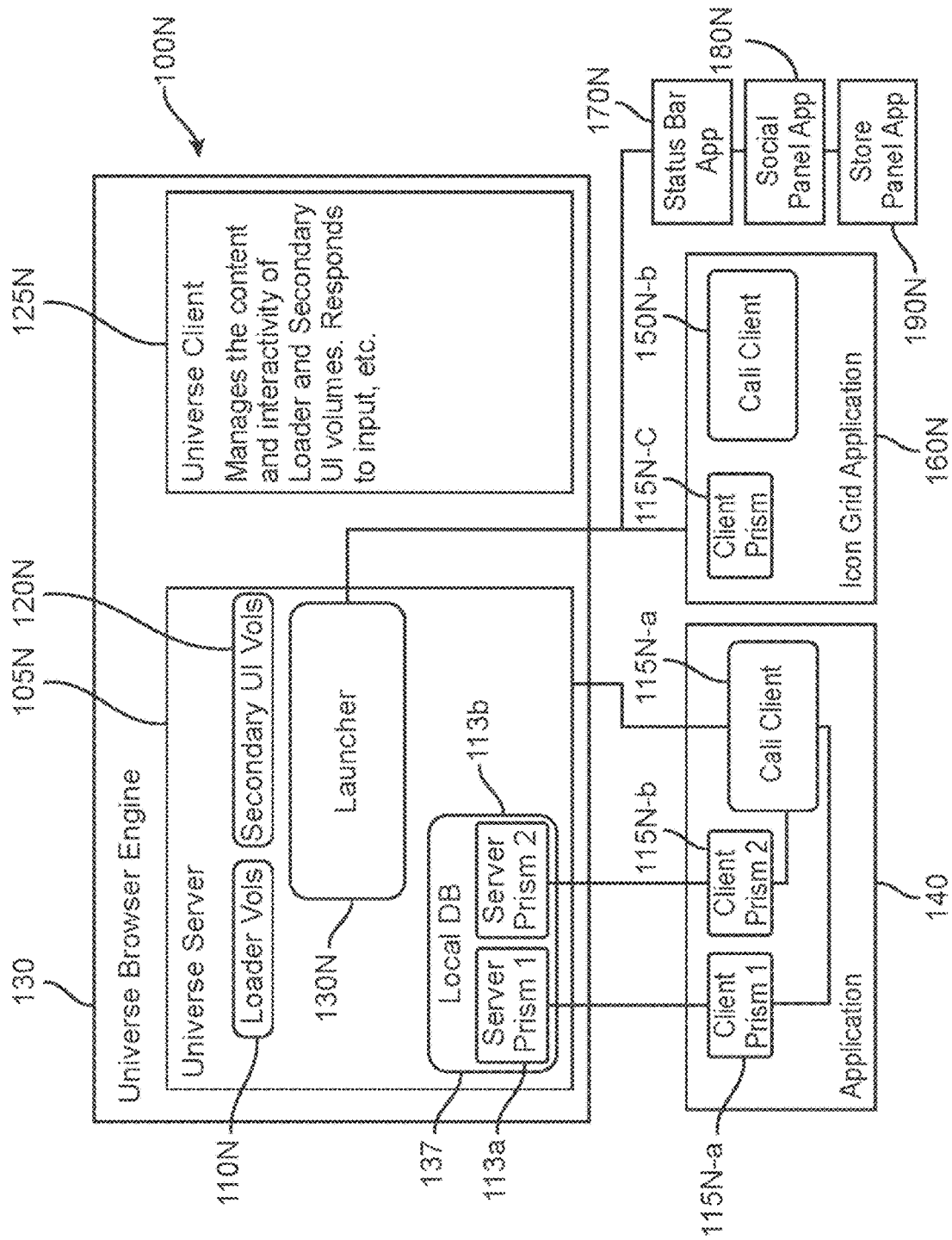
FIG. 1N illustrates a system architecture for managing and displaying web pages and web resources in a three-dimensional virtual space with a mixed reality system in one or more embodiments.
Figure 10:
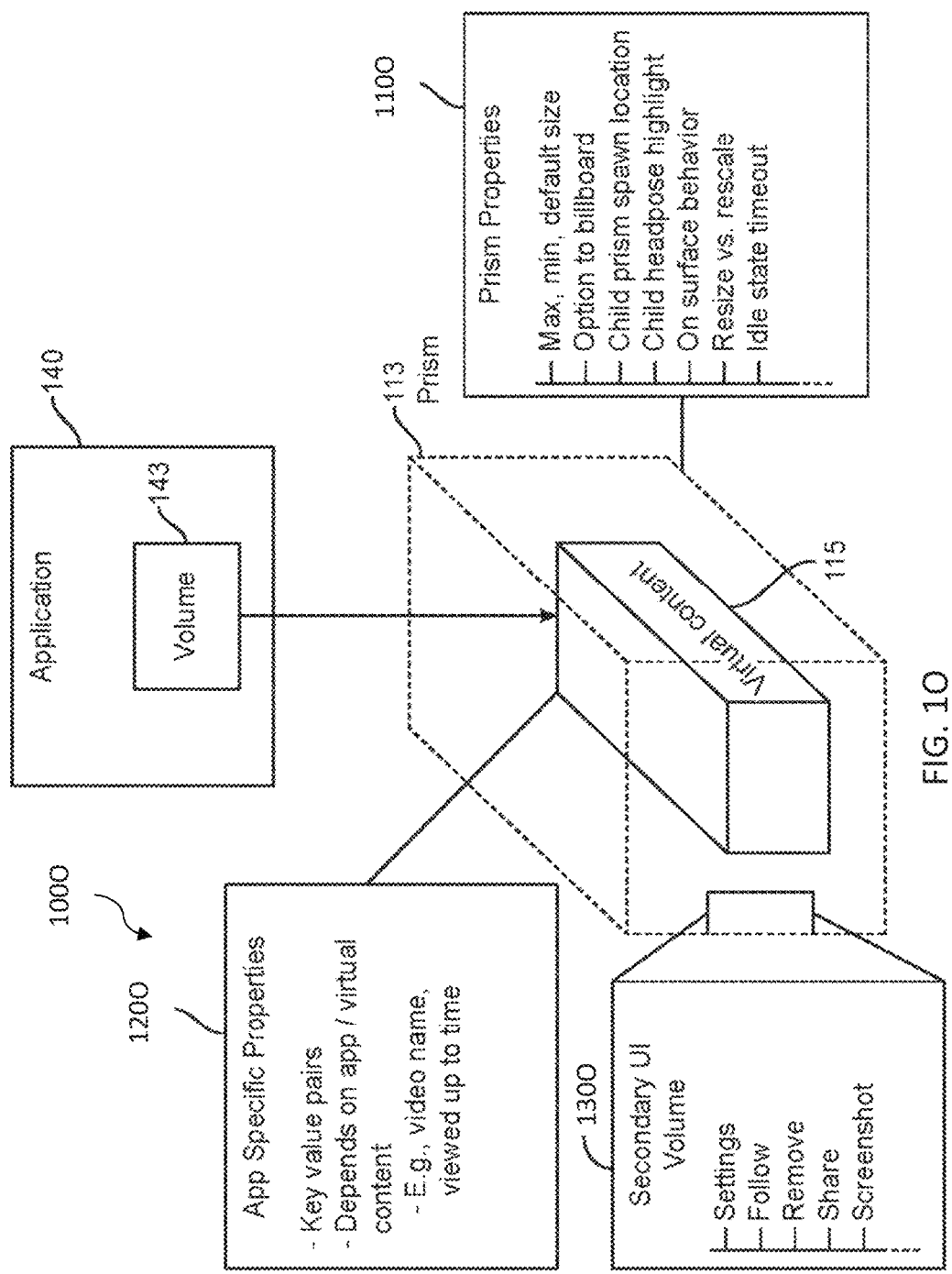

FIG. 1N illustrates a system architecture for managing and displaying web pages and web resources in a three-dimensional virtual space with a mixed reality system in one or more embodiments. System 100N includes a Universe or a universe browser engine 130, application 140, icon grid application 160N, status bar app 170N, social panel app 180N, and store panel app 190N. These applications may represent the base level of applications on system 100N, however, in some embodiments, more or fewer applications may be part of system 100N.

As discussed in FIG. 1M above, the universe browser engine may be thought of as a 3D windows (e.g., prisms) manager, analogous to a 2D windows manager that manages 2D windows in conventional computer desktop systems and such. FIG. 1N may provide further details of the universe browser engine from FIG. 1M. Here, the universe browser engine 130 may also include a universe server 105N, loader volumes 110N, secondary UI volumes 120N, universe client 125N, launcher application 130, and universe server 105N. The Universe server 105N may be a processing thread of the universe browser engine in a multi-threaded processing environment for multi-parallel processing.

Loader volumes 110N are placeholder volumes that are displayed to a user while the universe browser engine is creating a prism for displaying virtual content in the user's landscape 110. For example, when a user selects an application to display in the user's landscape 110 at a particular location, for example, on a vertical wall of the user's landscape 110, while the universe browser engine is setting up the prism and starting the application for rendering the virtual content into the prism, the universe browser engine may display a loader volume 110N with a default icon as a placeholder volume to indicate to the user that the universe browser engine is setting up the prism for display. Once the application finishes rendering the virtual content into the prism for display in the user's landscape, the loader volume 110N is replaced with the actual prism containing the rendered virtual content.

In some embodiments, while the universe browser engine is starting up an application for displaying virtual content, the user 103 may move the loader volume 110N to a desired different location. In some embodiments, the user may move the loader volume 110N to a location that is different than the location of the loader volume/prism that was initially selected. Once the universe browser engine is done creating the prism and the application has rendered the virtual content into the prism, the universe browser engine may replace the loader volume 110N, wherever the user may have placed the loader volume 110N, with the prism displaying the virtual content.

Secondary UI volume 120N is another prism that may be created when a prism (e.g., its "parent prism") is created. The Secondary UI volume 120N provides a universal interface of prisms for users. For example, the Secondary UI volume 120N may be considered as window dressing because the Secondary UI volume 120N provides a mechanism to manage a prism (e.g., close/remove, share, follow, take a screenshot of the prism's content, etc.). When a prism is created, a Secondary UI volume 120N may be created for the prism if the prism is not part of the Launcher (Launcher applications may not have Secondary UI volumes). The Secondary UI volume 120N provides the space/volume to display graphical user interface icons such as close/remove, share, follow, screenshot, etc. for the user to interact with and manage the prism. The Secondary UI volume 120N is associated to the parent prism and may be grouped with the parent prism. The Secondary UI volume 120N lifetime ends when the parent prism lifetime it is associated with ends.

In some embodiments, the Secondary UI volume 120N may have at least three states: (1) Display nothing when the parent prism is out of focus; (2) Display the component's "visible name" when the parent prism is in focus; and (3) Display a "carousel" of application menu option icons when a specific user interaction is detected, for example, a home button of a handheld controller (e.g., a Totem, or other suitable user interaction controllers) has been held for a certain number of seconds, wherein the carousel displays a collection of icons, one of which may be a large "X" icon for closing the prism. In some embodiments, the Secondary UI volume 120N receives input via its parent prism. In other words, the parent prism may determine if the Secondary UI volume 120N is displaying its carousel, and if so, the parent prism redirects user input to the Secondary UI. The carousel of the Secondary UI volume 120N is disclosed below.

In some embodiments, the launcher may be the default "home" menu for the mixed reality system. The launcher may bring together multiple panels of content alongside a system status bar. Each panel may represent a different content type. Applications may be pulled from the launcher and pinned into the landscape for quick recall. The launcher itself may be placed into the landscape for customization per location and/or for quick access.

Launcher 130N provides the user with the ability to launch new applications into the user's landscape 110. The launcher 130N may be an application composed of a series of body-centric prisms called panels. The panels may be vertically and horizontally scrollable and a user may switch between panels with a swiping motion, for example. In some embodiments, one panel may be visible at a time (e.g., a central panel), with its two neighboring panels visible as placeholder panels at its side. When the user swipes to the next panel, the placeholder panels may expand to show the full panel. Panels may include an Icon Grid application 160N, a Social panel 180N, and a Store panel 190N. In some embodiments, when the user swipes to the next panel, the panels themselves are not moved or changed, but instead, contents (e.g., icons) within the different panels may be animated in and out of the central panel (e.g., active panel). Furthermore, applications may be pulled from the launcher 130N and pinned into the user's landscape 110 for customization per location, discussed further below.

In some embodiments, an application 140 (in FIG. 1M) may communicate with the universe browser engine via a centralized rendering service client 150N on each application 140. The centralized rendering service client 150N may be in communication with a universe server 105N within the universe browser engine 130. The centralized rendering service client 150N may be a client service of a centralized rendering system that allows application(s) 140 and other applications that generate content for display in the user's landscape to communicate with the universe browser engine via the universe server 105N.

The universe server 105N may comprise a service of the centralized rendering system that allows the universe browser engine to communicate with applications that provide the content to be displayed in the user's landscape. In some embodiments, the communication may comprise more than rendering data, for example, input data, requesting a security privilege, requesting to show or hide the virtual keyboard, etc.

In some embodiments, the centralized rendering system may be a system of hardware and software resources dedicated to receiving graphical data from multiple applications to be displayed on a single display (e.g., in a user's landscape in the mixed reality system). The centralized rendering system combines graphical data from multiple applications 140 into a "centralized" data structure, such as a scene graph, which may be used to render, to a display, a scene reflecting the graphical data from the multiple applications in a realistic and efficient manner. In order to achieve the centralized rendering system, in some embodiments, an application may make changes to a local representation of the prism called the Client prism (e.g. Client prism 115N from FIG. 1N). These changes may then be sent to the Universe Server 105N and stored in a Server prism. The centralized rendering system may then render the updated data in the Server prism. The centralized rendering system may hereinafter be referred to as the "Cali" or Kali" system. The universe browser engine may be thought of as an enhanced version of the Cali Server, for example, because the universe browser engine can manage the prisms in the real world.

In some embodiments, each application 140 that creates virtual content (e.g., 115a or 115b in FIG. 1M, 115 in FIG. 1O) for the universe browser engine communicates with the centralized rendering system and the universe browser engine via the centralized rendering service client 150N (hereinafter may be referred to as a "Cali client") installed on each of the respective application(s) 140. More information may be disclosed in a related U.S. Prov. Pat. App. Ser. No. 62/479,134 entitled "CENTRALIZED RENDERING", filed on Mar. 30, 2017, and which is hereby incorporated by reference in its entirety. The centralized rendering system improves the user's experience by ensuring that virtual content from multiple different applications are properly analyzed and processed, if necessary, to ensure the virtual content are displayed in a realistic manner to the user. In some embodiments, the universe browser engine is an instance of a Cali Server with additional functionality, such as managing prisms. In some embodiments, a client prism is an instance of a client volume, and a server prism is an instance of a server volume, with additional functionality, such as the ability to bring up an application options display, to display a loader volume while the prism is loading its content, to collide with other prisms, and to be part of a Transform Tree.

Client prism 115N-a and client prism 115N-b comprise virtual content that is generated by the application 140 and sent by the Cali Client 150N-a to the Universe Server 105N to be displayed in the user's landscape. In some embodiments, as the application 140 makes changes to the virtual content 115N-a and 115N-b, the changes to the virtual content are communicated from the Client prism 115N to the Universe Server 105N, and that information is stored inside the universe browser engine in the corresponding Server prism data structures (e.g., 113a or 113b in FIGS. 1M-1N or 113 in FIG. 1O). In some embodiments, the application 140 does not know where in the user's landscape a virtual content 115N-a is displayed. The universe browser engine may manage display location of the virtual content 115N-a via the corresponding Server prism 113a that is associated to the Client prism 115N-a (e.g., the virtual content 115a after it has been processed by the centralized rendering system).

The application 140 may request a new prism by accessing Universe Server 105N. In some embodiments, the universe server 105N may be a software module in the universe browser engine that communicates with centralized rendering service client(s) 150N from applications that provide virtual content for display in the user's landscape 110. For example, when a user wants to launch an application and display virtual content from the application in the user's landscape, the application may provide the virtual content to the universe browser engine via the centralized rendering service client from the application to the universe browser engine centralized rendering service on the universe browser engine to be displayed in a prism that may be anchored in the user's landscape.

In some embodiments, the icon grid application 160N may comprise a recent application section (not shown) and/or a general application section (not shown). The general application section comprises an icon representing each application installed on the mixed reality system. The general application section may be initially populated with a call to a Package Manager (not shown) to determine a list of installed packages. An icon is added for each application in each package. When the Package Manager notifies the universe browser engine of package installation and uninstallation, the icon grid application 160N adjusts its icons accordingly. The Package Manager Service manages the installation of applications and maintains information about those applications such as their names, icon graphics, security permissions, executable files and data files.

The recent icon section may be initially reconstructed from a log on disk, and then updated by calls from other services. The package name may be logged to disk when a Lifecycle Service notifies the launcher of an application start event, and when the Package Manager notifies the launcher of a package uninstallation event. A user may interact with the icon grid application 260 by choosing icons to launch, or extracting icons to place into the landscape.

The Lifecycle Service may be a centralized service that manages the process of starting, stopping, putting to sleep, and waking up applications. The Lifecycle Service also knows when applications terminate unexpectedly (crash). When any of these events happen, the service's listeners are notified, and the universe browser engine is one of the listeners. The universe browser engine accesses this service to start, stop, sleep and wake applications. In some embodiments, the Lifecycle Services provide application programming interfaces (APIs) for controlling the lifecycle of application processes running in the mixed reality system. The Lifecycle Services may spawn new processes to run application binaries with a set of permissions, and call APIs on a predefined interface implemented by the applications to control their lifecycle. The Lifecycle Service also provides a listener interface through which other modules may keep track of applications being started/stopped/paused/resumed. The Lifecycle Services may be a separate program from the launcher or the universe browser engine. In some embodiments, the Lifecycle Services may be a middleware.

In some embodiments, as shown in FIG. 1N, the icon grid application 160N comprises a centralized rendering service client 250b and a Client prism 115N-c. As discussed above, in some embodiments, applications that display content within a user's landscape may send their content to the universe browser engine via the centralized rendering service client 150N in communication with the universe server 105N. Here, the icon grid application 160N, which provides the icons of installed applications on the mixed reality system, for the launcher menu, is like any other application that provides content for display in the user's landscape. However, in some embodiments, the icons within the icon grid application, when selected by a user, may instruct the universe browser engine to launch and startup a new application, at which point, the new application may request the universe browser engine to create a new prism (e.g., through Universe Server 105N) so that the application may provide content to be displayed into the new prism. If the application is already executing, the universe browser engine may request the application to open a new prism.

The status bar application 170N comprises status indicators for the mixed reality system. The status indicators and the status bar application 170N may not be adjustable by the user. The status indicators may be initially populated by querying a first service for operating and maintaining Wi-Fi service, a second service for maintaining Bluetooth Service, and a third service for Status. When these services notify the Status Bar application 170N of an updated status, the status bar may adjust accordingly. The status bar provides the user quick glanceable information that they may react to quickly and efficiently from anywhere in the system. In some embodiments, the status bar may be displayed above the launcher. The four major sections in the status bar may be (1) global search, (2) notifications, (3) quick settings, and (4) power. Additional temporary sections may be added to the status bar when needed such as Music, Call, Sharing, etc.

When the user is in the Launcher menu, the status bar is condensed to glanceable icons. When the user swipes up to the top, it may trigger an animation and the status bar may expand. The status bar may stay up above the launcher while the user may swipe left and right through the launcher panels. When the status bar is highlighted, it may expand and animate forward. The sub-selection highlight may appear on the left by default, for example, on the global search. If there are other sections that have more pressing content (e.g., recent notifications, low battery, etc.) the sub-selection highlight may appear on that section instead.

The social panel application 180N may be composed of a series of contacts that the user may interact with. The social panel may be initially populated with a call to a Contacts Service for available contacts. Each contact may be added to the social panel and displayed to the user as an icon. When the social panel application 280 receives a new contact, updated contact, and removed contact events, the social panel application 180N may adjust its contacts information accordingly. The user may interact with contact icons by clicking on a contact icon to pop up an option menu with the various contact providers available. When the user selects a provider, the launcher application may start an associated application with the contact's information.

The store panel application 190N may allow the user to search for, download, and install application(s) 140 for the mixed reality system. When a user requests to download and install an application, the launcher application 130N may verify the user's identity with an identity verifying service (not shown), then may install the application with the Package Manager. The Lifecycle Service may be invoked if the user starts the application from the panel. In some embodiments, each panel in the launcher may function as separate applications instead of as one launcher application.

In some embodiments, the universe client 125N renders content specific for the universe browser engine. The universe server 105N does not render 3rd party applications. This is because content within a prism can only be rendered by the universe client 125N and not the universe server 105N. Thus, to render the infinity prism, loader volume/prism, and/or secondary UI (user interface) prisms, work may need to be delegated to the universe client 125N to render those particular types of content for the server. An infinity prism may be used by the universe to render additional graphics around prisms, for example, when two prisms collide. Infinity prisms are discussed further below. With the loader prism and the Secondary UI prisms, there may be specific communication between the universe server 105N and the universe client 125N to coordinate certain functionalities.

For example, the universe server 105N may be told that an application is done loading. The universe server 105N may then notify a client-side loader prism that was currently loading the application. The loader prism would have to react to the event that the application is done loading by showing the animation. Once the client-side loader prism is done showing the animation, the loader prism may notify the universe server 105N that it is done animating. Then, the universe server 105N may react to notification that the loader prism is done animating by force-placing the loader prism, destroying the loader prism, and displaying the App prism with the rendered animation in place of the loader prism). What has been disclosed is just one example of how the universe client 125N functions. One of ordinary skill in the art may appreciate there may be other examples of when the universe client 125N may assist the universe 130.

FIG. 1O illustrates an example of a universe browser prism in one or more embodiments. Application content is presented to a user inside of one or more bounding volumes called prisms. As discussed above, when a non-immersive application is executed in the mixed reality system, its content is rendered inside of a prism. The properties and characteristics of a prism allow the universe browser engine to consistently manage prisms within the user's landscape.

The volume space of a prism 113 may have clear and definitive boundaries as indicated with dashed lines in FIG. 1O. The boundaries provide a bounding volume for the virtual content 115 to only be displayed within the boundaries of the prism 113. The boundaries of the prism prevent the content from the application, displayed within the prism, to overflow or spill outside of the prism and into the user's landscape. The boundaries of the prism 113 may not be displayed to the user when the user sees the virtual content 115 displayed within the prism 113. This is an important feature because, in order to maintain a realistic display of a 3D content within the user's landscape, it is important to not show the boundaries of the prism that are bounding the virtual content 115. One of ordinary skill appreciates the importance of not displaying the boundaries of the prism that wraps around the virtual content 115 so the virtual content may be displayed in a more realistic way in the user's landscape. In contrast to 2D windows, the borders and boundaries of a 2D window is generally displayed so the user of the computer displaying the 2D windows may clearly distinguish content within one 2D window from content from another 2D window. In some embodiments, however, it may be advantageous to at least temporarily display the boundaries of the prism, for example, to help troubleshoot problems with one or more applications.

Applications are given instances of prisms 113 by the universe browser engine to place content within. Applications may render 2D and/or 3D content within the prism 113 using relative placement algorithms and/or arbitrary transforms, but the universe browser engine is still ultimately in charge of gross interaction patterns such as content extraction. Multiple applications may render to the universe browser engine via the prisms 113, with process boundaries separating the prisms.

Each prism allocated in the universe browser engine has an associated set of key-value properties that may be adjusted and may determine various bits of behavior or convey information about why a given prism exists. Some properties are read-only for normal applications, but for applications with the private API, these properties are writeable. A prism 113 may comprise prism properties 1100, application specific properties 1200, and virtual content 115. Additionally, some prisms 113 comprise Secondary UI volume 1300 for providing users with additional prism management options. However, in some embodiments, prisms may not have a Secondary UI volume 1300, for example, because these other types of prisms (e.g., Launcher Menu prisms) may not require the features provided by the Secondary UI volume 1300. As with the boundaries of the prisms, the Secondary UI volume 1300 may not be displayed to the user as well. When a user wants to make changes to a prism, the user may initiate a request to display an Application Options Menu that displays the UI controls of the prism within the volume space of the Secondary UI volume.

Depending on the application that they hold, prisms may require different properties in order to afford the proper feedback and behavior for their content. Application developers may select from a number of pre-programmed options for their prism when they create their application so their content may be represented correctly, based on their preferences. Below are examples of some of these options.

The prism properties 1100 define a prism, at least in part, and allow the universe browser engine to manage and maintain the prisms within the user's landscape. For example, prism properties 1100 may include one or more of a default size, a maximum size, a minimum size, an anchor/placement type (e.g., Option to billboard, etc.), a behavior of a given prism to the anchor type, an anchor location, a child prism spawn location, a child head pose highlight, an on surface behavior, an independent transformation control, a resize vs. rescale indicator, an idle state timeout variable, etc. The prism properties 1100 allow the universe browser engine the ability to track and manage each and every prism within the user's landscape. Having a single application managing the virtual content displayed within the user's landscape assures content displayed within a user's landscape are displayed in a consistent and reliable manner. Some of the prism properties 1100 are further disclosed below.

Maximum, Minimum and Default Size: Applications may have upper and lower bounds specified by an application developer (optionally, with additional limits from the universe browser engine). Additionally, application developers may have a Default size when the application first launches.

Option to Billboard During Movement Sequence: Certain objects (e.g. content that is planar), make sense to billboard towards the user during a movement sequence to encourage legibility and less management. For example, a certain content displayed on a planar surface may be positioned at a specific location and/or relative to an object, but their orientation is automatically computed so that the content displayed on the planar surface always faces the direction of the user viewing the content displayed on the planar surface. Other optional body dynamics behaviors could be added to this as well.

Child prism spawn location: prisms may spawn children to create flexible layouts. The application developers should be able to determine a responsive range of locations in which the children may spawn relative to the parent prism. Child Head pose Highlight: Applications may be able to choose whether head pose highlight on children prisms may be treated as separate highlights or if it continues to highlight all Child/Parent prisms as one unit.

Child prism relational behavior: prisms may determine whether their child prism(s) may be anchored to them or not in translation, rotation and scale, and also choose whether the child prism(s) will close with the main prism.

On Surface behavior: prisms may be snapped to a surface and query that surface to determine if they want a size/scale change. If the surface has space, the prism may resize to fit all or a percentage of the surface and factor in field of view (FOV) of the user.

Independent transformation control: An application may request independent control over its translation, rotation, and scaling. This may allow the application to move and transform itself.

Resize vs. Scale: Some applications may choose to resize their bounds instead of only scaling their content. This may accommodate more content to be displayed within their bounds. This may function more like existing computer 2D windows.

Idle State Timeout: Applications may be able to choose how long it takes for them to go into their idle state. This may handle situations where applications may wish to continue playing content even though they are out of view. For example, an application that displays live video may wish to continue to display content and play audio even though the user has temporarily looked away.

The application specific properties 1200 may be a list of key value pairs that stores the application specific state information for each prism. The list of key value pairs is specific to the application and the key value pairs provide the state information of the content of the application that is being displayed or rendered within the prism. The list of key value pairs may be different for each prism, depending on the application that is rendering into the prism. For example, if the application is a video streaming application, some key value pairs may include a video name, a viewed up to time for the video, an aspect ratio for displaying the video, etc.

Both the prism properties 1100 and the application specific properties 1200 for each prism may be stored within a data structure of the local database 137. The prism data are constantly updated while the user is operating the mixed reality system and interacting with the prisms. As discussed above, the prism instance data of the local database 137 may be persisted by synchronizing with the external database 150 on a periodic basis. In some embodiments, the local database 137 and the external database 150 may be synchronized in near real-time.

When a user launches an application in the universe browser engine, the user may pull a prism out of the Launcher Menu and place the resulting volume into space. Other methods of launching an application may be used, such as clicking on an application icon. In some embodiments, the user may move the prism around in altitude and azimuth (on a spherical shell) by moving a controller/input device (e.g., a totem) up or down. To move the object closer or farther away, the user may use a joystick on the totem to "push" or "pull" the prism, or may slide the user's finger over a touch sensitive part of the totem. This has the effect of changing the radius of the shell. In some embodiments, two buttons on the totem may cause the prism to grow or shrink. Finally, rotating the totem itself may rotate the prism. This assumes totems may have six degrees of freedom (DOF). This is consistent with the kind of controls used in VR painting applications, for example, but the totem could be any suitable user input device.

In some embodiments, prisms may not allow themselves to be placed in such a way that they fully or partially intersect other prisms. prisms may either not intersect at all, or may not inhabit/be actively displaying at the exact same location (anchor point), with the exception that prisms may overlap a small amount for physics purposes, as discussed below. If more than one prism is placed in the exact same location, the active application may be displayed and other applications anchored at the exact same location may be hidden. The user may be able to tell there are multiple applications at a location by, for example, dots displayed in the volume. For example, if there are three prisms/applications at a particular spot, there may be three dots. If the user is viewing application #2 of three, then the second dot may be brightened, while the other dots may be dimmed. The user may then swipe or scroll through different applications. The graphics may switch, and the dots may update (e.g., by brightening the active dot) to show which application is currently active.

In some embodiments, several prisms may be co-located at the same anchor location. At first glance, this may seem like an odd thing to do. With all of 3D space available for placing applications in the user's landscape, why place them in the same spot? For example, a user's favorite place to play virtual board games may be on a kitchen table. In the morning the user may like to play "Ticket To Ride" while eating breakfast. But when the user gets home from work, the user may like to play "Risk" against a computer. The user may have a plurality of board games located in the same spot, and switch between them when necessary.

In some embodiments, prisms may be placed at an arbitrary location in space. In this case, the prism may be anchored by a center point of the cubic/rectangular volume. But if (e.g. during placement) a prism is moved near a horizontal surface in the landscape, the prism may try to snap to the surface. The anchor point may then become the center of the bottom plane of the prism. Similarly, if a prism is moved towards a vertical surface (e.g. a wall) then it may try to snap to it, and the anchor point may become the side of the prism that is next to the vertical surface.

The purpose of an anchor point may be to place the prism so that it does not interpenetrate with the surface the prism is anchored to. The anchor point may also move with the object it is anchored to. When multiple prisms share the same location, that location may be the anchor point and not the center point of their respective volumes. Applications do not know and do not need to know where they are located, but the applications may ask their respective prism to see how the respective prism is being anchored. Applications may also specify which anchoring types are valid. For example, it doesn't make sense to anchor a Halcyon to a vertical surface.

All of the content (graphics) for the application may be contained within the volume of the prism. The universe browser engine may mask out graphics that extend outside the prism automatically. Because applications don't know about other applications in the world, the universe browser engine may manage interactions that happen between different prisms of different applications.

The user interface design for placing prisms may call for prisms to sway in a physical way (like an object on a string) while the prisms are being moved in the placement state. Instead of trying to predict what kinds of physical behaviors different applications are going to want, the prism may feed movement information to the application (through a binder interface) while it's being placed. The application may then behave appropriately.

There may also be physical behavior between prisms as they are being placed. This may override the application's physicality implementation, and the application may stop receiving movement data. Prisms may initially resist intersecting. If the user continues to push two prisms into the same location, then the prisms may snap to the anchor location of the prism it's intersecting with. This could be done in a way that feels elastic (e.g., similar to soap bubbles interacting with one another) and is roughly based in physics.

Audio emitters may be placed as child nodes in an application's scene graph. These nodes may be local to a root node transform. Thus, a prism may be moved wherein the movement of the prism does not require the application to update the audio node's transform. The universe browser engine may be responsible for the final transform of the audio emitter to the world space. The prism may also be responsible for constraining audio nodes to its boundaries. Applications may not emit audio from a point outside of their respective prisms.

In some embodiments, it may not be desirable to spatialize audio. For example, if a user places a virtual television (TV) on a wall, and is focused on the TV image, the TV's audio may be provided through to the user without modification. This is likely to provide a better audio experience to the user. In the case of surround sound, the audio signal already has spatial information. The sound may be emitted from virtual speakers placed in optimal locations relative to the TV.

In some embodiments, on a button press to control audio strength by the user, the universe browser engine may check the head pose to determine which prism the user is looking at and send a volume-up or volume-down event to the corresponding prism. The prism may forward that information on to the application running in the prism, and the application could decide how to interpret it. If there are no applications in focus in the landscape, then volume button settings may adjust the global volume.

In some embodiments, one difference between traditional 2D windows and prisms 113 is that with 2D windows, borders that set the boundaries of a 2D window are intended to be seen by users to provide a concrete border for encompassing content within the 2D window separate from content outside of the borders of the 2D window. However, in some embodiments, borders of the 3D windows (e.g., prisms 113) are meant to be invisible. If users can see the outline (e.g., borders) of every prism, it would break the illusion of "reality" and the virtual content displayed within the prism having its borders displayed would appear like computing/digital/virtual content instead of real. In some embodiments, the borders may be displayed, for example to enable user manipulation as needed.

Another difference is that 2D windows are commonly meant to be controlled and/or interacted with by the user. For example, a close button may be always appearing in the upper right-hand corner of a traditional 2D window, or a menu bar may be displayed at the top border of a 2D window. However, with the prisms, a user generally does not interact with the prism and its boundaries. Instead, a secondary menu (e.g., an apps option menu) may be pulled down temporarily for the user to control and manage/manipulate the prism from a list of options.

Furthermore, 2D windows are independent from its surroundings. For example, what is displayed on a computer screen does not automatically change if the user moves the screen. However, prisms need to be placed in context with the real world. For example, each prism may be placed into the real world relative to (1) objects in the real environment such as a wall, a table, etc.; (2) virtual objects created to provide a backdrop or canvas for the prism to anchor to; and/or (3) the user. In some embodiments, the prisms may be placed in context with a passable world as well as the real world.

Yet even further, in some embodiments, prisms may not be allowed to overlap/interpenetrate with one another, with the exception that prisms may overlap a small amount for physics purposes. For example, in some embodiments, when virtual content within two or more prisms collide, the virtual content may appear to show a bounce between the two virtual contents when they appear to collide with one another. Here, the prisms may overlap for a small amount to create the effect of the bounce between the two virtual content. In some embodiments, when the bounding boxes for two or more prisms collide, the prism, and hence the prism's content, may appear to bounce.

However, 2D windows on a computer do overlap and, in many cases, 2D windows may be cascaded on top of one another, hiding each other from view of the user. In some embodiments, if two prisms are anchored at the same location in the user's landscape 110, one of the prisms may be displayed while the other prism is minimized from display wherein an icon or a text or an image (or any other visual indicator) is displayed to indicate to the user that another prism is anchored at the exact same location. In some embodiments, an infinity prism may be implemented to render additional graphics around prisms, for example, when they collide. In some embodiments, an infinity prism may be a prism with its bounds set to infinity.

For example, if two prisms are close to colliding, the universe browser engine may render a glow in the region of space between the two prisms. In order to handle these exceptions, the universe browser engine may create an infinity prism that may encompass all space around/surrounding the two prisms, the user's entire field of view (what the user can currently see), the user's entire field of regard (what the user could see if they moved around), etc. This may allow the universe browser engine to draw graphics anywhere between the two prisms. In some embodiments, the infinity prism may not collide or interact in any way. In some embodiments, the infinity prism does not have a secondary UI, etc. In some embodiments, only the universe browser engine may have access to the infinity prism. The infinity prism may be created at universe browser engine initialization and may always be present until the universe browser engine shuts down. In a second example, an infinity prism may be useful in order to have a character (e.g. avatar, personal assistant, butterfly, animal, etc.) move between the other landscape apps to, for example, explain to the user what each application is and/or how to use the application.

Figure 1P:
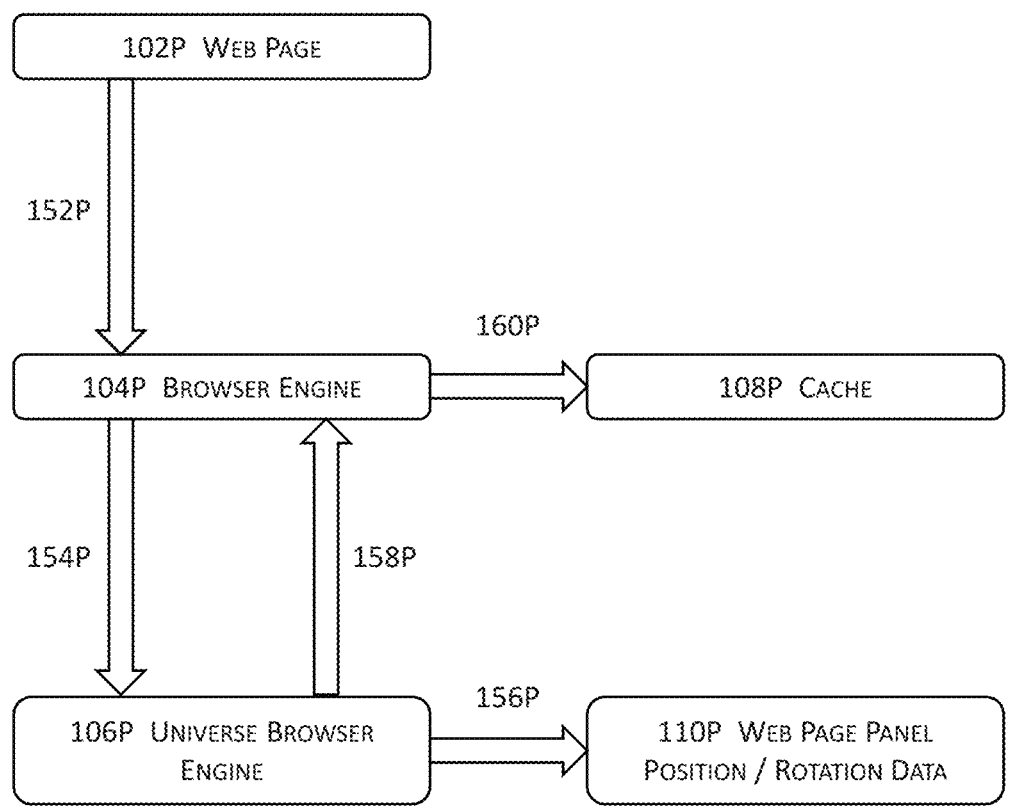
FIG. 1P illustrates an example of initialization of a browser for displaying a web page and resetting the position and/or rotation data of the web page panel to default in one or more embodiments.

FIG. 1P illustrates an example of initialization of a browser for displaying a web page and resetting the position and/or rotation data of the web page panel to default in one or more embodiments. In this example, a browser (104P) initializes to load a web page of interest (102P). The browser (104P) functions in conjunction with a universe browser engine (106P) that transmits the default position and rotation data to the browser engine (104P) at 158P. The universe browser engine (106P) further resets the position and rotation data of the web page panel for the web page at 156P. The browser engine (104P) receives the default position and rotation data from the universe browser engine and stores the default position and rotation data in a non-transitory computer readable medium (108P) at 160P.

Figure 1Q:
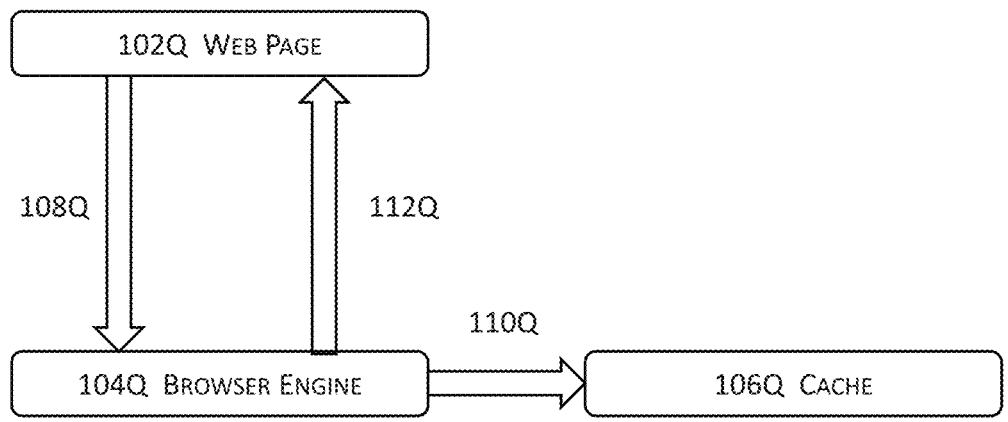
FIG. 1Q illustrates an example of the determination of the position and/or rotation data of a web page panel with a GET request in one or more embodiments.

FIG. 1Q illustrates an example of the determination of the position and/or rotation data of a web page panel with a GET request in one or more embodiments. In this example, when a web page of interest (102Q) may be coded to issue a request to get the position and rotation data for the web page panel at 108Q to a browser or browser engine (104Q) for example, upon loading the web page by a browser, in response to a user's input, or triggered by certain events, etc. The browser or browser engine (104Q) may obtain the position and/or rotation data from a non-transitory computer readable medium (106Q) at 110Q. The browser or browser engine (104Q) may then return this position and/or rotation data from the non-transitory computer readable medium (106Q) to the web page at 112Q.

Figure 1R:
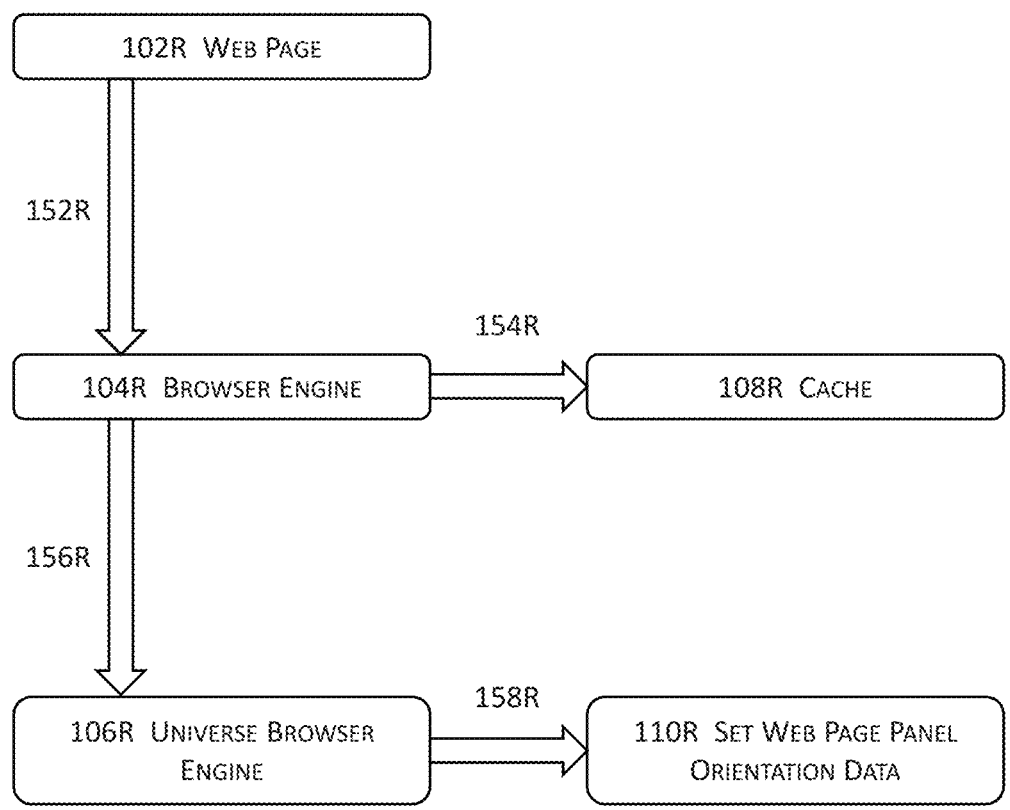
FIG. 1R illustrates an example of the determination of the position and/or rotation data of a web page panel with a SET request in one or more embodiments.

FIG. 1R illustrates an example of the determination of the position and/or rotation data of a web page panel with a SET request in one or more embodiments. In this example, when a web page of interest (102R) may be coded to issue, upon loading the web page by a browser, a request to set the position and rotation data for the web page panel at 152R to a browser or browser engine (104R). Upon receiving the position and/or rotation data, the browser or browser engine (104R) may update the position and/or rotation data previously stored in a non-transitory computer readable storage medium 108R (e.g., cache) at 154R.

The browser or browser engine (104R) may further pass the position and/or rotation data received along with the SET request to the universe browser engine (106R) at 156R. The browser or browser engine (104R) may then return this position and/or rotation data from the non-transitory computer readable medium (108R) to the web page. To fulfill the SET request, the universe browser engine 106R may set the web page panel's position and/or rotation data at 110R by using the position and/or rotation data received along with the SET request and transmitted at 158R.

At least some of the embodiments described with reference to FIGS. 1S-1X and 2J-2M provide the technologies to and enable webpage developers to manipulate (e.g., setup, adjust, etc.) the orientation (e.g., rotation about one or more axes) of webpages but not the position of the webpages. In some of these embodiments, a developer is limited to setting a webpage to a horizontal orientation or a vertical orientation with respect to a user's frame of reference but not any other angles in between. In some other embodiments, a developer may be limited to setting a webpage to a horizontal orientation or a vertical orientation and any other predetermined angles in between. The manipulation of the positions of these webpages may be provided by, for example, a universe browser engine described herein but is not provided to the webpage developers. In these embodiments, a webpage starts at a position determined by, for example, a universe browser engine described herein. With the provisioning of the ability to manipulate the orientation of a webpage to the developer of the webpage as well as the ability to manipulate both the position and the orientation of the webpage by, for example, a universe browser engine, these embodiments may also provide the technologies to and enable users of an XR system provided herein to manipulate both the position and the orientation of webpages.

Figure 1S:
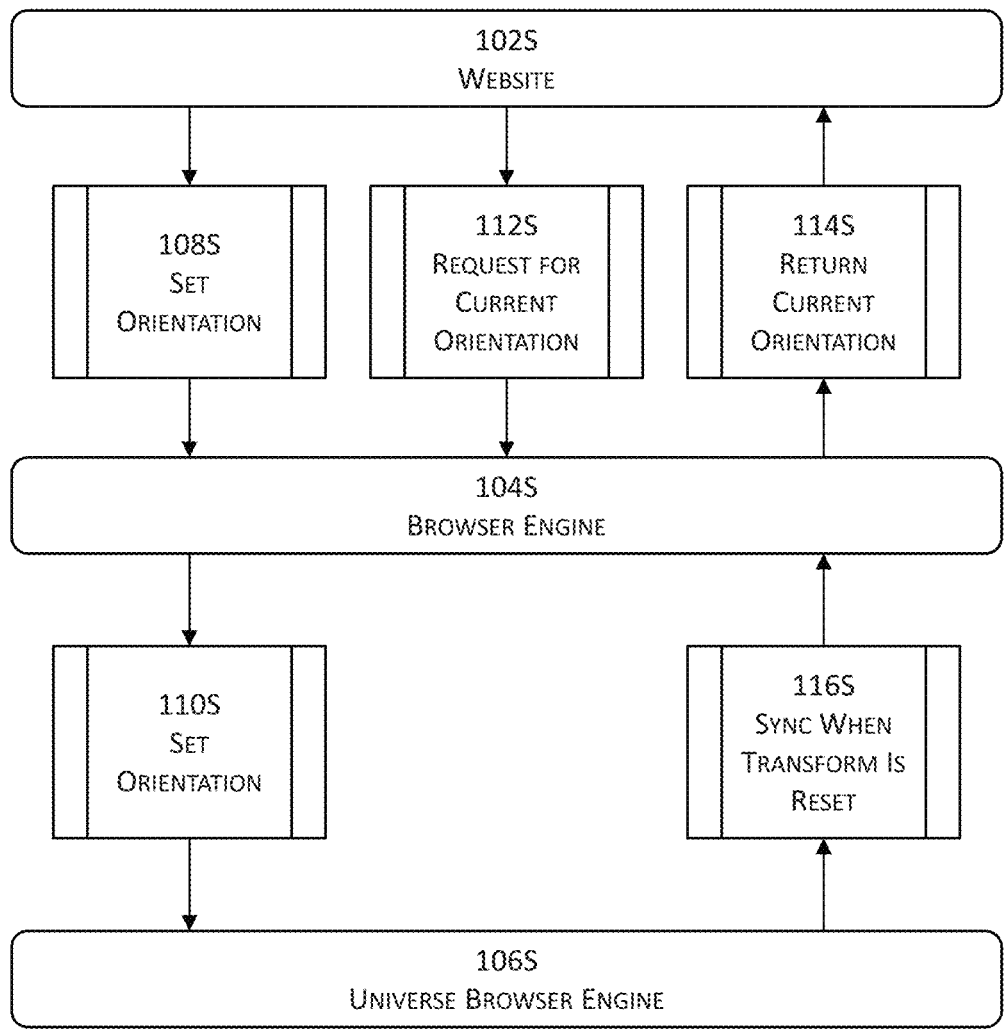
FIG. 1S illustrates another high-level block diagram of a simplified system that interacts with a website for managing and displaying web pages and web resources in a three-dimensional virtual space with a mixed reality system in one or more embodiments.

More particularly, FIG. 1S illustrates a high-level block diagram of a simplified system that interacts with a website for managing and displaying web pages and web resources in a three-dimensional virtual space with a mixed reality system in one or more embodiments. More particularly, the universe browser engine 106S may transmit the orientation data of a web page to the browser engine 104S to store such data in the browser engine 104S. A universe browser engine (e.g., 106S) may serve as a 3D windows manager that is analogous to a 2D windows manager that is running on a laptop or desktop computer for managing 2D windows displayed on a display screen of the laptop or desktop computer. A universe browser application functioning in conjunction with a universe browser engine also manages the generation, placement, and display of virtual contents in a user's landscape via the mixed reality system. When a browser engine 104S initializes (e.g., when a user launches the browser or load/visit a website) to display a web page or contents therein of a website 102S, the browser 102S may set the orientation data of the web page to be rendered by the browser engine 104S when the website is coded to incorporate a set of APIs that are coded to both set the orientation data to a client's browser and to obtain the orientation data from the client browser (108S).

A browser engine is often a software component of a web browser that performs tasks such as transforming HTML and/or other resources of a web page into an interactive visual representation on a user's device (e.g., a mixed reality headset). The following description may reference Chromium or Chromium-based browsers although other browsers (e.g., Mozilla's Firefox, Apple's Safari, Microsoft's Edge and Internet Explorer, Google's Chrome, Opera, 3D browsers, etc.) are also contemplated; and the techniques apply with full, equal effects to different browsers that correspond to their respective browser engines (e.g., Gecko for Mozilla, WebKit for Safari, Blink for Chrome, Chromium-based browsers, Microsoft's Edge, and Opera, and Trident for Internet Explorer, etc.)

The browser engine 104S may include any publicly available browsers such as the browsers mentioned immediately above or any custom browsers (e.g., 3D browsers). One of the functions of the browser engine 104S is to provide the functions including, for example, transforming HTML documents and other resources of a web page into an interactive visual representation on a user's device with the orientation data for the web page, calculating the graphical coordinates for the visual representation using the orientation data provided either by the website or by the universe browser engine 106S, painting or rendering the prism (or a portion thereof), etc.

This set of APIs pertaining to one or more embodiments for managing and displaying webpages described herein may include an API that complies with the Portable Operating System Interface (POSIX) API standard and is platform- or operation system-independent to provide spatial computing functionality. This set of APIs may be incorporated into the code of a website in some embodiments as previously described above and/or may be integrated into a part of the operation system or software applications residing on the mixed reality system in some other embodiments.

This set of APIs not only sets and gets the orientation data between the website 102S, the browser engine 104S, and the universe browser engine 106S but also functions in conjunction with a runtime layer and one or more 3D engines between the operating system and software applications (or more precisely between the operating system service layer and software applications). This runtime layer includes libraries, applications, services, etc. and provides (either alone or in conjunction with a 3D engine) an advanced graphical user interface for the underlying mixed reality system as well as various computing functionalities such as three-dimensional translation and rotation transforms, 3D models with material and skeletal 3D model animations, 2D sprite animation, high fidelity spatialized text rendering for spatial computing, 2D and Soundfield Audio, 2D and stereoscopic video, rigid body collision physics, real-time particle FX, input events and haptics control, hand gestures, speech recognition and speech-to-text, real-time spatial computing technology for rendering objects, lighting, shadows, and real-world occlusion, etc.

For example, this runtime layer may include a set of three-dimensional translation and rotation transforms that may be applied to, for example, a prism (which will be described later), a virtual object, a browser window, a rendered web page, etc. displayed in the virtual three-dimensional space such that the virtual object, browser window, rendered web pages, etc. or any attributes thereof (e.g., display coordinates, sizes, shapes, perspective, lighting effects, etc.) appear to be or are perceived to be real or close to real by a user.

Returning back to FIG. 1S, with the set of APIs, the website 102S may send a request for orientation (112S) from the browser engine 104S. In this case, the browser engine 104S may transmit the most recent orientation data to the website (114S). As described above, the universe browser engine 106S may store the orientation data in or with the browser engine 104S (e.g., in a cache accessible by the browser engine 104S) so that the browser engine 104S may respond to such requests from websites 102S without additional delay from, for example, obtaining such orientation data from the universe browser engine 106S.

In addition to returning the latest orientation data (114S) to the website 102S, the browser engine 104S may transmit the orientation data (110S) either alone or together with a rendered web page to the universe browser engine 106S. The universe browser engine 106S creates or identifies a prism (or a smaller volume thereof) based on the orientation data received via 110S; and the universe browser engine 106S synchronizes the orientation data (116S) with the browser engine (104S). The universe browser engine 106S may call the browser engine 104S to invoke its native functions, libraries, and/or APIs (e.g., RenderWidget, OpenGL APIs, OpenGL ES 2.0 APIs, etc. in Chromium or WebKit, Almost Native Graphics Layer Engine, Direct3D APIs, WebGL, Gfx API's, etc., or any combinations thereof) to render the contents of a webpage for display in the prism or a portion thereof based on the orientation data.

In some embodiments, the universe browser engine 106S may invoke one or more 3D engines running above the operating system core and the operating system services in the operating system stack to render 3D contents. These one or more 3D engines may include commercially or publicly available 3D engines (e.g., Unreal Engine 4, Unreal Engine 3, CryEngine V, Unity 3D, Source Engine, Source Engine 2, etc.) that provide an abstraction layer of the graphics processing unit (GPU), any custom 3D engines for 3D and/or 2D graphics. In some of these embodiments, a mixed reality system needs not incorporate the entire 3D engine. Rather, the mixed reality system may incorporate a smaller portion such as a rendering engine or rendering APIs, a physics engine for emulating the laws of physics, a scripting engine for parsing and executing scripts such as JavaScript scripts, a memory management module, and/or a threading module, etc. In some embodiments, a mixed reality system described herein may invoke a renderer for rendering 2D contents and a separate renderer for rendering 3D graphics.

The user may further alter the orientation of the webpage displayed in the virtual 3D space through the mixed reality system. For example, a user may freely move and/or rotate the displayed webpage, a placeholder therefor, or a mini-preview version of the webpage by grabbing the software handles that are respectively associated with orienting the displayed webpage, a placeholder therefor, or a mini-preview version of the webpage. The orientation data of the web page is thus modified; and the universe browser engine 106S may further synchronize (116S) the orientation data with the browser engine 104S. Once the browser engine 104S then replaces the original orientation data with this modified orientation data.

It shall be noted that in some the embodiments described with reference to FIGS. 1S-1X and 2J-2M, the orientation data of a webpage or a panel thereof may include both positioning and orientation data in some embodiments, although the orientation data may include only the orientation but not positioning data in some other embodiments. It shall be further noted that orientation data may refer to either the positioning data, the orientation data, or both the positioning and orientation data in those embodiments where orientation data includes both the positioning data and the orientation data. In some embodiments where the orientation data includes only the orientation data (e.g., rotation about one or more axes), these embodiments provide webpage developers the capability of manipulating (e.g., setting, changing, etc.) the orientation but not the position of webpages. In some embodiments, a developer of a webpage may use, for example, Window.VirtualWorld.Position and Window.VirtualWorld.rotation to obtain the webpage panel's current position and rotation; and the developer may further use, for example, Window.VirtualWorld.Position=new Dom Point(x, y, z) and Window.VirtualWorld.rotation=new Dom Point(x, y, z) to set the position and rotation, respectively.

Figure 1T:
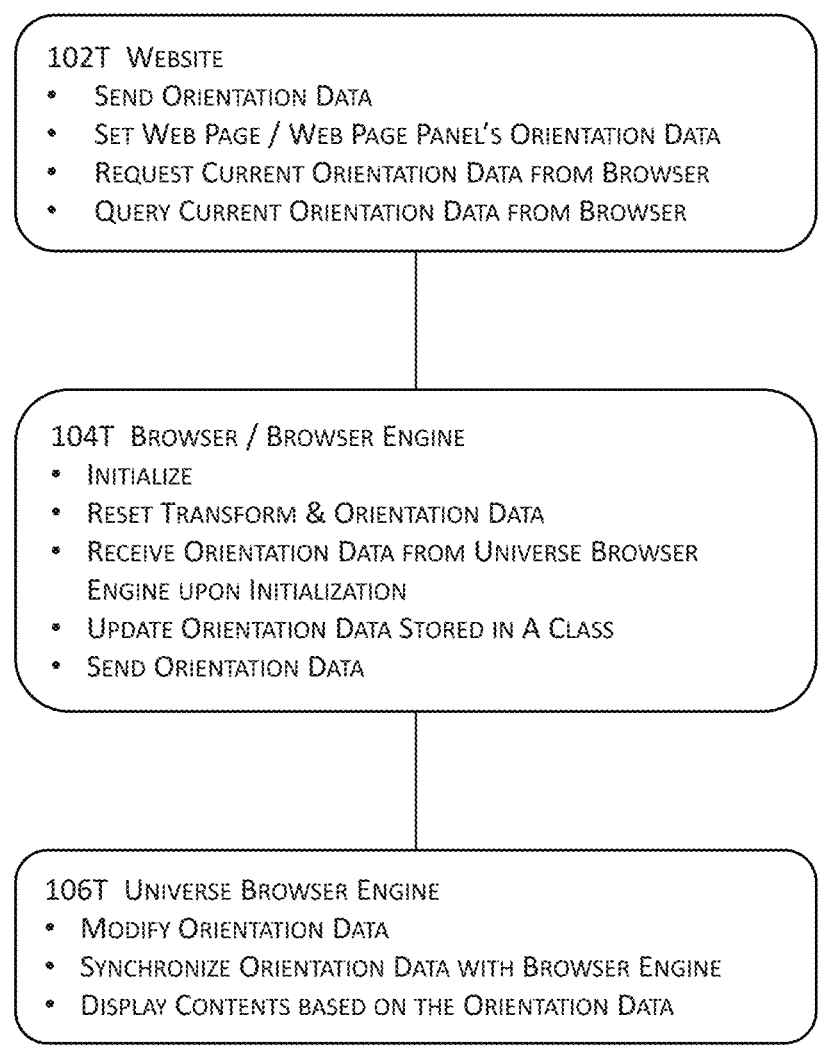
FIG. 1T illustrates another high-level block diagram of a simplified system that interacts with a website for managing and displaying web pages and web resources in a three-dimensional virtual space with a mixed reality system in one or more embodiments.

FIG. 1T illustrates another high-level block diagram of a simplified system that interacts with a website for managing and displaying web pages and web resources in a three-dimensional virtual space with a mixed reality system in one or more embodiments. More particularly, FIG. 1T illustrates the interactions between a browser panel for a web page 102T, a browser engine 104T, and a universe browser engine 106T as well as respective tasks and functions performed by the browser 102T, the browser engine 104T, and the universe browser engine 106T in some embodiments. A browser or web browser is a software application for accessing information on the World Wide Web where web resources (e.g., individual web pages, images, videos, etc.) are identified by Uniform Resource Locators to enable the web browser to retrieve these web resources from web servers and display them on a user's device.

A browser engine (e.g., 104T) is a software component of a web browser that performs tasks such as transforming HTML and/or other resources of a web page into an interactive visual representation on a user's device (e.g., a mixed reality headset). Various embodiments described herein leverage any publicly or commercially available browsers and their respective engines for developers and users to manage and display Internet contents and to utilize web resources by using at least the aforementioned set of APIs, a mixed reality system, and the software applications and libraries (e.g., a universe browser engine).

The website may set the orientation data for the web page of interest or the panel of the web page (102T) and may further request the current orientation of a current web page (102T). In some embodiments where the developer of a web page may have desired to present the web page of interest in a certain manner including certain orientation data, the website may further send such orientation data to the browser (102T).

In some embodiments, when a browser is launched or initialized for displaying contents from the Internet, the browser initializes to render and display a web page or contents therein of a website (104T). The browser may also send the orientation data of the web page to be rendered by the browser engine (104T). For example, when the website is coded to incorporate the aforementioned set of APIs that are coded to both set the orientation data to a client's browser and to obtain the orientation data from the client browser, the browser may receive this orientation data from the website and set the orientation data for the web panel for displaying the contents from the website.

The browser may reset the transform(s), the orientation data for the web panel for the web page (104T). For example, the browser may reset the 3D transform(s) (e.g., 3D translation transform(s), 3D rotation transform(s), and/or 3D scaling transform(s)) for the web page panel to default value(s) or state(s). The default value(s) or state(s) may be stored in a non-transitory memory (e.g., cache memory) accessible by the renderer (e.g., RenderWidget for WebKit and Chromium) in one embodiment. The browser may relay a request for orientation from the website to its browser engine (104T). A browser engine acts as an intermediary between a website and a universe browser engine residing in an extended reality (XR) system.

In some embodiments where the orientation data of the web page panel is stored in the aforementioned non-transitory memory, the browser or its browser engine may respond quickly to the request for orientation data from the website, without additional delay from, for example, obtaining such data from the universe browser engine. This orientation data accessible by the browser engine may be synchronized when a website or a browser changes the data or a portion thereof. In addition or in the alternative, this orientation data accessible by the browser engine may be initialized and reset by the browser. In some embodiments, this orientation data may be updated by a website's request (see 102T) for orientation data. In some embodiments where the browser engine receives the orientation data from the website, the browser engine may further pass the data to the browser.

The browser may also send orientation data to the universe browser engine (104T) either alone or together with the rendered contents (e.g., a web page). The universe browser engine may create a 3D virtual volume (e.g., a prism) for displaying the rendered webpage based at least in part upon the orientation data from the browser engine. In addition or in the alternative, some embodiments may provide users with the capability to manipulate a rendered webpage (or contents) in a virtual 3D space created by an extended reality (XR) system.

The user may thus move and/or rotate the rendered webpage in the virtual 3D space so that a new set of transform(s) need to be applied to the rendered webpage. The operation system of the extended reality system may include the runtime layer and a 3D engine to apply the new set of one or more transforms to the rendered webpage based at least in part upon the orientation data received from the browser engine. After the new set of one or more transforms is applied, the universe browser engine may also communicate the new orientation data back to the browser engine (at 106T) to update the previous orientation data therein.

When the browser initializes or when a user manipulates a rendered web page and hence changes the orientation data, the browser engine may receive the orientation data, if available, from the universe browser engine (at 104T). The browser engine may thus update the orientation data stored in a non-transitory memory (e.g., cache) with the refreshed orientation data received from the universe browser engine (at 104T) and stored in, for example, the cache memory. The browser engine may also set the orientation data for the web page panel (at 104T). In an example where the developer of a web page has set the orientation of a web page (e.g., the developer has set the position and/or rotation of a web page displaying an online chess game), the browser may also set the orientation data of the web page panel according to the orientation data received from the website.

In some embodiments where a user is allowed to alter the position of the web page panel displayed within a prism, a universe browser engine may update the position data stored in a non-transitory memory (e.g., a cache) with the updated position data based on the user's manipulation of the position of the web page panel and stored in, for example, the cache memory. The universe browser engine may also set the position data for the web page panel (at 104T)

In addition, the browser engine may send the orientation data to the universe browser engine (at 104T) so that the universe browser engine may determine (e.g., by creating anew or identifying from existing) a virtual 3D space (e.g., a prism) for presenting the rendered web page via an extended reality system. In some embodiments where the user is provided with the capability to further manipulate the rendered web page, the browser engine may provide the orientation data of a rendered web page to the universe browser engine which, in turn, provides the software handles for the user to manipulate the rendered web pages and performs the corresponding transform(s) to respond to the user's manipulation.

A universe browser engine may also include or function in conjunction with an operating system, one or more operating system services, a set of one or more runtime applications and libraries, one or more 3D engines, and a suite of applications of an extended reality system to provide an advanced graphical user interface and functionality for a user to manage and display web pages and other contents and/or resources in a virtual 3D space (e.g., one or more prisms) at 106T. For example, one of the functions of a universe browser engine is to provide orientation data (and/or position data) of a web page (or other virtual contents) to the browser engine (at 104T). The universe browser engine also synchronizes (at 1068) the most recent orientation data (and/or position data) with the browser engine so that the most recent orientation data may be pushed (from the universe browser engine) to the browser engine or pulled (by the browser engine) from the universe browser engine.

Figure 1U:
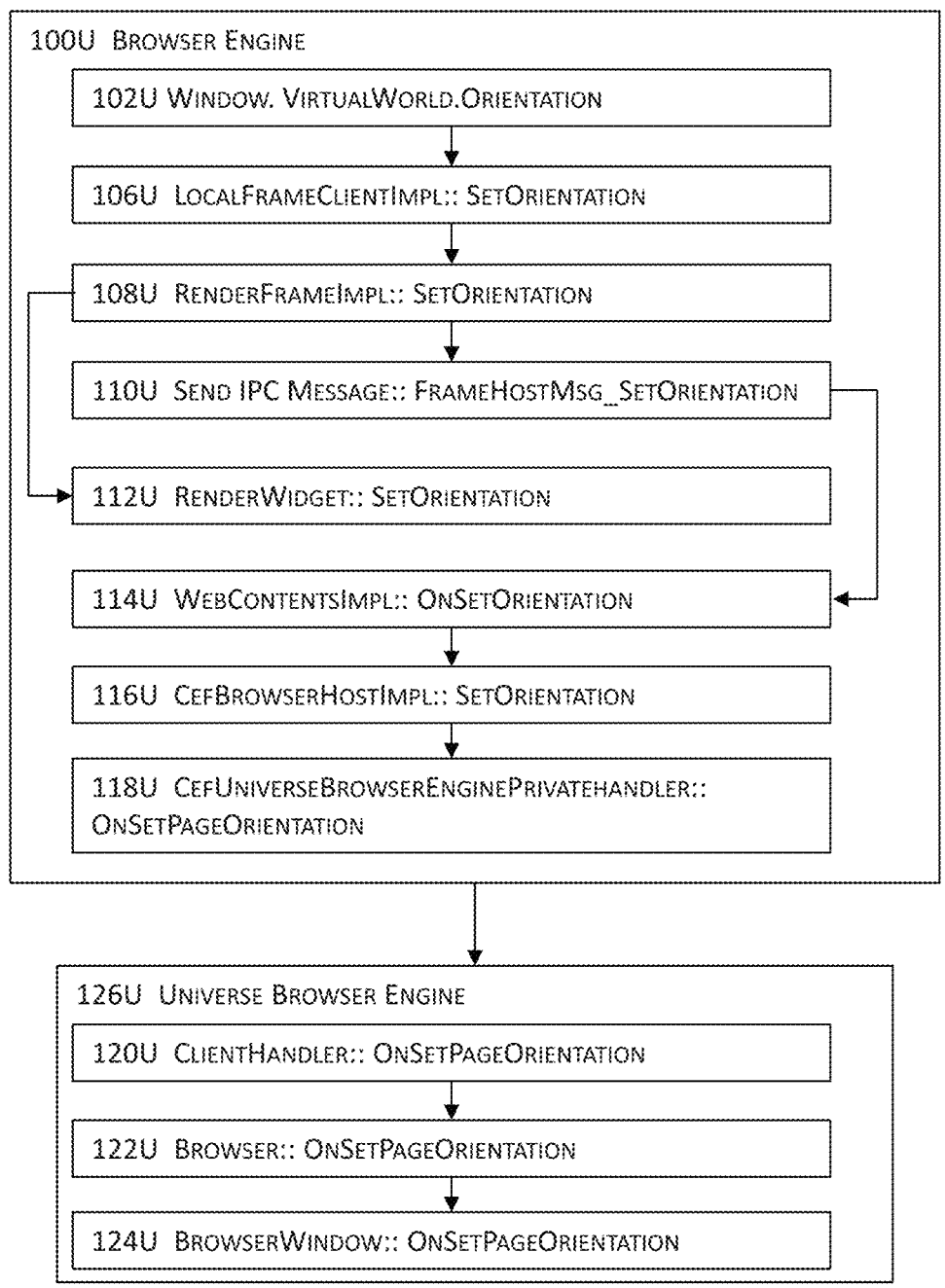
FIGS. 1U-1W illustrate various detailed block diagrams for an example browser engine and a universe browser engine that may be used in managing and displaying web pages and web resources in a three-dimensional virtual space with a mixed reality system in one or more embodiments.
Figure 1V:
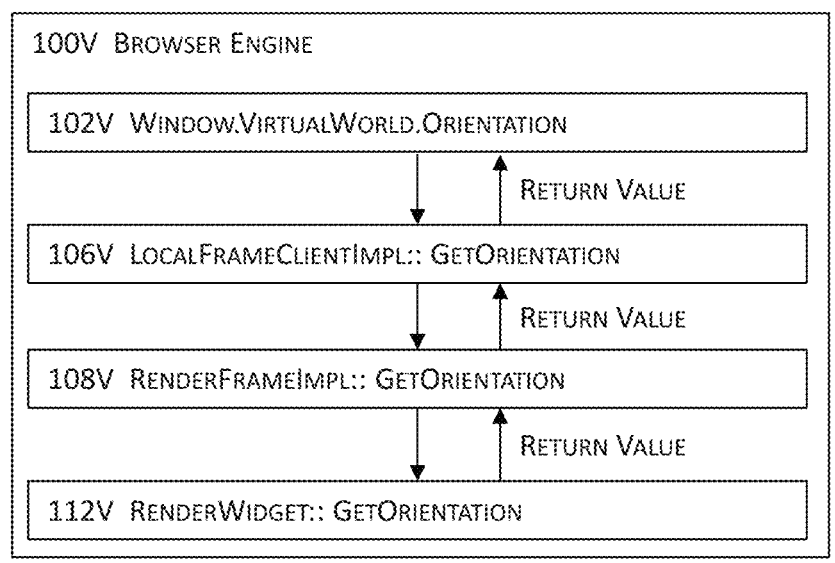
Figure 1W:
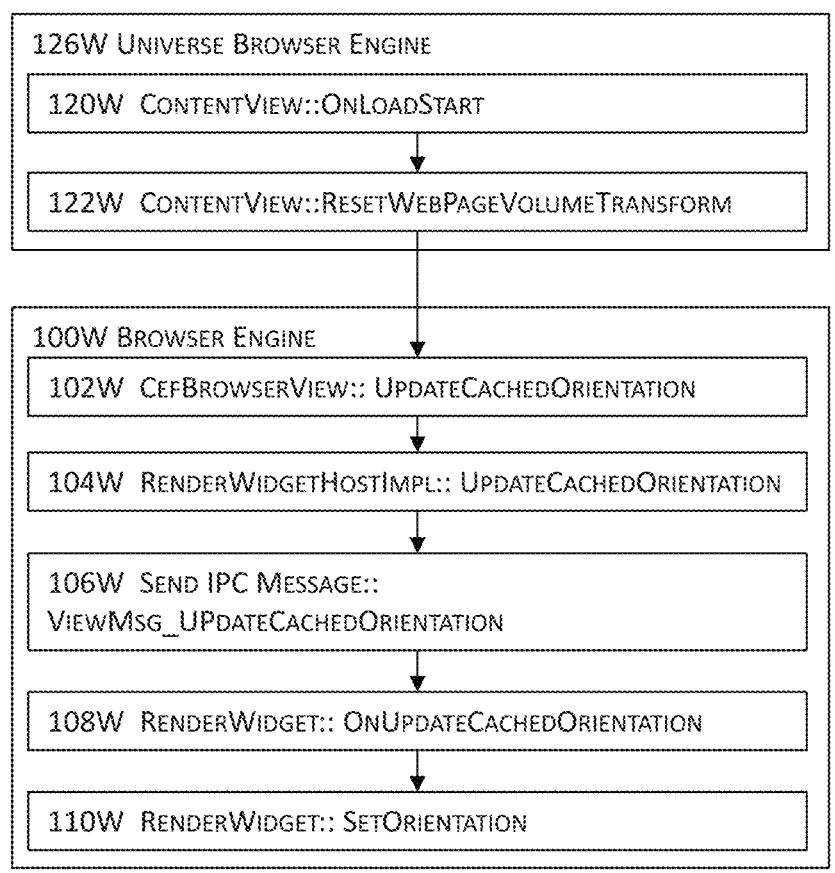

FIGS. 1U-1W illustrate more detailed block diagrams for an example browser engine and a universe browser engine that may be used in managing and displaying web pages and web resources in a three-dimensional virtual space with a mixed reality system in one or more embodiments. More specifically, FIG. 1U illustrates simplified, pseudo code for setting the 3D orientation data of a web page panel in a virtual 3D space (e.g., a prism) in some embodiments. In these embodiments, the pseudo code is based on a similar set of code for Chromium although the code for other web browsers is also contemplated, and the techniques described herein can be applied with full, equal effects.

For example, a browser engine 100U may execute Window.VirtualWorld.Orientation at 102U to initialize the process for setting the orientation data of a web page panel in a universe browser engine. In some embodiments, Window.VirtualWorld.Orientation may utilize, for example, OpenGL Mathematics (GLM) (or any other mathematics libraries) or the simple graphics library for CSE20211 (Gfx) to set and obtain the orientation data (e.g., by the pseudo code "glm::vec3 old_pos(0.0f)", "glm::quat rotation(glm::vec3(0.0f))", "glm::vec3 scale(1.0f)", and "glm::mat4 transform=web_container_→ getCurrentVolumeTransform( )" in GLM or gfx::Point3F rot=local_frame_client→GetVirtualWorldRotation( ), or gfx::Point3F flat_rot{-M_PI_2, 0.0 f, 0.0f} in Gfx) of a web page panel based in part or in whole on the orientation data and one or more transforms for 2D and 3D entities in a 2D or 3D space. In some other embodiments where a webpage developer is allowed to manipulate (e.g., setup, alter, etc.) only to choose between 0-degree and 90-degree rotation but not position of a webpage panel, the Window.VirtualWorld.Orientation may accept an input (e.g., a string "flat" or "upright") that is defined as an enumerated type ("enum") in a browser engine. In some of these embodiments, a universe browser engine may convert the input of the enumerated type to GLM type and set the data to the webpage panel. For example, in some case where the input indicates a flat webpage panel, the rotation of the webpage panel may be set to {-M_PI_2, 0.0 f, 0.0f}. As another example, in some cases where the input indicates an upright webpage panel, the rotation of the webpage panel may be set to {0, 0, 0}. It shall be noted that the pseudo-code, the programming language, and the names of various classes, variables, etc. are used in this application for illustration and explanation purposes, and that any other suitable programming language(s), names, etc. serving identical or substantially similar purposes are also contemplated and may also be used to achieve such purposes. The following is an example code segment for the aforementioned description implemented in a portion of a header file to include the function declaration(s) although it shall be noted that other similar or equivalent implementations have also been contemplated and may thus be used:

```
class CORE_EXPORT VirtualWorld { final : public ScriptWrappable,
        public PageVisibilityObserver,
        public SharingSessionObserver,
        public ContextLifecycleObserver {
    DEFINE_WRAPPERTYPEINFO( );
    USING_GARBAGE_COLLECTED_MIXIN(VirtualWorld);
public:
    VirtualWorld(LocalFrame* d);
    virtual ~VirtualWorld( );
    static VirtualWorld* create(LocalFrame* d);
```

```
    void sync( );
    void update( );
    unsigned length( );
    VirtualVolume* AnonymousIndexedGetter(unsigned index);
    float browserWidth( );
    float browserHeight( );
    float browserBreadth( );
    float viewportWidth( );
    float viewportHeight( );
    ... ...
    String orientation( ) const;
    void setOrientation(String orientation);
    ... ...
};
```

The browser engine 100U may further execute the LocalFrameClientImpl::SetOrientation (106U) (or LocalFrameClient*), RenderFrameImpl:SetOrientation (108U), and send an inter-process communication (IPC) message—FrameHostMsg_SetOrientation as described above or with the VirtualWorld::setOrientation, RenderFrameHost*, WebLocalFrameImpl* described herein. The construct RenderFrameImpl:SetOrientation may be used to call RenderWidget::SetOrientation and to send IPC messages. The construct LocalFrameClientImpl::SetOrientation is derived from the C++ LocalFrameClientImpl.cpp and uses, for example, a low-level graphics abstraction layer such as Gfx or Gfx-rs as well as the orientation data to set and obtain the orientation data for a client frame.

The construct RenderFrameImpl::SetOrientation may be derived from the C++ RenderFrameImpl.cpp and is configured to invoke the renderer (e.g., RenderWidget for Chromium-based browsers) based on Gfx and the orientation data and pass the frame back to the browser engine (e.g., Blink for Chromium-based browsers). The browser engine 100U may also invoke the renderer or rendering process at least by executing RenderWidget::SetOrientation at 112U to update the orientation data stored in the RenderWidget class for a webpage panel (e.g., the orientation value stored in a cache memory). A separate content rendering process may be further executed or triggered to execute by one or more processes (e.g., one or more rendering functions) to "paint" or render the content of the web page of interest according to the 3D orientation data. More particularly, the renderer process, RenderWidget, may use a glue interface (e.g., WebWidgetDelegate) and implements the abstract interface in the glue interface. This abstract interface may include, for example, a 2D window or 3D volume in the display space to receive input events and to render contents into. In some of these embodiments where auxiliary display items (e.g., a selection box with up/down arrows showing a list of options, a tab, a pop-up window, navigation commands, etc.) are to be rendered, the browser engine 100U may further execute another render process (e.g., RenderView) for such display items.

The aforementioned header file(s) may be augmented with some example code as listed below although other similar or equivalent code has also been contemplated and may thus be used to achieve similar purposes.

```
VirtualWorld:: VirtualWorld(LocalFrame* frame)
    : PageVisibilityObserver(frame ? frame->GetPage( ):
        nullptr),
    SharingSessionObserver(frame ? frame->GetPage( ):
        nullptr),
```

-continued

```
            ContextLifecycleObserver(frame ?
            frame->GetDocument( ): nullptr),
            is_sharing_(false),
            session_id_(-1),
            local_frame_(frame),
            current_node_id_(0),
            clean_up_animated_stage_(false),
            clean_up_static_stage_(false) {
    endpoint_ = std::unique_ptr<IPCEndPoint>(
        new IPCEndPoint(local_frame_, descriptor_map_));
    KaliClient::_DisableDirectInputMode( );
    KaliClient::_DisableNotificationService( );
    KaliClient::_DisableSettingsConnection( );
    KaliClient::Create(endpoint_.get( ));
    KaliServerEventCallback eventCallback =
[this](OperatingSystem::ServerEvent* event) {
            clientEventCallback(event);
            return false;
    };
    KaliClient::Get( )->setEventCallBack(eventCallback);
    KaliClient::Get( )->syncWithServer( );
    if (frame && frame->GetPage( ) &&
        frame->GetPage( )->IsSharing( )) {
            int session_id =
            frame->GetPage( )->GetSharingSessionID( );
            const std::string session_pcf = frame->GetPage( )-
>GetSharingSessionPcf( );
            SharingSessionStarted(session_id);
            SetSharingSessionPcf(session_id, session_pcf);
    }
}
CefRefPtr<CefBrowserHostImpl>
CefBrowserHostImpl::GetBrowserForHost(
        const content::RenderFrameHost* host) {
    DCHECK(host);
    CEF_REQUIRE_UIT( );
    content::WebContents* web_contents =
            content::WebContents::FromRenderFrameHost(
            const_cast<content::RenderFrameHost*>(host));
    if (web_contents)
        return GetBrowserForContents(web_contents);
    return nullptr;
}
CefRefPtr<CefBrowserHostImpl>
CefBrowserHostImpl::GetBrowserForContents(
        const content::WebContents* contents) {
    DCHECK(contents);
    CEF_REQUIRE_UIT( );
    return WebContentsUserDataAdapter::Get(contents);
}
CefRefPtr<CefBrowserHostImpl>
CefBrowserHostImpl::GetBrowserForFrameTreeNode(
        int frame_tree_node_id) {
    scoped_refptr<CefBrowserInfo> info =
            CefBrowserInfoManager::GetInstance( )-
>GetBrowserInfoForFrameTreeNode(
            frame_tree_node_id);
    if (info.get( )) {
        CefRefPtr<CefBrowserHostImpl> browser =
        info->browser( );
        if (!browser.get( )) {
            LOG(WARNING) << "Found browser id " <<
            info->browser_id( )
                << " but no browser object matching frame
                tree node id "
                << frame_tree_node_id;
        }
        return browser;
    }
    return nullptr;
}
CefRefPtr<CefBrowserHostImpl>
CefBrowserHostImpl::GetBrowserForFrameRoute(
        int render_process_id,
        int render_routing_id) {
    if (render_process_id == -1 || render_routing_id ==
MSG_ROUTING_NONE)
        return nullptr;
```

```
    if (CEF_CURRENTLY_ON_UIT( )) {
        content::RenderFrameHost* render_frame_host =
            content::RenderFrameHost::FromID(render_process_id,
render_routing_id);
gfx::Point3F RenderFrameImpl::GetVirtualRotation( ) {
        return GetRenderWidget( )->VirtualRotation( );
}
```

The following section includes some example code for RenderFrame although other similar or equivalent code has also been contemplated and may thus be used to achieve similar purposes.

```
void RenderFrameImpl::SetVirtualPageOrientation(const
VirtualPageOrientation& orientation) {
    gfx::Point3F rotation(0.0f, 0.0f, 0.0f);
    std::string orient_str = "upright";
    if (orientation == VirtualPageOrientation::kFlat) {
        orient_str = "flat";
        rotation.SetPoint(-M_PI_2, 0.0f, 0.0f);
    }
gfx::Point3F prev_rot = GetRenderWidget( )->VirtualRotation( );
if (base::IsApproximatelyEqual(prev_rot.x( ), rotation.x( ),
        std::numeric_limits<float>::epsilon( )) &&
        base::IsApproximatelyEqual(prev_rot.y( ), rotation.y( ),
        std::numeric_limits<float>::epsilon( )) &&
        base::IsApproximatelyEqual(prev_rot.z( ), rotation.z( ),
        std::numeric_limits<float>::epsilon( ))) {
            return;
    }
    GetRenderWidget( )->SetVirtualRotation(rotation);
    RenderThread::Get( )->Send(
        new
        FrameHostMsg_SetVirtualPageOrientation(GetRoutingID( ),
        orient_str));
```

The following includes some example code for getting the orientation although it shall be noted that other similar or equivalent implementations have also been contemplated and may thus be used:

```
String VirtualWorld::orientation( ) const {
    if (!local_frame_ || !local_frame_->IsMainFrame( )) {
        return kUpright;
    }
    LocalFrameClient* local_frame_client = local_frame_->Client( );
    if (!local_frame_client) {
        return kUpright;
    }
    gfx::Point3F rot = local_frame_client->GetVirtualRotation( );
    gfx::Point3F flat_rot{-M_PI_2, 0.0f, 0.0f};
    if (base::IsApproximatelyEqual(rot.x( ), flat_rot.x( ),
            std::numeric_limits<float>::epsilon( )) &&
            base::IsApproximatelyEqual(rot.y( ), flat_rot.y( ),
            std::numeric_limits<float>::epsilon( )) &&
            base::IsApproximatelyEqual(rot.z( ), flat_rot.z( ),
            std::numeric_limits<float>::epsilon( ))) {
        return kFlat;
    }
    return kUpright;
}
```

The following includes some example code for setting the orientation although it shall be noted that other similar or equivalent implementations have also been contemplated and may thus be used:

```
void VirtualWorld::setOrientation(String orientation) {
        if (!local_frame_ || !local_frame_->IsMainFrame( )) {
            return;
        }
        LocalFrameClient* local_frame_client =
        local_frame_->Client( );
        if (!local_frame_client) {
            return;
        }
        if (orientation == kUpright) {
            local_frame_client->SetVirtualPageOrientation(
                WebLocalFrameClient::
                VirtualPageOrientation::kUpright);
        } else if (orientation == kFlat) {
            local_frame_client->SetVirtualPageOrientation(
                WebLocalFrameClient::
                VirtualPageOrientation::kFlat);
        }
    }
```

In some embodiments where a Chromium or Chromium-based browser is used, the browser engine 1000 uses its rendering system ("views") to render web pages where the user interface is constructed as a tree of components called "views" that are responsible for rendering, layout, and event handling. Each view in a tree of components has its own bounds and represents a different component of the user interface; and a widget (a native 2D window or 3D volume) is located at the root of such a tree.

Some embodiments create a virtual 3D space (or a 2D window) with the orientation data and passes the virtual 3D space (or 2D window) to the RootView and then propagate events into the tree. Some display items may be rendered using the operating system's controls that are hosted in a special kind of view that knows how to display and size a native widget. These display items include, for example, buttons, tables, radio buttons, checkboxes, text fields, other controls, etc. More details about such trees of components are described below with reference to FIGS. 2G-2I.

The browser engine may further execute WebContentsImpl::OnSetOrientation (114U), CefBrowserHostImpl::SetOrientation (116U) that uses "delegate_→SetOrientation (orientation)" and "delegate_→SetOrientation (orientation)" based at least in part on the orientation data. The browser engine further executes CefUniverseBrowserEnginePrivateHandler::OnSetPageOrientation (118U) with a universe browser engine specific interface that allows for custom interactions between CEF (Chromium Embedded Framework) and the universe browser engine. A CEF-based application may include components such as an entry point to initialize CEF and run the CEF message loop, a CEFApp derived class to handle process-specific callbacks, a CEFClient derived class to handle browser-instance-specific callbacks (e.g., callbacks for browser lifespan, context menus, dialogs, display notifications, drag events, focus events, keyboard events, etc.), one or more CEFBrowser instances created by CefBrowserHost::CreateBrowser( ) etc.

The browser engine 100U may further execute the construct CefBrowserHostImpl::SetOrientation (116U) and CefBrowserHostImpl::SetOrientation (e.g., in a browser host implementation) to determine the handler (e.g., with "CefRefPtr<CefUniverseBrowserEnginePrivateHandler> handler=client_→GetUniverseBrowserEnginePrivateHandler( )" and "handler→OnSetPageOrientation (this, orientation)". It shall be noted that orientation may or may not be of a vector3 type. For example, orientation may be of an enumerated type ("enum") such as "flat," "upright," etc. In some embodiments where orientation is of a vector3 type, "handler→OnSetPageOrientation (this, orientation.x( ) orientation.y( ) orientation.z( )" may be used. The browser engine may also execute the public function CefUniverseBrowserEnginePrivateHandler::OnSetPageOrientation to set the 3D orientation of a web page panel.

The universe browser engine 126U may execute ClientHandler::OnSetPageOrientation (120U), Browser::OnSetPageOrientation (122U), and BrowserWindow::OnSetPageOrientation and BrowserWindow::OnSetPageOrientation (124U) with the 3D orientation data received from the browser engine 1000. ClientHandler includes an event handler that runs in the browser without needing a call back to the server to provide a means to define rules (e.g., declarative conditions and actions that may be evaluated in the browser to reduce roundtrip delay or latencies. ClientHandler may also use GLM (OpenGL Mathematics) and delegate to set the web page orientation in the virtual 3D space (e.g., a prism).

FIG. 1V illustrates the communications between some of the aforementioned blocks in FIG. 1V to illustrate how to obtain, at the browser engine 100V, the 3D orientation data in the virtual 3D space (e.g., a prism) from the universe browser engine 126C. The downward arrowheads indicate the sequence of execution and/or passing of execution results; and the upward arrowheads indicate the returns of values.

In these embodiments, a browser engine 100V may execute Window.VirtualWorld.Orientation at 102V to initialize the process for setting the 3D orientation data of a web page panel in a universe browser engine in a similar manner as that described with reference to FIG. 1U above. It shall be noted that FIG. 1V illustrates an example of setting and determining one type of orientation but not another type of orientation data (e.g., rotation data but not position data), and that setting and determining this another type of orientation data may be done in an identical or substantially similar manner with the corresponding code.

Unlike the browser engine 100U illustrated in FIG. 1U, the browser engine 100C in FIG. 1V may further execute the LocalFrameClientImpl::GetOrientation (106V) and RenderFrameImpl:GetOrientation (108V). Like the description of FIG. 1U, the construct RenderFrameImpl:GetOrientation (108V) may be used to call RenderWidget::GetOrientation (112V) and to return value(s) to Window.VirtualWorld:: orientation to return the orientation data. The construct LocalFrameClientImpl::GetOrientation, like LocalFrameClientImpl::GetOrientation in FIG. 1U, may be derived from the C++ LocalFrameClientImpl.cpp and uses, for example, a low-level graphics abstraction layer such as Gfx or Gfx-rs as well as the orientation data to set and obtain the orientation for a client frame.

Like the RenderWidget::SetOrientation in FIG. 1U, the browser engine 100V may also query the orientation data by executing RenderWidget::GetOrientation at 106V return orientation data (e.g., the orientation data of a webpage) to RenderFrameImpl::GetOrientation (104V) and further return the orientation data to the web page who triggers the Window.VirtualWorld.Orientation call. In some embodiments, the renderer process, RenderWidget, may use a glue interface (e.g., WebWidgetDelegate) and implements the abstract interface in the glue interface. This abstract interface may include, for example, a 2D window or 3D volume in the display space to receive input events and to render contents into. In some of these embodiments where auxiliary display items (e.g., a selection box with up/down arrows showing a list of options, a tab, a pop-up window, navigation commands, etc.) are to be rendered, the browser engine 100V may further execute another render process (e.g., RenderView) for such display items.

FIG. 1W illustrates a simplified block diagram with pseudo code for synchronizing the 3D orientation data between the browser engine and the universe browser engine in some embodiments. For example, a web page in the virtual 3D space may be modified (e.g., by a user who moved and rotated the web page in the virtual 3D space). The block diagram in FIG. 1W illustrates how the most recent 3D orientation data of the web page is synchronized between the browser engine 100W and the universe browser engine 126W. FIG. 1W may also illustrate the embodiments where the universe browser engine 126W sends the orientation data to the browser engine 100W upon the initialization of the browser.

As illustrated in FIG. 1W, the universe browser engine 126W, when initialized (120W) or upon receiving modified 3D orientation data of a web page (not shown), may reset the transform(s) of the web page volume, the rendered browser, and/or the prism (122W). The 3D orientation data are then passed to the browser engine 100W where the browser engine 100W executes CefBrowserView::UpdateCachedOrientation (102W). The browser engine 100W further executes RenderWidgetHostImpl::UpdateCachedOrientation to update the orientation data with the most recent orientation data from the universe browser engine 126W.

The browser engine 100W further sends IPC (inter-process communication) message(s) (e.g., ViewMsg_UpdateCachedOrientation, ViewMsg_UpdateCachedOrientation, etc.) and execute RenderWidget::OnUPdateCachedOrientation (108W) as well as RenderWidget::SetOrientation (110W).

In some embodiments, the universe browser engine 126W may store the 3D orientation data in a non-transitory computer readable medium (e.g., cache memory) accessible by the browser engine 100W. The universe browser engine 126W and the browser engine 100W are thus synchronized every time when a web page panel's orientation in the virtual 3D space is modified. In order to initialize and reset the orientation variables in RenderWidget, every time when the web page starts loading, the web page panel's transform(s) may be reset to default, and stored values in RenderWidget will be updated as well.

Figure 1X:
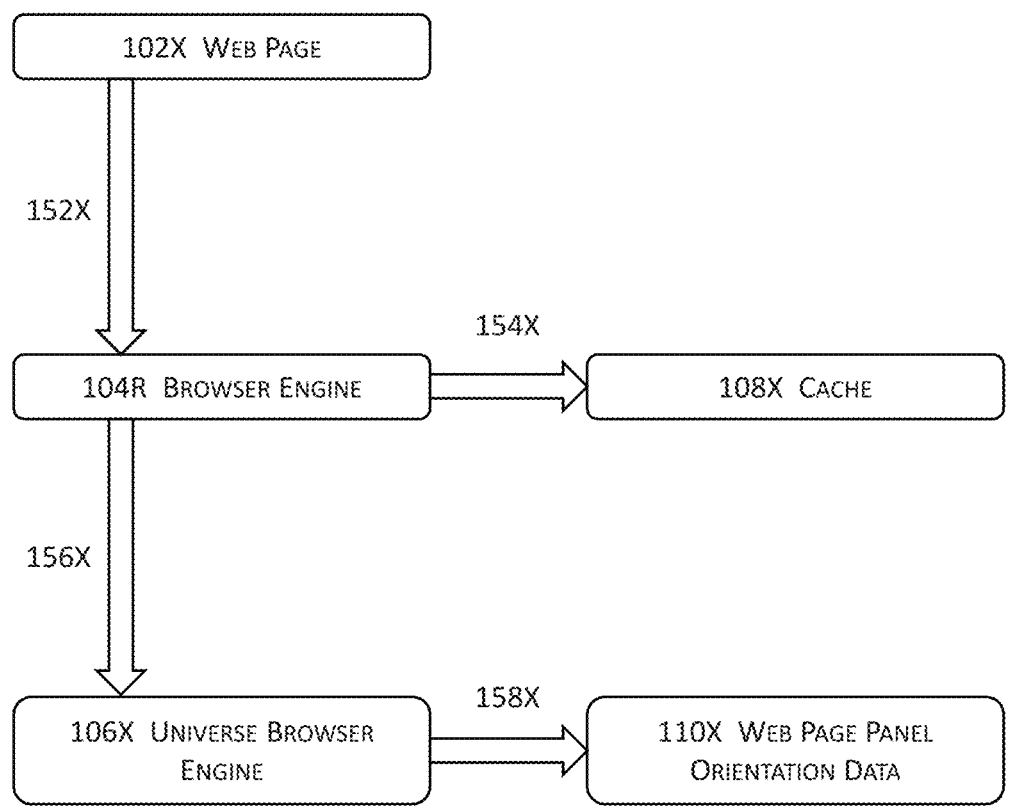
FIG. 1X illustrates an example of the determination of the orientation data of a web page panel with a SET request in one or more embodiments.

FIG. 1X illustrates an example of the determination of the orientation data of a web page panel with a SET request in one or more embodiments. In this example, when a web page of interest (102X) may be coded to issue, upon loading the web page by a browser, a request to set the orientation data for the web page panel at 152X to a browser or browser engine (104X). Upon receiving the orientation data, the browser or browser engine (104X) may update the orientation data previously stored in a non-transitory computer readable storage medium 108X (e.g., cache) at 154X.

The browser or browser engine (104X) may further pass the orientation data received along with the SET request to the universe browser engine (106X) at 156X. To fulfill the SET request, the universe browser engine 106X may set the web page panel's orientation data at 110X by using the orientation data received along with the SET request and transmitted at 158X.

Figure 1Y:
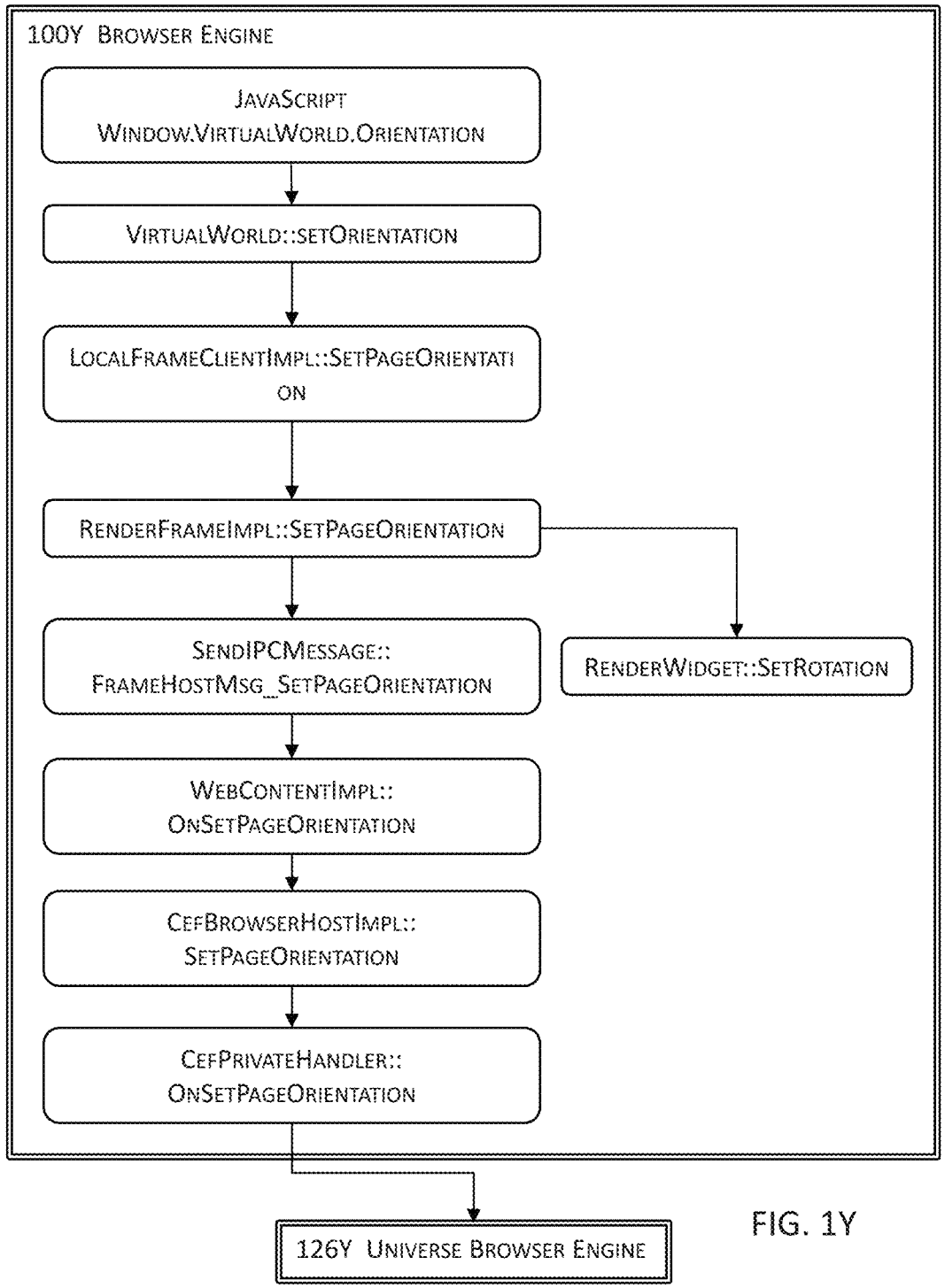
FIG. 1Y illustrates an example flow for a 3D orientation update of a web page panel in a virtual 3D space in some embodiments.

FIGS. 1Y-1AA illustrate more detailed block diagrams for an example browser engine and a universe browser engine that may be used in managing and displaying web pages and web resources in a three-dimensional virtual space with a mixed reality system in one or more embodiments. More specifically, FIG. 1Y illustrates an example flow for a 3D orientation update of a web page panel in a virtual 3D space (e.g., a prism) in some embodiments. In these embodiments, the example flow is based on a similar set of code for Chromium although the code for other web browsers is also contemplated, and the techniques described herein can be applied with full, equal effects. In BrowserWindow, after the Web content plane is updated with the input orientation value, ContentView::OnPageOrientationChanged will be called. Moreover, through CEF, an event will be dispatched to notify page orientation change is completed. In some embodiments where JavaScript is used, the universe browser engine 126Y may listen to the page orientation event and call the callback.

FIG. 1Y illustrates an example flow for Web page transform update from a browser engine 100Y to a universe browser engine 126Y. The example flow is similar to that illustrated in FIG. 1C described above. More specifically, the browser engine 100Y may invoke or execute a JavaScript function call "Window.VirtualWorld.Orientation" to initialize the process flow illustrated in FIG. 1Y. On the part of the browser engine 100Y, Like Window.VirtualWorld.3DPosition and Window.VirtualWorld.3DRotation in FIG. 1C, processes such as "Window.VirtualWorld.Orientation" and/or "VirtualWorld" in FIG. 1Y may utilize, for example, OpenGL Mathematics (GLM) (or any other mathematics libraries) to set and obtain the position data (e.g., by the pseudo code "glm::vec3 old_pos(0.0f)", "glm::quat rotation(glm::vec3 (0.0f))", "glm::vec3 scale(1.0f)", and "glm::mat4 transform=web_container_→ getCurrentVolumeTransformQ") as well as the rotation data (e.g., by the pseudo code "glm::vec3 position(0.0f)", "glm:: quat old_rot(glm::vec3(0.0f))", "glm::vec3 scale(1.0f)", and "glm::mat4 transform=web_container_→ getCurrentVolumeTransformQ") of a web page panel based in part or in whole on the 3D position data, the 3D rotation data, the scale, and one or more transforms for 2D and 3D entities in a 2D or 3D space.

It shall be noted that the pseudo-code, the programming language, and the names of various classes, variables, etc. are used in this application for illustration and explanation purposes, and that any other suitable programming language(s), names, etc. serving identical or substantially similar purposes are also contemplated and may also be used to achieve such purposes. In addition, it shall be further noted that although FIG. 1Y only illustrates setting an orientation (e.g., rotation) of a Web page panel, other Web page panel transform such as a position change, a scale change, etc. may also be incorporated using similar techniques.

The browser engine 100C may further execute VirtualWorld::setOrientation in FIG. 1Y similar to VirtualWorld:: Set3DPosition in FIG. 1C for setting and obtaining position, rotation, and/or scale data (not shown) of a web page panel.

The browser engine 126Y may further execute the LocalFrameClientImpl::SetPageOrientation, RenderFrameImpl:: SetPageOrientation, and RenderWidget::SetRotation illustrated in FIG. 1Y. The browser engine 100Y may send a message (e.g., an inter-process communication (IPC) message) by executing or invoking, for example, SendIPCMessage::FrameHostMsg_SetPageOrientation illustrated in FIG. 1Y. The construct RenderFrameImpl:SetPageOrientation may be used to call the function RenderWidget::SetOrientation and to send IPC messages via SendIPCMessage:: FrameHostMsg_SetPageOrientation. The construct LocalFrameClientImpl::SetPageOrientation is derived from the C++ LocalFrameClientImpl.cpp and uses, for example, a low-level graphics abstraction layer such as Gfx or Gfx-rs as well as the position and rotation data to set and obtain the position and/or rotation for a client frame. LocalFrameClientImpl::SetPageOrientation may be implemented to obtain and set the orientation data of a web page panel with the following pseudo code:

```
void LocalFrameClientImpl::SetPageOrientation(const gfx::Point3F&
rotation) {
    if (web_frame_->Client( ))
        web_frame_->Client( )->SetPageOrientation(rotation);
}
void LocalFrameClientImpl::GetPageOrientation(gfx::Point3F* rotation) {
    if (web_frame_->Client( ))
        web_frame_->Client( )->GetPageOrientation(rotation);
}
```

The construct RenderFrameImpl::SetPageOrientation may be derived from the C++ RenderFrameImpl.cpp and is configured to invoke the renderer (e.g., RenderWidget for Chromium-based browsers) and the position and/or rotation data and pass the frame back to the browser engine (e.g., Blink for Chromium-based browsers).

The browser engine 100Y may also invoke the renderer by executing RenderWidget::SetRotation to "paint" or render the web page of interest according to the 3D position, rotation, and/or scale data (e.g., position and rotation data set by the developer of a web page panel). More particularly, the renderer process, RenderWidget, may use a glue interface (e.g., WebWidgetDelegate) and implements the abstract interface in the glue interface. This abstract interface may include, for example, a 2D window or 3D volume in the display space to receive input events and to render contents into. In some of these embodiments where auxiliary display items (e.g., a selection box with up/down arrows showing a list of options, a tab, a pop-up window, navigation commands, etc.) are to be rendered, the browser engine 100Y may further execute another render process (e.g., RenderView) for such display items.

In some embodiments where a Chromium or Chromium-based browser is used, the browser engine 100Y uses its rendering system ("views") to render web pages where the user interface is constructed as a tree of components called "views" that are responsible for rendering, layout, and event handling. Each view in a tree of components has its own bounds and represents a different component of the user interface; and a widget (a native 2D window or 3D volume) is located at the root of such a tree. Some embodiments create a virtual 3D space (or a 2D window) with the position and position data and passes the virtual 3D space (or 2D window) to the RootView and then propagate events into the tree. Some display items may be rendered using the operating system's controls that are hosted in a special kind of view that knows how to display and size a native widget. These display items include, for example, buttons, tables, radio buttons, checkboxes, text fields, other controls, etc. More details about such trees of components are described below with reference to FIGS. 2G-2I.

The browser engine further executes WebContentsImpl::OnSetPageOrientation and CefBrowserHostImpl::SetPageOrientation based at least in part on the position, rotation, and/or scale data.

The browser engine 100Y further executes CefPrivateHandler::OnSetPageOrientation and communicates with a universe browser engine (126Y) specific interface that allows for custom interactions between CEF (Chromium Embedded Framework) and the universe browser engine. A CEF-based application may include components such as an entry point to initialize CEF and run the CEF message loop, a CEFApp derived class to handle process-specific callbacks, a CEFClient derived class to handle browser-instance-specific callbacks (e.g., callbacks for browser lifespan, context menus, dialogs, display notifications, drag events, focus events, keyboard events, etc.), one or more CEFBrowser instances created by CefBrowserHost::CreateBrowser( ) etc.

Figure 1Z:
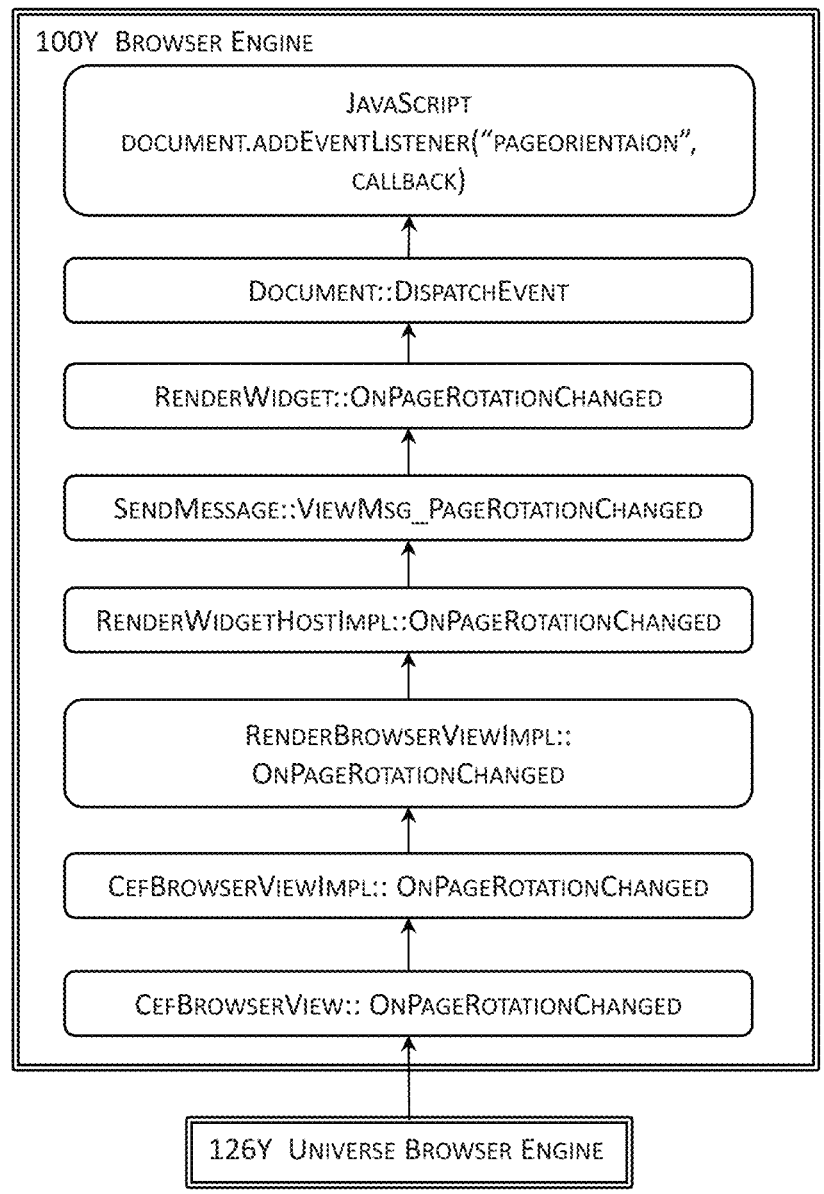
FIG. 1Z illustrates an example flow for Web page transform update from a universe browser engine to a browser engine.
Figure 1A:
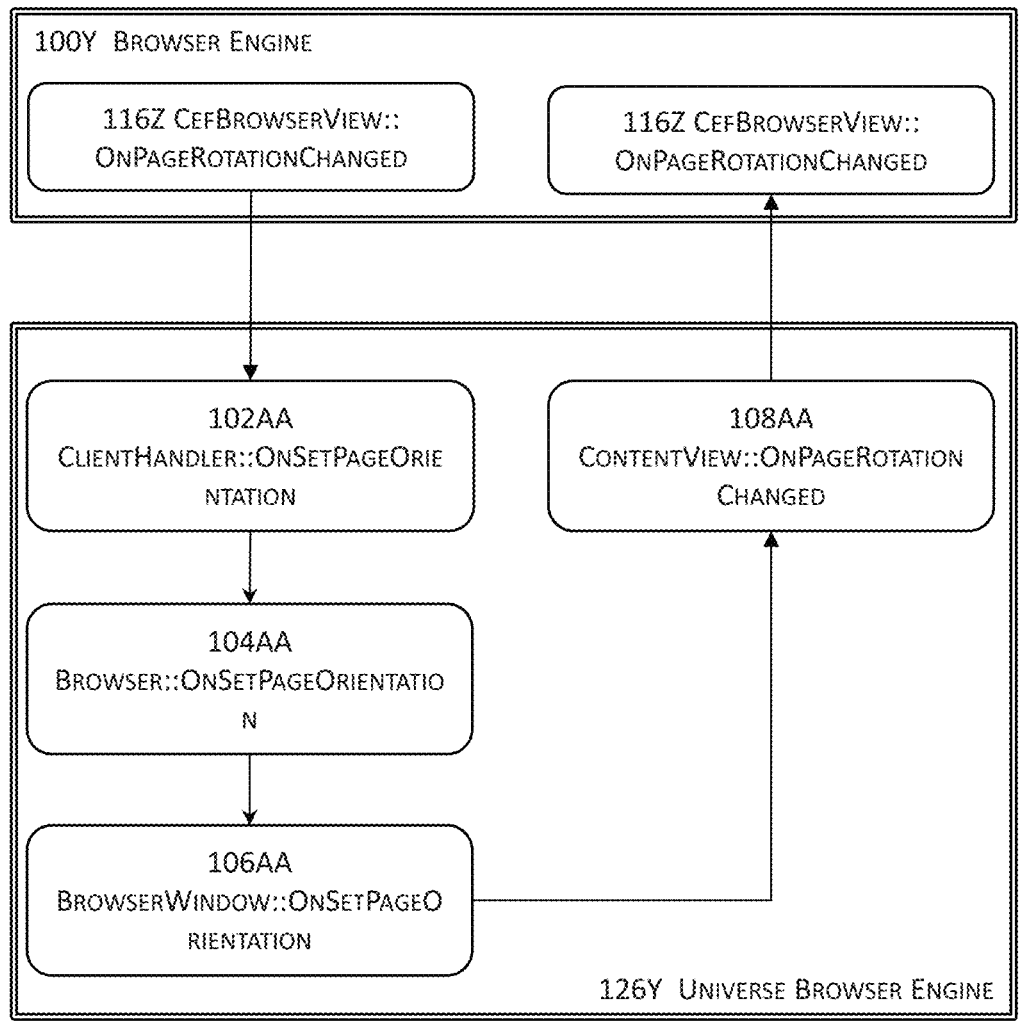
Figure 1A:
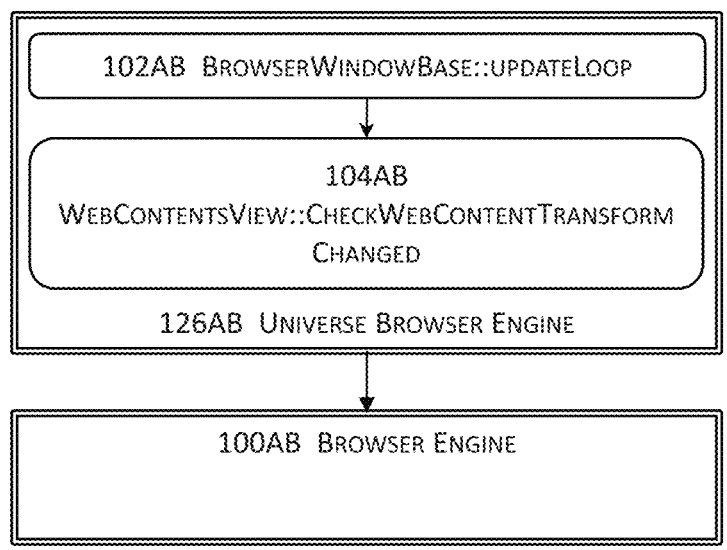
Figure 1A:
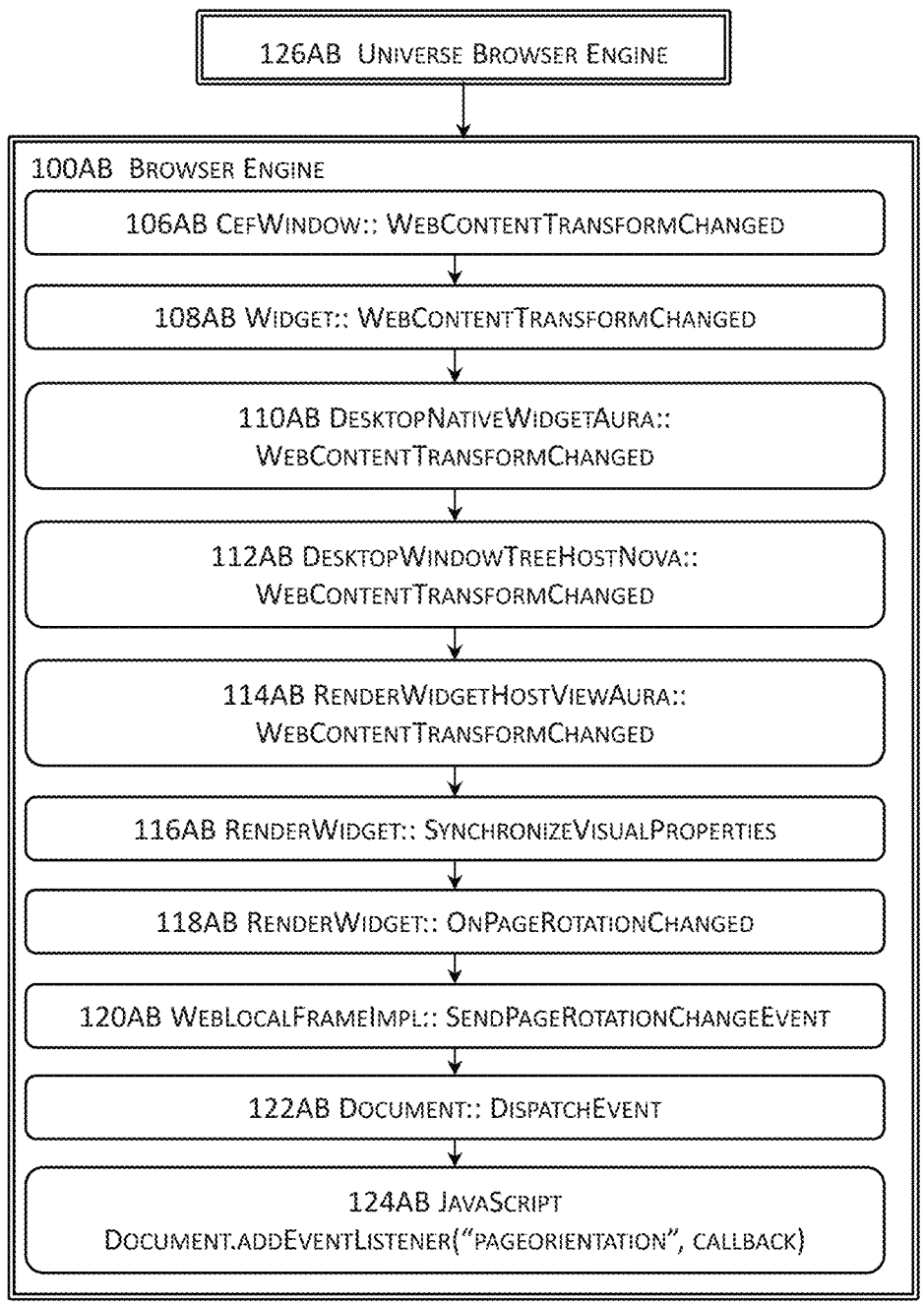

FIG. 1Z illustrates an example flow for Web page transform update from a universe browser engine 126Y to a browser engine 100Y. When the universe browser engine 126Y determines that a Web page transform has occurred, the browser engine 100Y may execute "CefBrowserView::OnPageOrientationChanged" with the following example code and the declaration "virtual void OnMLPageOrientationChanged( )=0;" in a header file. With the browser engine aware of the Web page transform, the browser engine 100Y may further execute or invoke "CefBrowserViewImpl::OnPageOrientationChanged" with the declaration "void OnMLPageOrientationChanged( ) override; void OnMLPageOrientationChanged( ) override;" in a corresponding header file.

```
void CefBrowserViewImpl::OnMLPageOrientationChanged( ) {
    if (root_view( )) {
        content::WebContentsImpl* web_contents_impl =
            static_cast<content::WebContentsImpl*>(root_view( )->web_contents( ));
        web_contents_impl->GetRenderViewHost( )
            ->GetWidget( )
            ->OnMLPageOrientationChanged( );
    }
}
```

The browser engine 100Y may then execute "RenderBrowserViewImpl::OnPageOrientationChanged" and "RenderWidgetHostImpl.OnPageOrientationChanged" for host implementation when it is determined that a Web page transform has occurred using the following example code with "virtual void OnMLPageOrientationChanged( )=0;" in the corresponding header file.

```
void RenderWidgetHostImpl::OnMLPageOrientationChanged( ) {
    Send(new ViewMsg_MLPageOrientationChanged(GetRoutingID( )));
}
```

The browser engine 100Y may then execute or invoke "SendMessage::ViewMsg_PageOrientationChanged" to send a message (e.g., an inter-process message or IPC) by using the following example code.

IPC_MESSAGE_HANDLER(ViewMsg_MLPageOrientationChanged, OnMLPageOrientationChanged)

Once it is determined that a Web page transform has changed, the browser engine may execute "RenderWidget:OnPageOrientationChanged" having the following example code and "698 IPC_MESSAGE_HANDLER (ViewMsg_MLPageOrientationChanged, OnMLPageOrientationChanged)" in the corresponding header file:

```
void RenderWidget::OnMLPageOrientationChanged( ) {
    if (auto* frame_widget = GetFrameWidget( )) {
        if (frame_widget->LocalRoot( )) {
            frame_widget->LocalRoot( )->SendPageOrientationChangeEvent( );
        }
    }
}
```

The browser engine 100Y may further execute "Document::DispatchEvent" to dispatch an event for the Web page transform. A JavaScript "document.addEventListener("pageorientaion", callback)" to initiate a callback indicating that a change in position, rotation, and/or scale (the Web page transform) is complete on the browser engine 100Y's end.

FIG. 1AA illustrates the part of a universe browser engine (126Y) in example flow for a 3D orientation update of a web page panel in a virtual 3D space (e.g., a prism) in some embodiments. Upon receiving a Web page panel transform (e.g., a change in position, orientation, or scale of a Web page panel) from a browser engine (e.g., 100Y), the universe browser engine 126Y may further execute the construct ClientHandler::OnSetPageOrientation (102AA) to determine the handler (e.g., with "CefRefPtr< CefUniverseBrowserEnginePrivateHandler>handler=c lient>GetUniverseBrowserEnginePrivateHandler( )" and "handler->OnSetVirtualWebPagePosition(this, position.x( ) position.y( ) position.z( )", "handler->OnSetVirtualWebPageRotation(this, rotation.x( ) rotation.y( ) rotation.z( )").

The universe browser engine 126Y may further execute Browser::OnSetPageOrientation (104AA) and BrowserWindow::OnSetPageOrientation with the 3D position, rotation, and/or scale data received from the browser engine 100Y. ClientHandler includes an event handler that runs in the browser without needing a call back to the server to provide a means to define rules (e.g., declarative conditions and actions that may be evaluated in the browser to reduce roundtrip delay or latencies. ClientHandler may also use GLM (OpenGL Mathematics) and delegate to set the web page position and rotation in the virtual 3D space (e.g., a prism).

FIGS. 1AB-1AC illustrate an example high-level flow diagram for an event dispatch flow in some embodiments. More specifically, the event dispatch flow illustrated in FIGS. 1AB-1AC proceeds through SynchronizeVisualProperties. Moreover, BrowserWindowBase::RenderLoop periodically or repeatedly checks to determine whether a Web page plane's transform (e.g., position, rotation, and/or scale, etc.) has changed. If BrowserWindowBase::RenderLoop determines that a Web page plane's transform has changed, a changed transform event will be propagated to JavaScript document.

In some embodiments, the follow example code may be used for BrowserWindowBase::UpdateLoop (102AB) for the universe browser engine (126AB) with the class definition "virtual void UpdateLoop(float/*delta*/);" in the corresponding header file:

```
void BrowserWindowBase::DoZoom(bool zoom_in) {
    active_browser_->Zoom(zoom_in);
}
```

In some embodiments, the follow example code may be also executed or invoked for BrowserWindowBase::UpdateLoop (102AB) for the universe browser engine (126AB) with the class definition "virtual void UpdateLoop (float/*delta*/);" in the corresponding header file to poll for Web node transform changes and to keep the stage and detached volume positions updated:

```
void BrowserWindowBase::UpdateLoop(float /* delta */) {
    content_view_->CheckIfWebContentTransformChanged( );
}
```

In some embodiments, the follow example code may be used for WebContentsView::CheckWEbContentTransformChanged(104AB) for the universe browser engine (126AB) with the class definition "void CheckIfWebContentTransformChanged( )" in the corresponding header file:

```
void WebContentsView::CheckIfWebContentTransformChanged( ) {
    if (!cef_window_) {
        return;
    }
    auto diff = web_contents_node_->getCurrentVolumeTransform( ) -
        web_contents_node_transform_;
    const glm::mat4::value_type* pDiff =
        static_cast<const glm::mat4::value_type*>(glm::value_ptr(diff));
    for (int i = 0; i < 16; ++i) {
        if (std::abs(pDiff[i]) > 0.0001f) {
            web_contents_node_transform_ =
                web_contents_node_->getCurrentVolumeTransform( );
            cef_window_->WebContentTransformChanged( );
            return;
        }
    }
    return;
}
```

The function CEFWindow (106AB) may corresponds to "virtual void WebContentTransformChanged( )=0;" in a corresponding header file. Furthermore, the browser engine 100AB may further execute the function RenderWidgetHostViewAura::OnWebContentTransformChanged( ) (114B) with the following example code with "void OnWebContentTransformChanged( ) override;" in the corresponding header file when it is determined that the Web content transform (e.g., position, rotation, and/or scale) has changed:

```
void RenderWidgetHostViewAura::OnWebContentTransformChanged( ) {
    host( )->SynchronizeVisualProperties( );
}
```

Furthermore, the browser engine 100AB may further execute the Widget function (108AB) with the following example code with "void WebContentTransformChanged WebContent ( )" in the corresponding header file when it is determined that the Web content transform (e.g., position, rotation, and/or scale) has changed:

```
void Widget::WebContentTransformChanged( ) {
    native_widget_->WebContentTransformChanged( );
}
```

Furthermore, the browser engine 100AB may further execute the function DesktopNativeWidgetAura::WebContentTransformChanged( ) (110AB) with the following example code with "void WebContentTransformChanged( ) override;" in the corresponding header file when it is determined that the Web content transform (e.g., position, rotation, and/or scale) has changed:

```
void DesktopNativeWidgetAura::WebContentTransformChanged( ) {
    if (content_window_)
        desktop_window_tree_host_->AsWindowTreeHost( )-
            >WebContentTransformChanged( );
}
```

Furthermore, the browser engine 100AB may further execute the function DesktopWindowTreeHostVirtualWorld::WebContentTransformChanged( ) (112AB) with the following example code with "void WebContentTransformChanged( ) override;" in the corresponding header file when it is determined that the Web content transform (e.g., position, rotation, and/or scale) has changed:

```
void DesktopWindowTreeHostVirtualWorld::WebContentTransformChanged
        WebContentTransformChanged( ) {
    LayoutDetachedVolume( );
    for (auto& window_tree_host_observer : observers( )) {
        window_tree_host_observer.OnWebContentTransformChanged
            WebContentTransformChanged( );
    }
}
```

The browser engine (100AB) may execute a RenderWidget function for a widget support a main frame in some embodiments. In some other embodiments, the browser engine (100AB) may invoke a RenderView function for a widget supporting a remote main frame. The following example code may be used for the function RenderWidget in, for example, 116AB and 118AB. It shall be noted that "SetIsFullscreen(params.is_fullscreen_granted);" in the following example code enable the full-screen mode without changing the viewport size.

```
void RenderWidget::SynchronizeVisualProperties(const VisualProperties& params) {
    gfx::Size new_compositor_viewport_pixel_size =
        params.auto_resize_enabled
            ? gfx::ScaleToCeiledSize(size_,
                params.screen_info.device_scale_factor)
            : params.compositor_viewport_pixel_size;
    UpdateSurfaceAndScreenInfo(params.local_surface_id_allocation.value_or(
            viz::LocalSurfaceIdAllocation( )),
        new_compositor_viewport_pixel_size,
        params.screen_info);
    UpdateCaptureSequenceNumber(params.capture_sequence_number);
    layer_tree_view_->SetBrowserControlsHeight(
        params.top_controls_height, params.bottom_controls_height,
        params.browser_controls_shrink_blink_size);
    UpdateZoom(params.zoom_level);
    if (!params.auto_resize_enabled) {
        visible_viewport_size_ = params.visible_viewport_size;
        volume_breadth_changed_ = (volume_breadth_ != params.volume_size.z( ));
        volume_width_ = params.volume_size.x( );
        volume_height_ = params.volume_size.y( );
        volume_breadth_ = params.volume_size.z( );
        webview_width_ = params.webview_size.x( );
        webview_height_ = params.webview_size.y( );
        if (base::IsApproximatelyEqual(default_webview_width_, 0.0f,
                std::numeric_limits<float>::epsilon( ))) {
            default_webview_width_ = params.webview_size.x( );
        }
            if (base::IsApproximatelyEqual(default_webview_height_, 0.0f,
                    std::numeric_limits<float>::epsilon( ))) {
                default_webview_height_ = params.webview_size.y( );
            }
            if (base::IsApproximatelyEqual(default_stage_breadth_, 0.0f,
                    std::numeric_limits<float>::epsilon( ))) {
                default_stage_breadth_ =
                    std::max(params.webview_size.x( ), params.webview_size.y( ));
            }
            auto webview_position_changed = false;
            auto webview_rotation_changed = false;
            {
```

```
            gfx::DecomposedTransform new_transform;
            gfx::DecomposeTransform(&new_transform, params.viewport_transform);
            webview_position_changed =
                !HasSimilarTranslates(old_transform_, new_transform);
            webview_rotation_changed =
                !HasSimilarQuaternions(old_transform_, new_transform);
            gfx::DecomposeTransform(&old_transform_, params.viewport_transform);
        }
        auto ml_stage_modified = UpdateMLStageInternal( );
        if (ml_stage_modified || webview_position_changed) {
            OnStageChange( );
        }
        if (webview_rotation_changed) {
            OnMLPageOrientationChanged( );
        }
        display_mode_ = params.display_mode;
        size_ = params. new_size;
        ResizeWebWidget( );
        gfx::Size visual_viewport_size = visible_viewport_size_;
        if (compositor_deps_->IsUseZoomForDSFEnabled( )) {
            visual_viewport_size = gfx::ScaleToCeiledSize(
                visual_viewport_size, GetOriginalScreenInfo( ).device_scale_factor);
        }
        if (delegate( ))
            delegate( )->ResizeVisualViewportForWidget(visual_viewport_size);
        SetIsFullscreen(params.is_fullscreen_granted);
    }
}
```

Furthermore, the browser engine 100AB may further execute the function WebLocalFrameImpl (120AB) with the following example code with "void SendPageOrientationChangeEvent( ) override;" in the corresponding header file when it is determined that the Web content transform (e.g., position, rotation, and/or scale) has changed:

```
void WebLocalFrameImpl::SendPageOrientationChangeEvent( ) {
    if (!GetFrame( ) && !GetFrame( )->GetDocument( )) {
        return;
    }
    GetFrame( )->GetDocument( )-
        >DispatchEvent(*MLPageOrientationEvent::Create( ));
}
```

The browser engine 100AB may execute the "document" function (122AB) to dispatch an event to notify that page orientation change is completed. In addition or in the alternative, browser engine 100AB may execute a JavaScript function "Document.addEventListener" to listen to page orientation change event(s) (124AB).

Figure 2A:
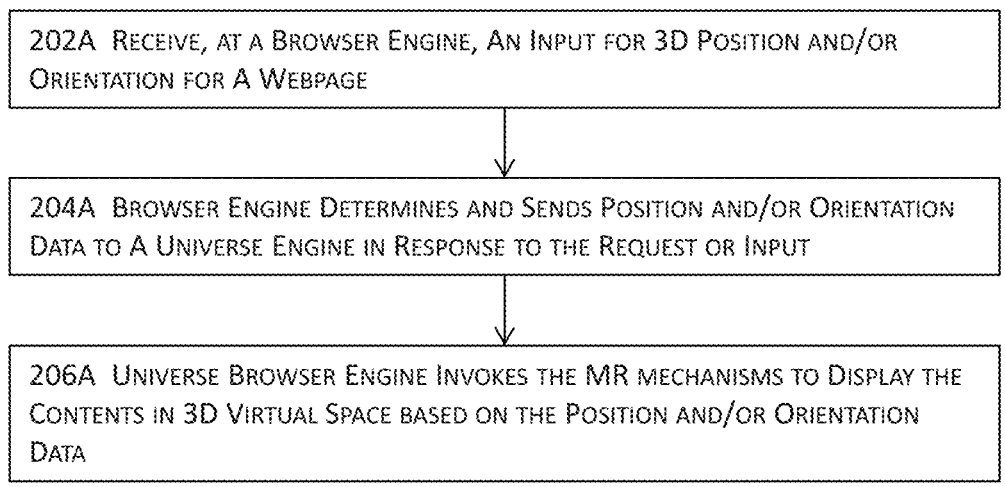
FIG. 2A illustrates a high-level block diagram for a process of managing and displaying web pages and web resources in a three-dimensional virtual space with a mixed reality system in one or more embodiments.

FIG. 2A illustrates a high-level block diagram for a process of managing and displaying web pages and web resources in a three-dimensional virtual space with a mixed reality system in one or more embodiments. In these embodiments, a browser engine may receive an input for three-dimensional (3D) transform (e.g., a change in position, rotation, or scale) for a webpage at 202A. In some embodiments, an input may include an input by a user of a mixed reality system requesting for a presentation of a web page of interest or the web page developer who prefers and thus codes the web page to be presented in a certain manner (e.g., position, orientation/rotation, or scale). In some other embodiments, an input may include a request for position and rotation data. For example, a request for position and rotation data (or even scale data in some embodiments) may be issued by a website of the webpage of interest in some embodiments. For example, the developer of the webpage may incorporate the application programming interfaces (e.g., the Window.VirtualWorld.3DPosition API and the Window.VirtualWorld.3DRotation API described above) into the code of the webpage of interest.

As described immediately above, an input may originate from, for example, the developer who prefers representing the web page in a certain position and/or with a certain rotation when presented in a virtual 3D space in some embodiments. In some of these or other embodiments, an input may come from a user's manipulation of a web page, the same web page previously visited, or other web pages from the same website, or optionally from other websites, etc. in the virtual 3D space created by a mixed reality system. For example, a web page may be opened and displayed in the virtual 3D space for a user; and the user may adjust the position and/or rotation of the web page in the virtual 3D space. In some of these embodiments, similar techniques may further apply to manipulating the web browser for the web page or the prism in which the web page is rendered. A user may freely position and rotate a web page representation in the virtual 3D space; and the only constraints of such positioning and rotation includes the boundaries of the prism. In some embodiments, such position and rotation may also be optionally constrained by the collision and/or overlapping dynamics between a web page representation and one or more other physical and/or virtual objects in the virtual 3D space so that the web page representation and virtual objects appear to be, or are perceived to be real.

A browser engine (e.g., Blink, Gecko, WebKit, Trident, etc.) is not a stand-alone computer program. Rather, a browser engine is a software component of a web browser that transforms resources (e.g., HTML documents, etc.) of a webpage into an interactive visual representation. Other terms that are commonly used for a browser engine include, for example, layout engine, rendering engine, etc. by calculating graphical coordinates for the visual representation based on the rules in the cascading style sheets (CSS).

As the names suggest, a browser engine performs layout and rendering for webpages, enforces security policies, and implements the DOM (Document Object Model) data structures that are exposed to page scripts. A browser engine may also handle hyperlinks and web forms. In some embodiments, a browser engine utilizes another dedicated script engine for the execution of JavaScript code. In addition to performing at least the aforementioned functions for a web browser, a browser engine may also perform identical or substantially similar functions for other software programs such as email clients, other framework (e.g., Google's Electron Framework) for software applications, The browser engine may determine the position and rotation data at 204A and responds to the 3D position and/or rotation request. In some embodiments, the browser engine may store the most recent position and rotation data in a non-transitory computer readable medium (e.g., cache memory) accessible by the browser engine. Such position and rotation data may be sent by the universe browser engine of a mixed reality system every time the position and/or rotation data is modified (e.g., by a user who further moves, rotates, or transforms a webpage displayed in a virtual 3D space).

When a web browser initializes for rendering and displaying a web page, its browser engine may respond to such a position and/or rotation request with the position and rotation data stored in, for example, the cache memory accessible by the browser engine (e.g., in the RenderWidget class in Chromium-based browser). Once the position and/or rotation data is modified, the browser engine may refresh its stored position and/or rotation data with the updated position and/or rotation data or an update to the position and/or rotation data from the universe browser engine. With the most recent position and rotation data, the browser engine may render contents of the web page (e.g., by calling the RenderWidget class) to calculate the graphical coordinates for the rendered contents using, for example, the most recent position and rotation data and rules govern the layout of the rendered contents (e.g., cascading style sheets).

A universe browser engine of a mixed reality system may invoke a browser engine that in turn invokes one or more mixed reality software modules and/or hardware mechanisms to display the web page in a virtual 3D space at 206A. For example, depending upon the rotation and positioning of the web page in the virtual 3D space (e.g., in a prism), the virtual 3D representation of the web page may span across multiple depth-planes or multiple focal-planes. The mixed reality system may utilize, for example, its switchable focal planes or variable focusing mechanism to render the virtual 3D representation of the web page based on the 3D position and rotation data. More details about the mixed reality system are described in the U.S. patent applications referenced in the first paragraph of the present application. In some embodiments, this invocation of the mixed reality mechanisms may be done via the browser (e.g., Chromium) and/or the browser engine (e.g., Blink for Chromium). For example, the browser (or its browser engine) may apply the position and/or rotation data (or even optionally the scale data) to the web page panel and invokes the mixed reality mechanisms to display virtual 3D contents.

Figure 2B:
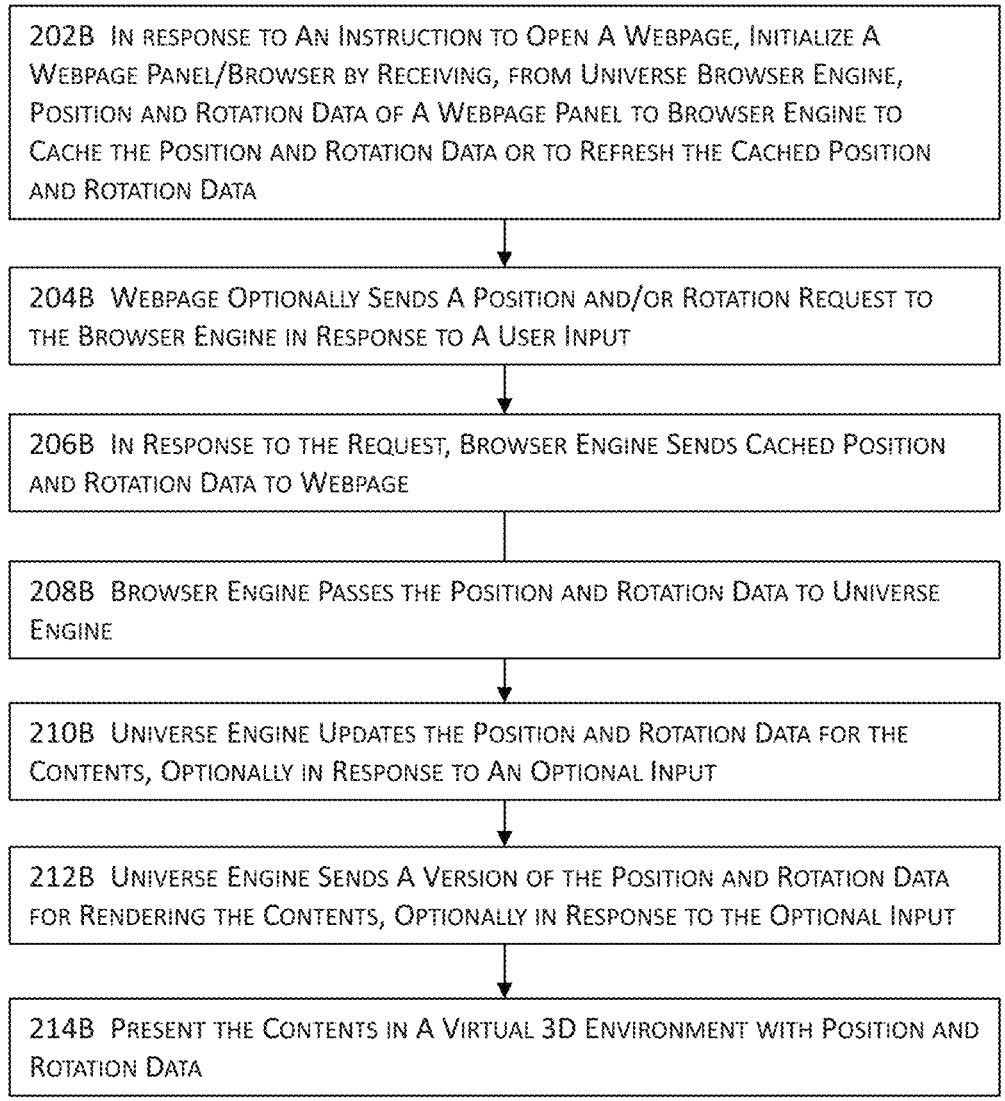
FIG. 2B illustrates a more detailed block diagram for a process of managing and displaying web pages and web resources in a three-dimensional virtual space with a mixed reality system in one or more embodiments.

FIG. 2B illustrates a more detailed block diagram for a process of managing and displaying web pages and web resources in a three-dimensional virtual space with a mixed reality system in one or more embodiments. In response to an instruction to open a web page (e.g., by user's clicking on a link, by user's entering a search criterion in the search field, by enter an URL for a website, etc.), a web browser or a webpage panel is launched at 202B. The universe browser engine may send the position and rotation data to the browser engine of the web browser so that the position and rotation data may be stored in a non-transitory computer readable medium (e.g., cache) or the position and rotation data in the non-transitory computer readable medium may be refreshed. The browser engine may then cache or store the received position and rotation data in, for example, the cache memory accessible by the browser engine. In some embodiments where the position and rotation data has been stored in a non-transitory computer readable memory (e.g., cache) accessible by a browser engine, the stored position and rotation data stored in the non-transitory computer readable memory may be initialized by position and rotation data from the universe browser engine.

The webpage may optionally send a position and rotation request to the browser engine at 204B. For example, the developer of the web page may incorporate a set of application programming interfaces (APIs) (e.g., the Window.VirtualWorld.3DPosition API and Window.VirtualWorld.3DRotation API described above) into the code of the webpage so that the web page, upon or shortly after initialization, sends a position and/or rotation request to the browser engine. In some embodiments where the developer of the web page may desire to represent the web page in a certain position and/or rotation, the web page may also utilize the set of APIs to set the position and rotation data by communicating the position and rotation data to the browser engine. In some of these embodiments, a web page may obtain the position and/or rotation data of a web page pane from the browser engine in response to a user input (e.g., a user's clicking on a link, a user's entering a search criterion in the search field, a user's entering an URL for a website, etc.)

In response to the optional position and/or rotation request from the web page, the browser engine may respond to the request with most recent position and rotation data stored in a non-transitory computer readable medium accessible by the browser engine at 206B, without further delay from, for example, obtaining such position and rotation data from the universe browser engine of the mixed reality system. If the most recent position and rotation data is unavailable (e.g., for the mixed reality system that is initialized for the first time or for other reasons), the browser engine may respond to such a request from the web page with the default position and rotation data.

The browser engine may also transmit the position and rotation data to the universe browser engine at 208B. For example, some embodiments may provide the user with the ability to position and/or rotate the representation of the web page in the virtual 3D space. In some embodiments where a GET request is received, the browser engine returns the position and rotation data that has been stored in a non-transitory computer readable medium (e.g., cache) to the web page. The universe browser engine receives the position and rotation data from the browser engine of the web browser and invokes other modules (e.g., a runtime layer, an operating system service layer, one or more 3D engines, or one or more software applications, etc. described above) of the mixed reality system as well as other hardware and software components thereof to enable the user to freely position and/or rotate the representation of the web page in the virtual 3D space (e.g., a prism). In some embodiments, 206B executes when a web page obtains ("GET") position and/or rotation data; and 208B executes when a web page determines ("SET") the position and/or rotation data.

The universe browser engine updates the position and rotation data for the web page at 210B upon receiving the position and rotation data from the browser engine in some embodiments. In some other embodiments where a SET request is received for new position and/or rotation data, the new position and/or rotation data may be stored in a non-transitory computer readable medium (e.g., cache) for the browser engine and may further be passed to the universe browser engine. The universe browser engine further determines whether the position and/or rotation data has been updated. For example, any positioning and rotation of the web page representation by a user may modify the position and/or rotation data. If the universe browser engine determines that the position and/or rotation data has changed, the universe browser engine may update the position and/or rotation data and send the latest version of the position and/or rotation data to the browser engine at 2128. The browser engine may then in turn store the position and/or rotation data stored in a non-transitory computer readable medium (e.g., cache) with the latest version of the position and/or rotation data.

Upon receiving the latest version of the position and/or rotation data, the browser engine may further calculate the graphical coordinates of the contents of the web page and render the contents of the web page in some embodiments. The web page panel may then be translated, rotated, scaled, or otherwise transformed based at least in part upon the latest version of the position and/or rotation data. The browser engine may then pass the rendered contents to the universe browser engine which, in turn, invokes various software and hardware modules of the mixed reality system to generate a representation of the rendered contents in the virtual 3D space and display the representation of the rendered contents in the translated, rotated, scaled, or otherwise transformed web page panel in the virtual 3D space to the user at 214B in these embodiments.

In some other embodiments, the browser engine renders the contents of a web page with the position and rotation data stored in the browser engine's cache and transmits the rendered contents and position and rotation data to the universe browser engine. The universe browser engine treats the rendered contents as a software object and allows the user to position and/or rotate the rendered contents of the web page. Once the user has determined the position and/or rotation of the web page representation, the universe browser engine update the position and rotation data and invokes, for example, the transform and rendering modules to generate an updated representation of the web page in the virtual 3D space for the software object and to present the updated representation of the web page to the user. In some of these embodiments, the mixed reality system may display the web page in the virtual 3D space (214B) in a nearly real-time fashion with no perceptible lag between user's manipulation and display of the web page, while the user is changing the position and/or rotation of the web page in the virtual 3D space.

Figure 2C:
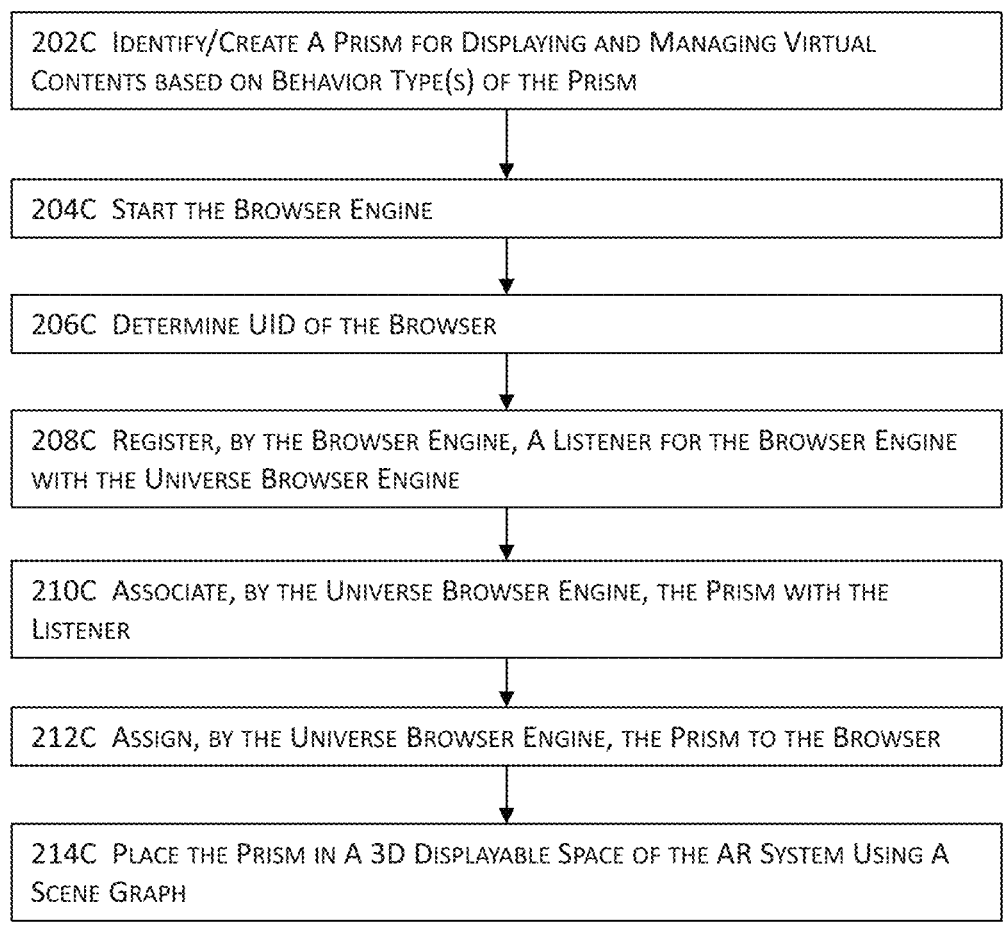
FIG. 2C illustrates a high-level block diagram for creating a universe prism that may be utilized for managing and displaying web pages and web resources in a three-dimensional virtual space with a mixed reality system in one or more embodiments.

FIG. 2C illustrates a high-level block diagram for identifying or creating a universe prism that may be utilized for managing and displaying web pages and web resources in a three-dimensional virtual space with a mixed reality system in one or more embodiments. As described above, a prism includes a three-dimensional space with a boundary that can be translated, rotated, and/or transformed with one or more three-dimensional matrices. The three-dimensional space defining a prism may also be of a reduced dimensionality. For example, a prism may include two-dimensional (or even one-dimensional) area that is reduced from a three-dimensional space. In these embodiments illustrated in FIG. 2C, a prism may be identified (if pre-existing) or created at 202C based in part or in whole upon one or more behavior types of the user, the prism, or the contents to be rendered in the prism.

In some embodiments, these one or more behavior types include, for example, a world lock, a billboard, an edge billboard, a follow headlock, a follow based on external sensor, or a fade, etc. A billboard type of behaviors includes the rules, constraints, requirements, or preference that it is more sensible to display certain objects in such a way to billboard towards (e.g., facing towards) a user during a movement sequence of the user, the user's head, and/or the user's eye(s) to enhance the legibility of the virtual objects as well as reduce the user's efforts to manage the virtual objects and/or the prism in the movement sequence. For example, a planar virtual object (e.g., a web page displaying certain information) may be positioned and oriented by automatically translating, rotating, and/or transforming the planar virtual object within the prism relative to the physical environment so that the planar virtual object faces the user during the user's movement sequence. The prism may thus be created or identified at 202C to accommodate this type of behaviors.

The edge billboard type of behaviors begins translating, rotating, or transforming towards the user of the mixed reality system if or when the user would be viewing the virtual contents at some pre-defined oblique angle, yet the virtual contents remain stationary before such translation, rotation, or transformation is triggered by the oblique viewing angle. The world lock type of behaviors locks the prism without accommodating any dynamic aspects of the user or the virtual object(s).

In the follow headlock type of behaviors, one or more virtual objects (e.g., a web page panel, the controls for the web browser, etc.) may be translated, rotated, and/or transformed in such a way that these one or more virtual objects appear to be fixed relative to the user's head and thus moves along with the user's head movement. Similarly, there may be follow body-lock type of behaviors, follow eye-lock type of behaviors, and follow based on one or more external sensors. The prism for displaying such one or more virtual objects may be identified (if pre-existing) or created anew (if non-existing) to accommodate these types of behaviors.

In the fade type of behaviors, a virtual object may begin to dissolve or disappear at a specified distance (e.g., the mixed reality system stops rendering the virtual object). In some embodiments, the virtual object fades out smoothly, while the virtual object disappears abruptly in some other embodiments. Another type of behaviors includes the behavior of a prism relative to another object such as another prism, an anchor location in the virtual space, etc. For example, a prism may be generated or placed on top of a surface of a physical object (e.g., a wall, a desk, the floor, the ceiling, etc.)

A relational type of behaviors includes the behaviors of a prism in relation to another prism. For example, a second prism may be generated or placed to maintain a child-parent relationship with a first prism where the first prism is the parent of the second prism. These two prisms may be translated, rotated, and/or transformed with the same transformation. An example of such parent-child prisms may include a parent prism for a web page and a child prism for the web browser controls so that when the parent prism is translated, rotated, or transformed, the child prism also translates, rotates, or transforms along with the parent prism, although these two prisms may also be independently translated, rotated, and/or transformed as described above.

Another type of behaviors includes collision and overlapping behaviors. This type of behaviors governs how two prisms behave upon the occurrence of a collision, whether two prisms may be overlapping with each other, etc. For example, this type may permit or prevent collisions between two prisms as well as how much overlap, if permitted, is allowed between these two prisms. In some embodiments where collision and overlapping may be prevented by this type of behaviors, a user may override such rules by continue to translate, rotate, or transform one or more prisms (e.g., by continuing to manipulate a prism, by ignoring a message about collision/overlapping, etc.), the mixed reality system may thus consider such rules overridden and allow the prisms to collide or overlap with each other. prisms may thus be identified or generated based at least in part upon the aforementioned types of behaviors.

A web browser and its browser engine may be started at 204C. The web browser may be started in response to a user action or interaction with a universe browser engine such as opening a new application, entering a search criterion, entering or clicking on a URL (with hand gesture(s), using a controller, with voice command(s), etc.), interaction with the launcher, etc., and the web browser and the web engine may be started with a service at 204C.

A universe browser engine operates using a prism and optionally a distributed scene graph for 2D and/or 3D contents and also using a browser engine (and optionally other services such as the runtime layer, one or more 3D engines, libraries, etc. of a mixed reality system) for rendering contents of web pages. A distributed scene graph is a data structure that may be used by vector-based graphics, editing applications, and gaming software, etc. and arranges the logical representation (and optionally the spatial representation) of a graphical scene using, for example, relative placement algorithms and/or arbitrary transforms. A scene graph may define how contents are arranged and transformed relative to each other within its structure.

In addition, more than one software application (e.g., web browser, email clients, etc.) may render into the virtual 3D space that is also managed by the universe browser engine. Because one or more prisms may be allocated for each software application, these one or more prisms for a software application may constitute a sub-tree of a distributed scene graph. Moreover, a prism may be created via user action or interaction or by an application. For example, a software application may request the generation of a prism, but the universe browser engine may deny such requests. The universe browser engine, rather than any other specific software component, is responsible for the management and generation of prisms. A unique identification of the web browser (or its browser engine) may be determined at 206C by, for example, a package manager service. Similarly, the universe browser engine may also determine the unique identification of the web browser (or its browser engine).

The web browser (or its browser engine) for which the prism is to be created or placed may register a listener at 208C with the universe browser engine. A listener includes an interface object that receives messages or communications. For example, a listener may receive IPC (inter-process communication) messages or, in the case of an Android system, from an Android Binder interface. A listener may be used to inform the web browser (or its browser engine) of the generation and destruction of prisms, based in part or in whole upon the movement or interaction of the user with respect to the prisms.

The universe browser engine may then associate the prism to the listener at 210C and assign the prism to the web browser (or its browser engine) at 212C by using the aforementioned unique identifications. The universe browser engine may then place the prism in a 3D virtual space or 3D displayable space of the mixed reality system at 214C by using the aforementioned scene graph. In some embodiments, the universe browser engine may place the prism in the 3D space based in part upon the position and rotation data of the web page (or the web page panel) that is to be rendered into the 3D virtual or displayable space.

Figure 2D:
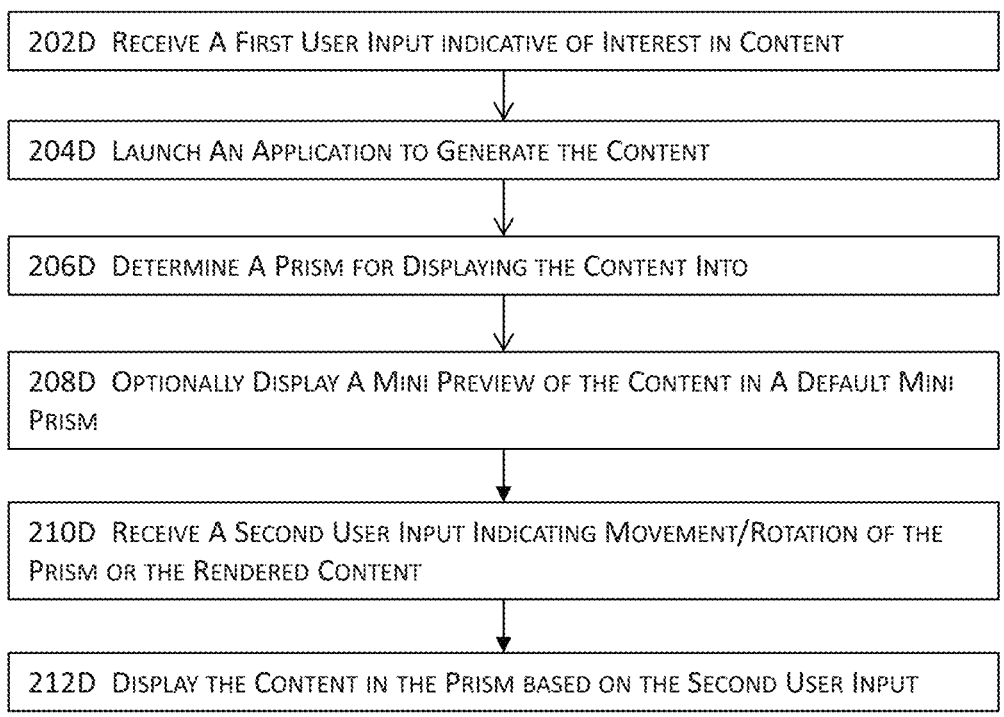
FIG. 2D illustrates a high-level block diagram for opening and placing a web page in a universe browser prism according to some embodiments.

FIG. 2D illustrates a high-level block diagram for opening and placing a web page in a universe browser prism according to some embodiments. In these embodiments, a mixed reality system may receive a first user input at 202D that is indicative of the user's interest in contents from the Internet. The first user input may include, for example, a user's action to extract contents from an extractable node (e.g., a website providing extractable contents in its web pages) on the Internet. The first user input may include a user action or interaction (e.g., by clicking on a controller, by hand gesture(s), via voice command(s), etc.) that starts a software application (e.g., a web browser, email client, etc.) The first user input may also include a user's triggering a dispatch from another software application where the dispatch must be handled by a different application. For example, a user may click (with a controller, via hand gestures, or using voice command(s)) a link in a social media page, and the link is to be handled by a web browser.

In response to the first user input, a software application (e.g., a web browser) may be launched at 204D to generate the contents of interest. For example, the universe browser engine may launch a web browser (and its browser engine) in response to a user's entering a search criterion in a search field that is also provided in the virtual 3D space generated by a mixed reality system. A prism may be determined at 206D for displaying the contents of interest. For example, the universe browser engine may determine a pre-existing prism or generate a new prism for displaying the contents of interest in response to the first user input.

A mini preview of the contents of interest may be optionally generated at 208D with less details or no discernible/legible details at all in the virtual 3D space. In some embodiments, a mini preview prism may be generated at 208D and displayed to the user; and the mini preview prism may or may not include the mini preview of the contents of interest. The mini preview of the contents and/or the mini preview prism may be generated and presented to the user before the contents of interest are rendered so that the user may determine whether to re-position, rotate, and/or transform the mini preview contents or mini preview prism.

A second user input may be received at 210D. The second user input indicates whether the prism, the mini preview prism, the contents, or the mini preview contents are to be translated, rotated, and/or transformed and if so, how much the prism, the mini preview prism, the contents, or the mini preview contents are to be translated, rotated, and/or transformed. For example, the universe browser engine may determine whether the user would translate, rotate, and/or transform the prism or the contents of interest. If the determination is affirmative, the universe browser engine may further determine the extent of such translation, rotation, and/or transformation based at least in part on the second user input (e.g., a user moves and rotates the contents or web page to a new position and a new orientation).

As described above, the universe browser engine may function in conjunction with the browser engine to first display a mini preview prism or mini preview of a web page to a user before the contents of interest are fully rendered. Once the user finishes with translating, rotating, and/or transforming the mini preview contents or mini preview prism, the new position and rotation data may be communicated back to the browser engine which, in turn, calculates the graphical coordinates and renders the contents of interest with at least the calculated graphical coordinates. In some other embodiments, the universe browser engine and the browser engine render and display the contents of interest to the user; and the user may subsequently translate, rotate, and/or transform the rendered contents of interest. The universe browser engine will similarly communicate the new position and/or rotation data resulting from the translation, rotation, and/or transformation back to the browser engine which, in turn, updates its stored position and/or rotation data. The contents of interest may then be displayed in the prism at 212D based at least in part upon the second user input.

Figure 2E:
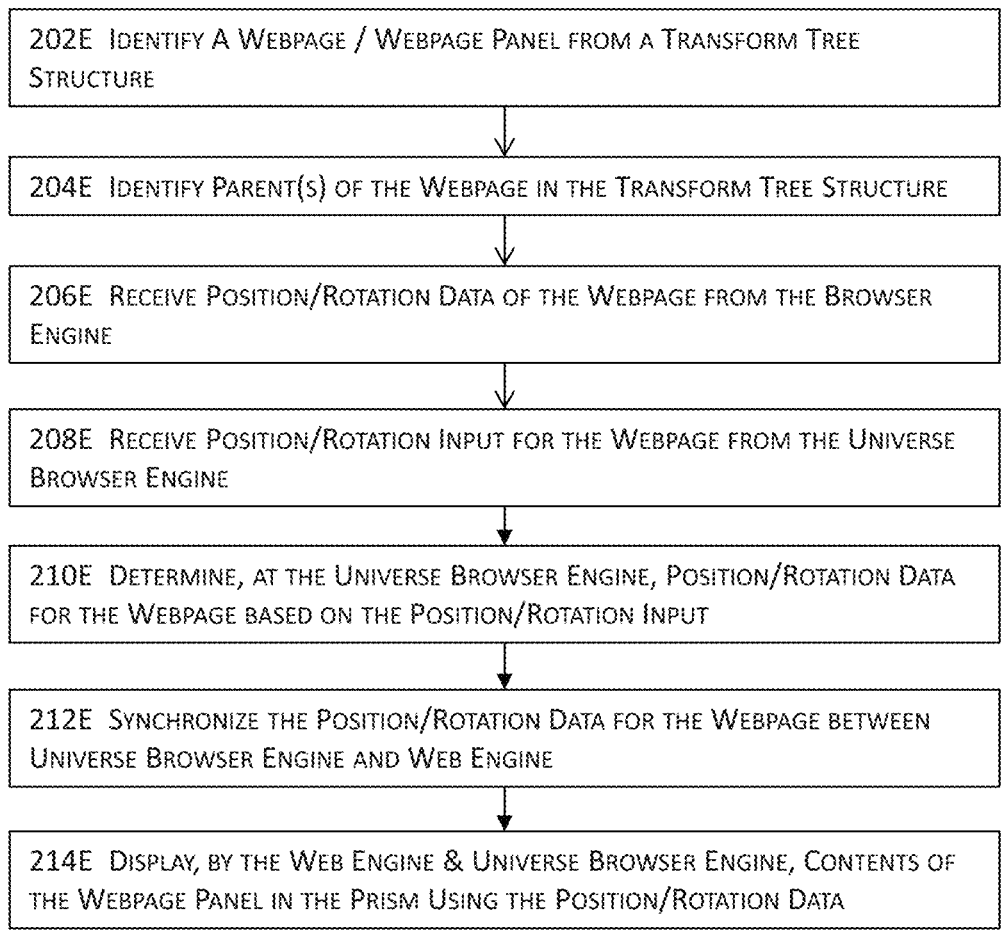
FIG. 2E illustrates a high-level block diagram for transforming a software object in a universe browser prism in one or more embodiments.

FIG. 2E illustrates a high-level block diagram for transforming a software object in a universe browser prism in one or more embodiments. A web page or a web page panel may be identified from a transform tree structure at 202E. A transform tree structure may include a scene graph having a plurality of nodes, and each node provides a moveable local space that corresponds to a prism. A prism may also be a node in the transform tree structure to be subject to one or more transforms based in part or in whole upon the hierarchical structure pertaining to the prism in the transform tree structure.

A transform tree structure may also include nodes that are not prisms. Rather, these nodes may be used to group contents or may be used as an intermediate transform (e.g., scaling, translation, rotation, etc.) For example, a group of nodes may be subject to the same set of transforms so that when the set of transforms is applied to one node, the remaining nodes in the group are also transformed along with the node.

One or more parents of the webpage identified at 202E may be identified at 204E from the transform tree structure. A node in the transform tree structure may have zero or more child nodes but may have at most one parent. In some embodiments, a prism may be initialized with a null parent and zero children in the corresponding transform tree structure. This transform tree structure may be subsequently populated with more nodes based on the contents that are subsequently rendered into the prism. The child nodes of a parent node in the transform tree structure inherits the transform(s) to which the parent node is subject.

In some embodiments, a root node in the transform tree structure corresponds to the root node transform which, when applied to transform a prism, does not require update the transforms of the nodes that are local to the root node transform. For example, nodes representing audio contents may be local to the root node transform so that the audio signals are constrained within the prism and are not perceived as emitting from outside of the prism, even when the prism is transformed. In some embodiments, a child node may change its parent node, yet the child node does not change its current position or orientation after the change unless it is desired or required for the child node to be subject to a different set of transforms to initiate the change of its parent node. For example, a child prism facing the user may change its parent prism to a new parent prism. Nonetheless, the change does not change the position and rotation of the child prism so that the child prism continues to face the user after the change.

The universe browser engine may receive the position and/or rotation data of the web page or the web page panel at 206E from the browser engine. Such position and/or rotation data may be directly received from the browser engine as position and/or rotation data alone in some embodiments or as a part of other data (e.g., as a part of a web page rendered by the browser engine) in some other embodiments. The universe browser engine receives the position and rotation data of the web page from the browser engine so as to allow the user to manipulate (e.g., translate, rotate, and/or transform) the web page or the panel thereof.

As described above, although the universe browser engine manages the creation, placement and display of virtual contents in a 3D spatial environment, the universe browser engine may store the position and rotation data with the browser engine (e.g., in the cache memory accessible by the browser engine) in some embodiments so that the browser engine may quickly respond to the position and/or rotation request from a web page, without further delay by requesting such position and/or rotation data from the universe browser engine. In some other embodiments, the universe browser engine may also store the position and rotation data in another non-transitory computer readable medium accessible by the universe browser engine; and the two copies of position and rotation data are synchronized every time when the position and/or rotation data changes.

The universe browser engine may further receive the position and/or rotation input for the web page at 208E. For example, a user may translate, rotate, and/or transform a web page or the panel thereof and thus provides the input for position and/or rotation data for the web page. The universe browser engine may determine the position and/or rotation data at 210E for the web page or a portion thereof (e.g., controls for the web page, a sub-panel, etc.) based at least in part upon the position and/or rotation input received at 208E. It shall be noted that a web page or a portion thereof may be used interchangeably in this application, unless otherwise explicitly described (e.g., a smaller portion of a web page). Because the position and/or rotation input modifies the position and/or rotation data of the web page (or its panel), the universe browser engine may synchronize its position and/or rotation data with the corresponding data stored with the browser engine at 212E. In some embodiments, the universe browser engine synchronizes the entire position and rotation data with the browser engine. In some other embodiments, the universe browser engine tracks the changes to its position and rotation data and synchronizes only the deltas between its own position and rotation data and the corresponding data with the browser engine.

The browser engine receives the updated position and/or rotation data from the universe browser engine and calculates the graphical coordinates of the contents to be rendered and renders the contents by invoking the renderer process (e.g., RenderWidget for Blink or WebKit). The universe browser engine may then function in conjunction with the browser engine and the mixed reality system to display the rendered contents in the prism at 214E using at least the position and rotation data of the web page.

Figure 2F:
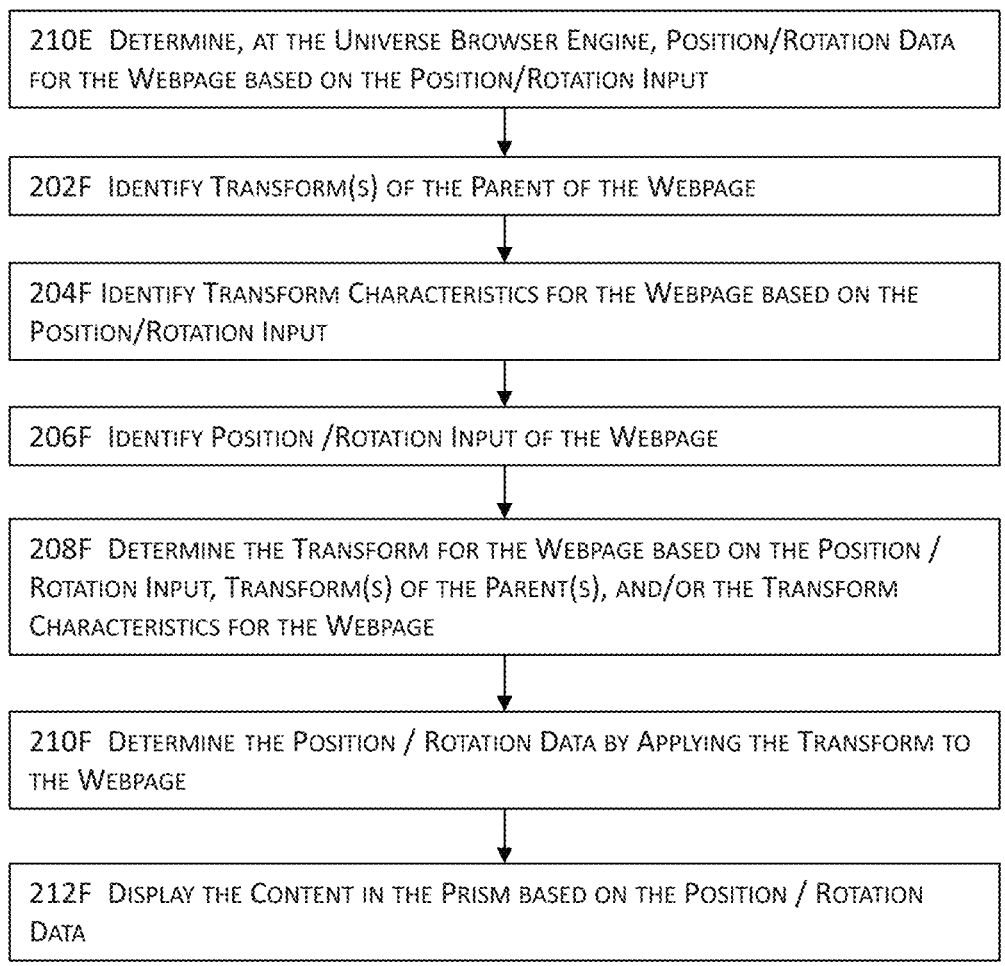
FIG. 2F illustrates more details about a portion of the block diagram illustrated in FIG. 2E, according to some embodiments.

FIG. 2F illustrates more details about a portion of the block diagram illustrated in FIG. 2E, according to some embodiments. More specifically, FIG. 2F illustrates more details about determining the rotation and/or rotation data for the web page at 210E based in part or in whole on the position and/or rotation input received at 208E of FIG. 2E. In these embodiments, a set of transforms may be optionally identified at 202F for the parent, if any, of the web page. In some other embodiments, the browser engine may identify the position and/or rotation data; and the universe browser engine may identify the position and/or rotation data at 202F from the browser engine either directly in the form of position and/or rotation data alone or as a part of other data (e.g., a rendered web page), without identifying the set of transforms of the parent of the web page (or a portion thereof). The transform characteristics of the set of transforms may be identified for the web page at 204F based in part or in whole upon the position and/or rotation input received at 208E. The transform characteristics may include, for example, the desired or required transforms for the web page (e.g., the desired or required transformed envisioned by the developer of the web page), the parent(s) of the node representing the web page, the type of behaviors of the web page or the prism in which the web page is rendered, the characteristics of the prism (e.g., extents, collision characteristics, overlapping/intersection characteristics, etc.) into which the web page is rendered, or any combinations thereof.

In some embodiments, the position and/or rotation input may include a change in the parent-child relationship(s) pertaining to the node that represents the web page in the transform tree structure. For example, a position and/or rotation input may change the parent of the node for the web page. In general, the set of transforms applied to a parent node also applies to the child nodes of the parent node. In some embodiments, changing the parent of a child node may not necessarily change the transforms applied to the child node. For example, if a web page is presented with the follow headlock (or follow eye-lock) type of behaviors, changing the parent of the child node representing the web page may not change the set of transforms applied to the web page because the parent set of transforms applied to the parent node may be overridden by this type of behaviors.

The position and/or rotation input for the web page may be identified at 206F. For example, a user may translate, rotate, and/or transform a web page or the panel thereof and thus provides the position and/or rotation input for the web page at 206F. As described above, the position and/or rotation input may include a change in the nodal structure of the transform tree structure. For example, the node representing the web page may add and/or remove one or more nodes as its parent and/or children.

Changing the parent of the node representing the web page may or may not change the set of transforms applied to the node representing the web page. For example, in some embodiments where a world transform is applied to all nodes in the transform tree structure, changing the parent of the node representing the web page may not change the world transform that is nevertheless applied to the node as well as the other nodes in the transform tree structure. As another example, if the web page is to be presented to face the user according to a follow headlock behavior type, this behavior type may override one or more other transforms that may interfere with the follow headlock behavior type so that these one or more other transforms are not applied to the node.

The set of transforms for the web page may be determined at 208F based at least in part upon, for example, one or more of the position and/or rotation input, the set of transforms for the parent, or the transform characteristics for the web page identified at 204F. In some embodiments, a node representing the web page in the transform tree structure may include or correspond one or more of the extents of the web page (or its panel) in the virtual 3D space, one or more local transforms for the web page, a 3D rotation matrix governing rotation of the web page, a scale factor corresponding to the local transforms, position vectors of the web page, one or more local to world transforms, or a local-to-world scale.

A local transform includes a transform that is applied to the parent node of the node representing the web page in the transform tree structure. In some embodiments where the node representing the web page does not have a parent node, the world transform (from a general or default space to the local prism in which the web page is rendered) may be assigned to be the local transform. In some embodiments where the node includes or corresponds to multiple elements described above (e.g., multiple transforms), a local transform may be determined by applying these multiple elements successively. For example, if the node of the web page is subject to a translation transform, a scaling transform, and a rotation transform, the local transform may be determined to be the following symbolic representation: local transform=translation*rotation matrix*scaling. This local transform, when applied to the web page, scales the web page according to the scaling factor(s) (e.g., non-uniform scaling among three axes may be supported), rotates the scaled web page according to the rotation matrix, and then moves the scaled, rotated web page according to the translation matrix.

In some embodiments, OpenGL Mathematics (GLM) may be used to accomplish the transforms for the web page, although other mathematics libraries may also be used to accomplish the same. The following example code demonstrates the use of GLM to accomplish the transform of a web page.

```
TransformNode::getCurrentVolumeTransform( );
TransformNode::setVolumeTransform(const glm::vec3* aPos, const glm::quat*
    aRot, const glm::vec3* aScale, PropagateMode aPropagate);
```

In the above code, "Transform Node::getCurrentVolumeTransform( )" may be used to obtain a web page panel's transform; and the other code segment may be used to set a web page panel's transform. In addition, the following example code may be used to decompose a web page panel's transform into position and rotation although it shall be noted that other similar or equivalent implementations have also been contemplated and may also be used to achieve an identical or substantially similar purpose.

```
OperatingSystem::Math::Decompose(const glm::mat4& a_transform,
glm::vec3& a_position, glm::quat& a_rotation, glm::vec3& a_scale)
```

With the set of transforms for the web page determined at 208F, the position and rotation data for the web page (or its panel) may be determined at 210F by applying the set of transforms to the web page. With the position and rotation data, the browser engine may calculate the graphical coordinates of the contents to be rendered and invoke a renderer (e.g., RenderWidget or other renderer) to render the contents. The rendered contents may then be displayed in the prism at 212F based in whole or in part upon the position and rotation data.

Figure 2G:
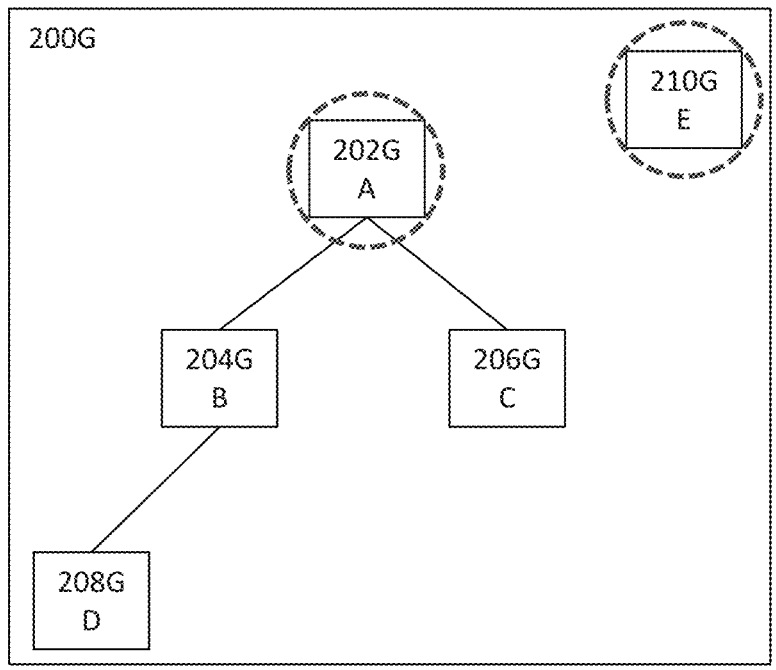
Figure 2H:
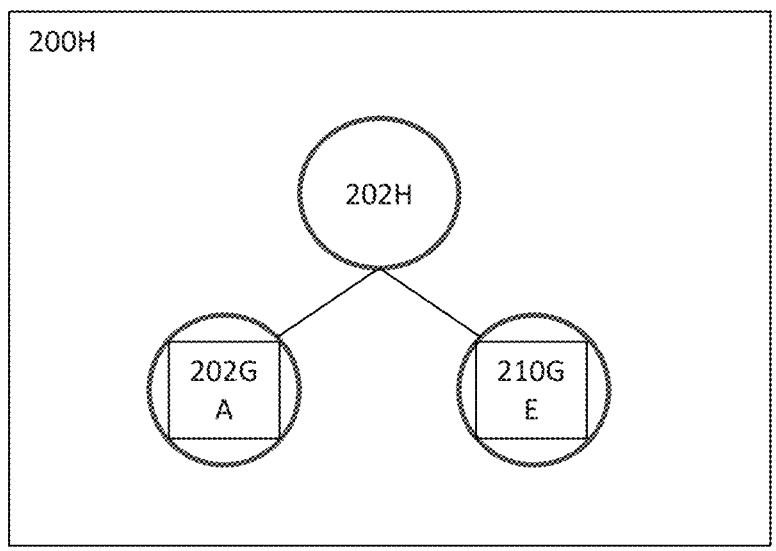
Figure 21:
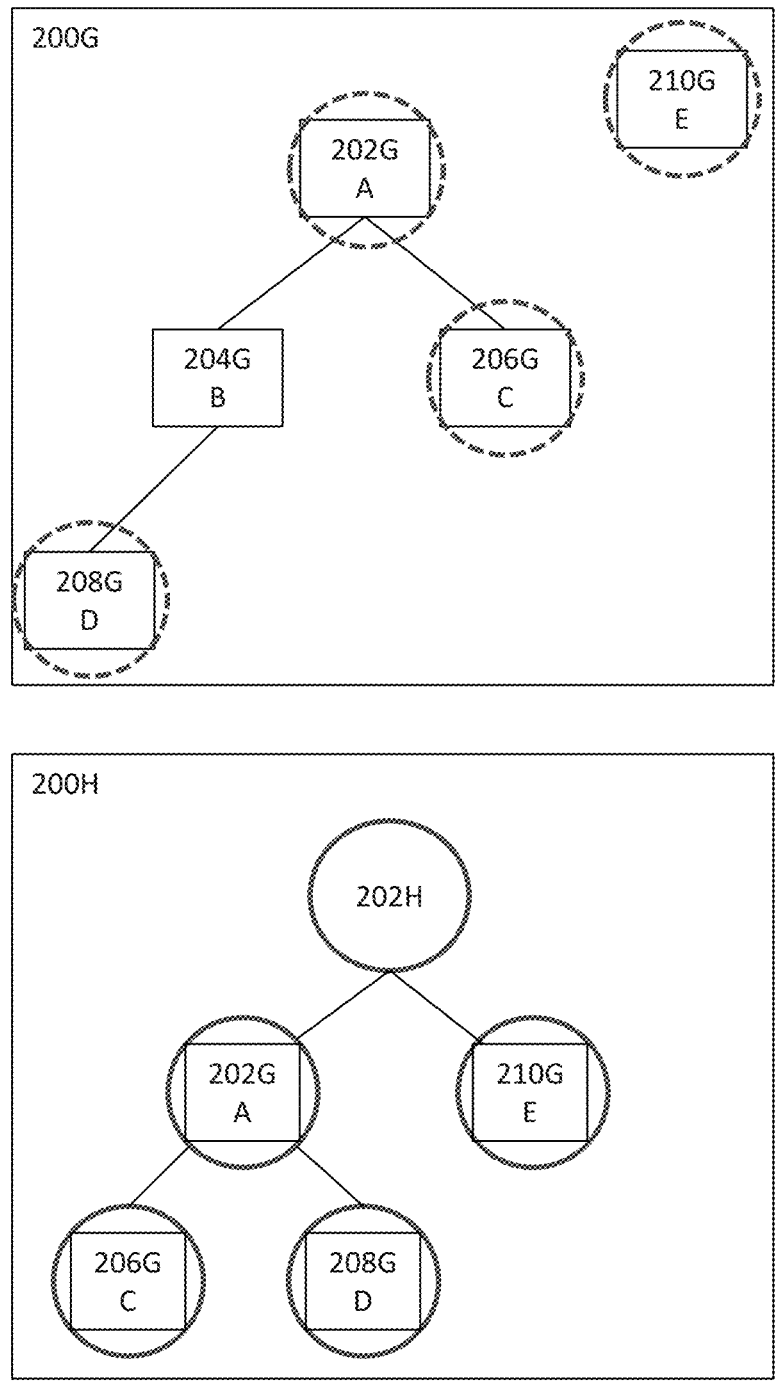

FIGS. 2G-2I illustrate the embodiments where any nodes may be grouped in any manner, and the corresponding transform(s) may depend on the parent-child relationships resulting from such groupings of nodes. These examples illustrate in FIGS. 2G-2I include various transform trees and group trees and/or creating a new group in some embodiments. For example, regarding the transform tree 200G in FIG. 2G, this embodiment illustrates a grouping of nodes A (202G) and node E (210G) together, which are currently in separate transform trees. A determination may be first made as to whether or not node A (202G) or node E (210G) is already in a group. Currently, neither node A (202G) nor node E (210G) has a group-parent so neither is in a group. Therefore, a Group Root may be created.

In FIG. 2H, a group tree 1022 having a Group Root 202H is created. Node A (202G) and node E's (210G) group parent is assigned to the Group Root 202H as depicted in FIG. 2H. Moreover, a determination is made to decide whether node E (210G) is an ancestor (or parent) of node A (202G). Node E (210G) is not an ancestor of node A (202G) because node A (202G) has no parent. In addition, another determination may be made to decide whether node A (202G) is an ancestor (or parent) of node E (210G). Similarly, node A (202G) is not an ancestor of node E (210G) because node E (210E) has no parent.

FIG. 2I illustrates a sample calculation, according to some embodiments of the present disclosure. In some embodiments, any transform applied directly to a node that belongs in a group may transform the group along with it. Indirect transforms done to a group node may not transform the group. For example, if the parent node is not in a group, its child is in a group, and the parent is transformed, then the nodes in the child's group do not transform with it even though the child's transform is changing. If moving the whole group was desired, then the parent ought to be added to the group. To calculate the transform to apply to a group, the transform to use must be applied to each immediate child of the Group Root.

For the given transform tree 200G and group tree 200H as depicted in FIG. 2I, this embodiment applies a transform to node A (202G). Since node A (202G) belongs in the group tree 200H, nodes C (206G), D (208G), and E (210G) are expected to be transformed with node A (202G). Additionally, node B (204G), which does not belong in the group, must also transform with the group because it is a child of node A (202G). Node A's (202G) new world matrix may be denoted as: Maw', where Maw' stands for "matrix a world new." Node A's (202G) old world matrix may be denoted as: Maw, where Maw stands for "matrix a world old." The matrix to apply to node A (202G) to get Maw' may be denoted as: Mgw, where Mgw stands for "matrix group world." One of the goals is to determine a matrix to set to the Group Root (Mgw) where when it's applied to node A's world matrix, it will equal node A's new matrix. This same matrix may be applied to the other immediate children of the Group Root.

Figure 2J:
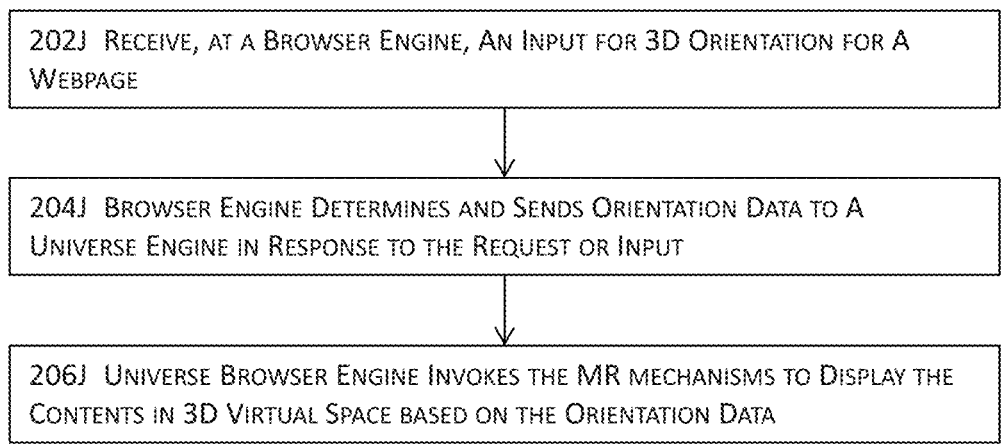
FIG. 2J illustrates a high-level block diagram for a process of managing and displaying web pages and web resources in a three-dimensional virtual space with a mixed reality system in one or more embodiments.

FIG. 2J illustrates a high-level block diagram for a process of managing and displaying web pages and web resources in a three-dimensional virtual space with an extended reality system in one or more embodiments. In these embodiments, a browser engine may receive an input for three-dimensional (3D) orientation for a webpage at 202J. In some embodiments, an input may include an input by a user of a mixed reality system requesting for a presentation of a web page of interest or the web page developer who prefers and thus codes the web page to be presented in a certain manner. In some other embodiments, an input may include a request for orientation data. For example, a request for orientation data (e.g., positing data, rotation data, and/or even scale data in some embodiments) may be issued by a website of the webpage of interest in some embodiments. For example, the developer of the webpage may incorporate the application programming interfaces (e.g., the Window.VirtualWorld.Orientation API described above) into the code of the webpage of interest.

As described immediately above, an input may originate from, for example, the developer who prefers representing the web page in a certain orientation (e.g., a certain rotation) when presented in a virtual 3D space in some embodiments. In some of these or other embodiments, an input may come from a user's manipulation of a web page, the same web page previously visited, or other web pages from the same website, or optionally from other websites, etc. in the virtual 3D space created by a mixed reality system.

For example, a web page may be opened and displayed in the virtual 3D space for a user; and the user may adjust the orientation of the web page in the virtual 3D space. In some of these embodiments, similar techniques may further apply to manipulating the web browser for the web page or the prism in which the web page is rendered. A user may freely adjust the orientation of a web page representation in the virtual 3D space as provided by, for example, the universe browser engine and/or the webpage developer; and the constraints on such orientation manipulation includes, for example, the boundaries of the prism, the permissible orientation value(s), the permissible orientation range(s), etc. In some embodiments, such orientation may also be optionally constrained by the collision and/or overlapping dynamics between a web page representation and one or more other physical and/or virtual objects in the virtual 3D space so that the web page representation and virtual objects appear to be, or are perceived to be real.

A browser engine (e.g., Blink, Gecko, WebKit, Trident, etc.) is not a stand-alone computer program. Rather, a browser engine is a software component of a web browser that transforms resources (e.g., HTML documents, etc.) of a webpage into an interactive visual representation. Other terms that are commonly used for a browser engine include, for example, layout engine, rendering engine, etc. by calculating graphical coordinates for the visual representation based on the rules in the cascading style sheets (CSS).

As the names suggest, a browser engine performs layout and rendering for webpages, enforces security policies, and implements the DOM (Document Object Model) data structures that are exposed to page scripts. A browser engine may also handle hyperlinks and web forms. In some embodiments, a browser engine utilizes another dedicated script engine for the execution of JavaScript code. In addition to performing at least the aforementioned functions for a web browser, a browser engine may also perform identical or substantially similar functions for other software programs such as email clients, other framework (e.g., Google's Electron Framework) for software applications, The browser engine may determine the orientation data at 204J and responds to the request for a 3D orientation or 3D orientation manipulation. In some embodiments, the browser engine may store the most recent orientation data in a non-transitory computer readable medium (e.g., cache memory) accessible by the browser engine. Such orientation data may be sent by the universe browser engine of a mixed reality system every time the orientation data is modified (e.g., by a user who further moves, rotates, or transforms a webpage displayed in a virtual 3D space).

When a web browser initializes for rendering and displaying a web page, its browser engine may respond to such a request for orientation with the orientation data stored in, for example, the cache memory accessible by the browser engine (e.g., in the RenderWidget class in Chromium-based browser). Once the orientation data is modified, the browser engine may refresh its stored orientation data with the updated orientation data or an update to the orientation data from the universe browser engine. With the most recent orientation data, the browser engine may render contents of the web page (e.g., by calling the RenderWidget class) to calculate the graphical coordinates for the rendered contents using, for example, the most recent orientation data and rules govern the layout of the rendered contents (e.g., cascading style sheets).

A universe browser engine of a mixed reality system may invoke a browser engine that in turn invokes one or more mixed reality software modules and/or hardware mechanisms to display the web page in a virtual 3D space at 206J. For example, depending upon the orientation of the web page in the virtual 3D space (e.g., in a prism), the virtual 3D representation of the web page may span across multiple depth-planes or multiple focal-planes. An extended reality system may utilize, for example, its switchable focal planes or variable focusing mechanism to render the virtual 3D representation of the web page based on the 3D orientation data.

More details about the extended reality system are described in the U.S. patent applications referenced in the first paragraph of the present application. In some embodiments, this invocation of the mixed reality mechanisms may be done via the browser (e.g., Chromium) and/or the browser engine (e.g., Blink for Chromium). For example, the browser (or its browser engine) may apply the orientation data (or even optionally the scale data) to the web page panel and invokes the mixed reality mechanisms to display virtual 3D contents.

Figure 2K:
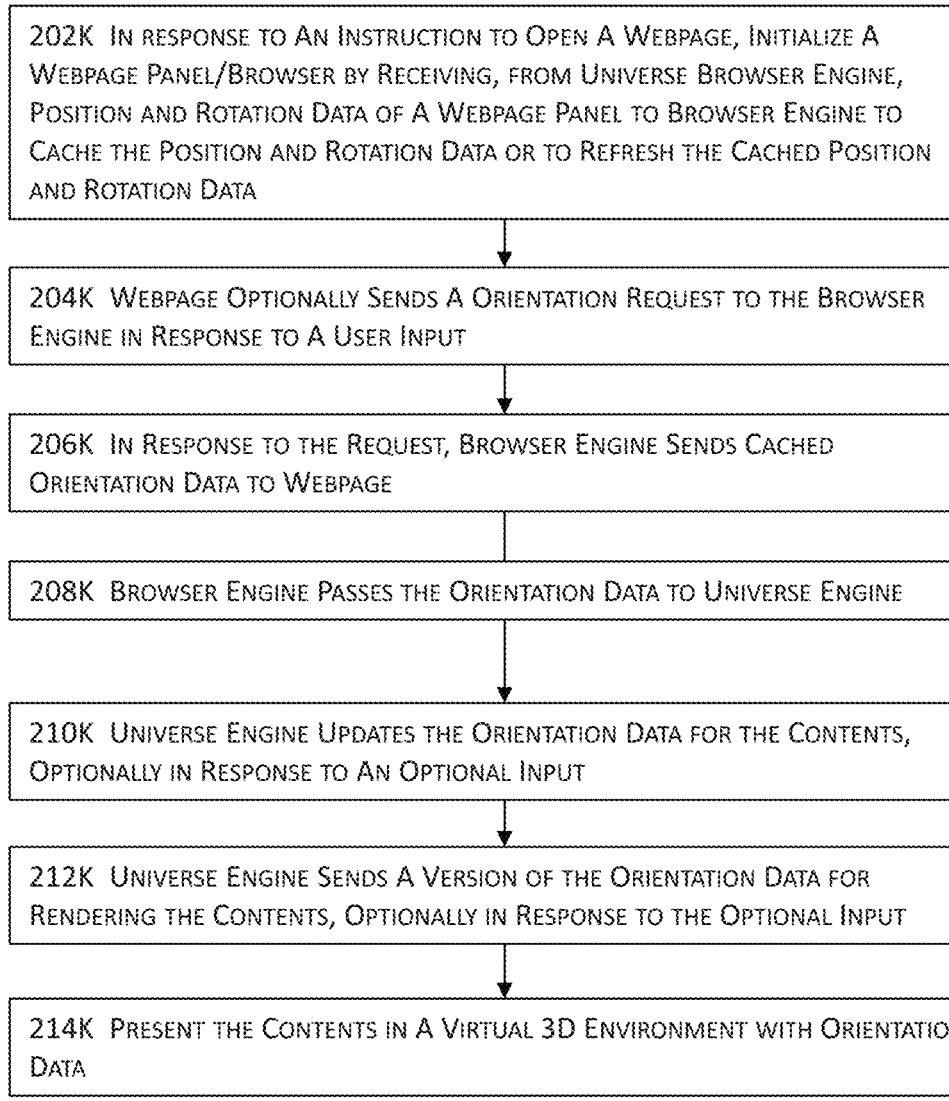
FIG. 2K illustrates a more detailed block diagram for a process of managing and displaying web pages and web resources in a three-dimensional virtual space with a mixed reality system in one or more embodiments.

FIG. 2K illustrates a more detailed block diagram for a process of managing and displaying web pages and web resources in a three-dimensional virtual space with a mixed reality system in one or more embodiments. In response to an instruction to open a web page (e.g., by user's clicking on a link, by user's entering a search criterion in the search field, by enter an URL for a website, etc.), a web browser or a webpage panel is launched at 202K.

The universe browser engine may send the orientation data to the browser engine of the web browser so that the orientation data may be stored in a non-transitory computer readable medium (e.g., cache) or the orientation data in the non-transitory computer readable medium may be refreshed. The browser engine may then cache or store the received orientation data in, for example, the cache memory accessible by the browser engine. In some embodiments where the orientation data has been stored in a non-transitory computer readable memory (e.g., cache) accessible by a browser engine, the stored orientation data stored in the non-transitory computer readable memory may be initialized by orientation data from the universe browser engine.

The webpage may optionally send an orientation request to the browser engine at 204K. For example, the developer of the web page may incorporate a set of application programming interfaces (APIs) (e.g., the Window.VirtualWorld.Orientation API described above) into the code of the webpage so that the web page, upon or shortly after initialization, sends a request for orientation data to the browser engine. In some embodiments where the developer of the web page may desire to represent the web page in a certain orientation, the web page may also utilize the set of APIs to set the orientation data by communicating the orientation data to the browser engine. In some of these embodiments, a web page may obtain the orientation data of a web page pane from the browser engine in response to a user input (e.g., a user's clicking on a link, a user's entering a search criterion in the search field, a user's entering an URL for a website, etc.)

In response to the optional orientation request from the web browser displaying the web page, the browser engine may respond to the request with most recent orientation data stored in a non-transitory computer readable medium accessible by the browser engine at 206K, without further delay from, for example, obtaining such orientation data from the universe browser engine of the mixed reality system. If the most recent orientation data is unavailable (e.g., for the mixed reality system that is initialized for the first time or for other reasons), the browser engine may respond to such a request from the web page with the default orientation data.

The browser engine may also transmit the orientation data to the universe browser engine at 208K. For example, some embodiments may provide the user with the ability to orient the representation of the web page in the virtual 3D space. In some embodiments where a GET request is received, the browser engine returns the orientation data that has been stored in a non-transitory computer readable medium (e.g., cache) to the web page.

The universe browser engine receives the orientation data from the browser engine of the web browser and invokes other modules (e.g., a runtime layer, an operating system service layer, one or more 3D engines, or one or more software applications, etc. described above) of the mixed reality system as well as other hardware and software components thereof to enable the user to freely adjust the 3D orientation for the representation of the web page in the virtual 3D space (e.g., a prism). In some embodiments, 206K executes when a web page obtains ("GET") orientation data; and 208K executes when a web page determines ("SET") the orientation data.

The universe browser engine updates the orientation data for the web page at 210K upon receiving the orientation data from the browser engine in some embodiments. In some other embodiments where a SET request is received for new orientation data, the new orientation data may be stored in a non-transitory computer readable medium (e.g., cache) for the browser engine and may further be passed to the universe browser engine. The universe browser engine further determines whether the orientation data has been updated.

For example, any orientation of the web page representation by a user may modify the orientation data. If the universe browser engine determines that the orientation data has changed, the universe browser engine may update the orientation data and send the latest version of the orientation data to the browser engine at 212K. The browser engine may then in turn store the orientation data stored in a non-transitory computer readable medium (e.g., a cache) with the latest version of the orientation data.

Upon receiving the latest version of the orientation data, the browser engine may further calculate the graphical coordinates of the contents of the web page and render the contents of the web page in some embodiments. The web page panel may then be translated, rotated, scaled, or otherwise transformed based at least in part upon the latest version of the orientation data. The browser engine may then pass the rendered contents to the universe browser engine which, in turn, invokes various software and hardware modules of the mixed reality system to generate a representation of the rendered contents in the virtual 3D space and display the representation of the rendered contents in the translated, rotated, scaled, or otherwise transformed web page panel in the virtual 3D space to the user at 214K in these embodiments.

In some other embodiments, the browser engine renders the contents of a web page with the orientation data stored in the browser engine's cache and transmits the rendered contents and orientation data to the universe browser engine. The universe browser engine treats the rendered contents as a software object and allows the user to adjust the 3D orientation of the rendered contents of the web page.

Once the user has determined the orientation of the web page representation, the universe browser engine update the orientation data and invokes, for example, the transform and rendering modules to generate an updated representation of the web page in the virtual 3D space for the software object and to present the updated representation of the web page to the user. In some of these embodiments, the mixed reality system may display the web page in the virtual 3D space (214K) in a nearly real-time fashion with no perceptible lag between user's manipulation and display of the web page, while the user is changing the orientation of the web page in the virtual 3D space.

Figure 2L:
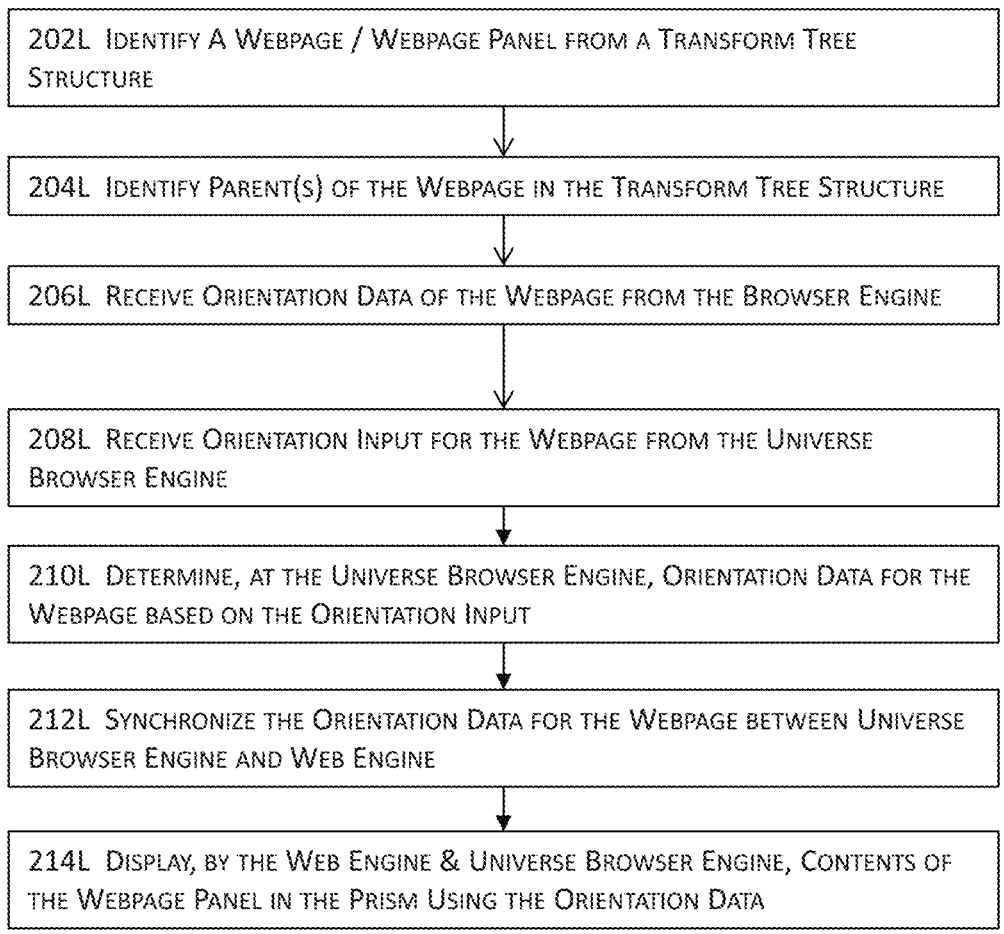
FIG. 2L illustrates a high-level block diagram for transforming a software object in a universe browser prism in one or more embodiments.

FIG. 2L illustrates a high-level block diagram for transforming a software object in a universe browser prism in one or more embodiments. A web page or a web page panel may be identified from a transform tree structure at 202L. A transform tree structure may include a scene graph having a plurality of nodes, and each node provides a moveable local space that corresponds to a prism. A prism may also be a node in the transform tree structure to be subject to one or more transforms based in part or in whole upon the hierarchical structure pertaining to the prism in the transform tree structure.

A transform tree structure may also include nodes that are not prisms. Rather, these nodes may be used to group contents or may be used as an intermediate transform (e.g., scaling, translation, rotation, etc.) For example, a group of nodes may be subject to the same set of transforms so that when the set of transforms is applied to one node, the remaining nodes in the group are also transformed along with the node.

One or more parents of the webpage identified at 202L may be identified at 204L from the transform tree structure. A node in the transform tree structure may have zero or more child nodes but may have at most one parent. In some embodiments, a prism may be initialized with a null parent and zero children in the corresponding transform tree structure. This transform tree structure may be subsequently populated with more nodes based on the contents that are subsequently rendered into the prism. The child nodes of a parent node in the transform tree structure inherits the transform(s) to which the parent node is subject.

In some embodiments, a root node in the transform tree structure corresponds to the root node transform which, when applied to transform a prism, does not require update the transforms of the nodes that are local to the root node transform. For example, nodes representing audio contents may be local to the root node transform so that the audio signals are constrained within the prism and are not perceived as emitting from outside of the prism, even when the prism is transformed.

In some embodiments, a child node may change its parent node, yet the child node does not change its current orientation after the change unless it is desired or required for the child node to be subject to a different set of transforms to initiate the change of its parent node. For example, a child prism facing the user may change its parent prism to a new parent prism. Nonetheless, the change does not change the orientation of the child prism so that the child prism continues to face the user after the change.

The universe browser engine may receive the orientation data of the web page or the web page panel at 206L from the browser engine. Such orientation data may be directly received from the browser engine as orientation data alone in some embodiments or as a part of other data (e.g., as a part of a web page rendered by the browser engine) in some other embodiments. The universe browser engine receives the orientation data of the web page from the browser engine so as to allow the user to manipulate (e.g., translate, rotate, and/or transform) the web page or the panel thereof.

As described above, although the universe browser engine manages the creation, placement, and display of virtual contents in a 3D spatial environment, the universe browser engine may store the orientation data with the browser engine (e.g., in the cache memory accessible by the browser engine) in some embodiments so that the browser engine may quickly respond to the orientation request from a web page, without further delay by requesting such orientation data from the universe browser engine. In some other embodiments, the universe browser engine may also store the orientation data in another non-transitory computer readable medium accessible by the universe browser engine; and the two copies of orientation data are synchronized every time when the orientation data changes.

The universe browser engine may further receive the orientation input for the web page at 208L. For example, a user may translate, rotate, and/or transform a web page or the panel thereof and thus provides the input for orientation data for the web page. The universe browser engine may determine the orientation data at 210L for the web page or a portion thereof (e.g., controls for the web page, a sub-panel, etc.) based at least in part upon the orientation input received at 208L. It shall be noted that a web page or a portion thereof may be used interchangeably in this application, unless otherwise explicitly described (e.g., a smaller portion of a web page).

Because the orientation input modifies the orientation data of the web page (or its panel), the universe browser engine may synchronize its orientation data with the corresponding data stored with the browser engine at 212L. In some embodiments, the universe browser engine synchronizes the entire orientation data with the browser engine. In some other embodiments, the universe browser engine tracks the changes to its orientation data and synchronizes only the deltas between its own orientation data and the corresponding data with the browser engine.

The browser engine receives the updated orientation data from the universe browser engine and calculates the graphical coordinates of the contents to be rendered and renders the contents by invoking the renderer process (e.g., RenderWidget for Blink or WebKit). The universe browser engine may then function in conjunction with the browser engine and the mixed reality system to display the rendered contents in the prism at 214L using at least the orientation data of the web page.

Figure 2M:
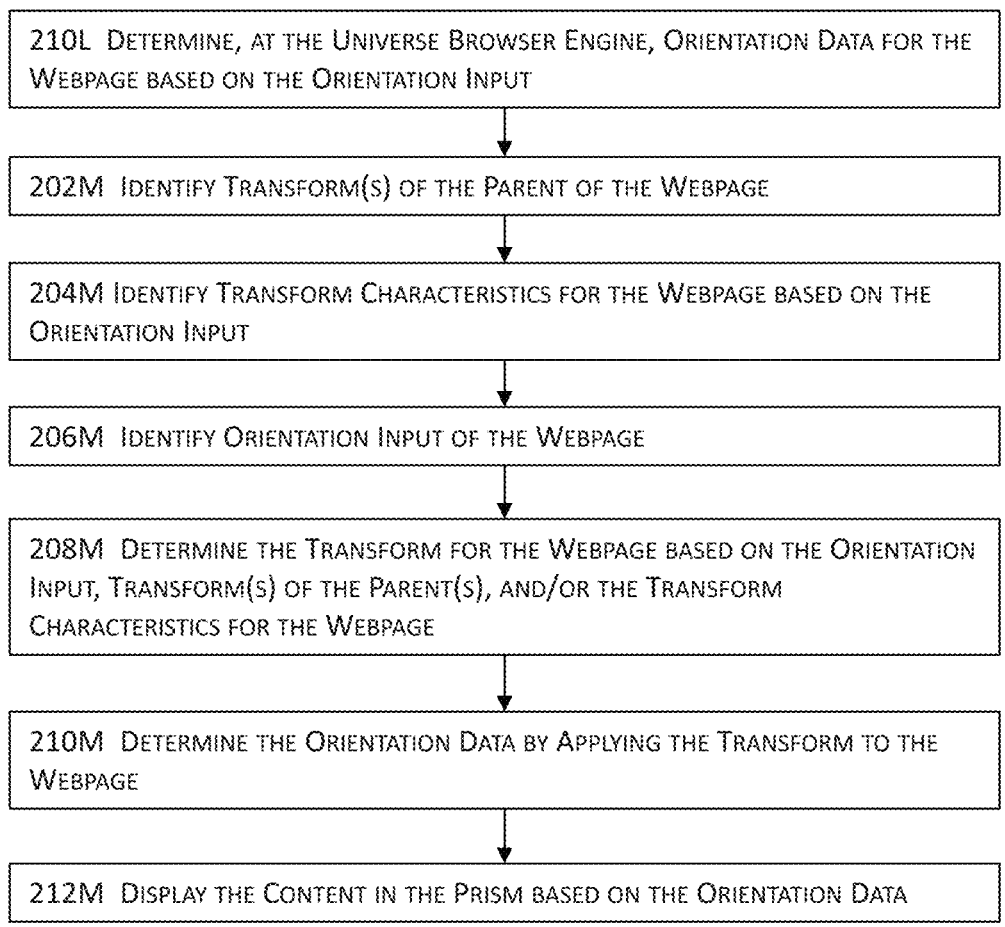
FIG. 2M illustrates more details about a portion of the block diagram illustrated in FIG. 2L, according to some embodiments.

FIG. 2M illustrates more details about a portion of the block diagram illustrated in FIG. 2L, according to some embodiments. More specifically, FIG. 2M illustrates more details about determining the orientation data for the web page at 210L based in part or in whole on the orientation input received at 208L of FIG. 2L. In these embodiments, a set of transforms may be optionally identified at 202M for the parent, if any, of the web page. In some other embodiments, the browser engine may identify the orientation data; and the universe browser engine may identify the orientation data at 202M from the browser engine either directly in the form of orientation data alone or as a part of other data (e.g., a rendered web page), without identifying the set of transforms of the parent of the web page (or a portion thereof).

The transform characteristics of the set of transforms may be identified for the web page at 204M based in part or in whole upon the orientation input received at 208L. The transform characteristics may include, for example, the desired or required transforms for the web page (e.g., the desired or required transformed envisioned by the developer of the web page), the parent(s) of the node representing the web page, the type of behaviors of the web page or the prism in which the web page is rendered, the characteristics of the prism (e.g., extents, collision characteristics, overlapping/ intersection characteristics, etc.) into which the web page is rendered, or any combinations thereof.

In some embodiments, the orientation input may include a change in the parent-child relationship(s) pertaining to the node that represents the web page in the transform tree structure. For example, an orientation input may change the parent of the node for the web page. In general, the set of transforms applied to a parent node also applies to the child nodes of the parent node. In some embodiments, changing the parent of a child node may not necessarily change the transforms applied to the child node. For example, if a web page is presented with the follow headlock (or follow eye-lock) type of behaviors, changing the parent of the child node representing the web page may not change the set of transforms applied to the web page because the parent set of transforms applied to the parent node may be overridden by this type of behaviors.

The orientation input for the web page may be identified at 206M. For example, a user may translate, rotate, and/or transform a web page or the panel thereof and thus provides the orientation input for the web page at 206M. As described above, the orientation input may include a change in the nodal structure of the transform tree structure. For example, the node representing the web page may add and/or remove one or more nodes as its parent and/or children.

Changing the parent of the node representing the web page may or may not change the set of transforms applied to the node representing the web page. For example, in some embodiments where a world transform is applied to all nodes in the transform tree structure, changing the parent of the node representing the web page may not change the world transform that is nevertheless applied to the node as well as the other nodes in the transform tree structure. As another example, if the web page is to be presented to face the user according to a follow headlock behavior type, this behavior type may override one or more other transforms that may interfere with the follow headlock behavior type so that these one or more other transforms are not applied to the node.

The set of transforms for the web page may be determined at 208M based at least in part upon, for example, one or more of the orientation input, the set of transforms for the parent, or the transform characteristics for the web page identified at 204M. In some embodiments, a node representing the web page in the transform tree structure may include or correspond one or more of the extents of the web page (or its panel) in the virtual 3D space, one or more local transforms for the web page, a 3D rotation matrix governing rotation of the web page, a scale factor corresponding to the local transforms, orientation vectors of the web page (an orientation vector indicating the position and/or the orientation of the web page), one or more local to world transforms, or a local-to-world scale.

A local transform includes a transform that is applied to the parent node of the node representing the web page in the transform tree structure. In some embodiments where the node representing the web page does not have a parent node, the world transform (from a general or default space to the local prism in which the web page is rendered) may be assigned to be the local transform. In some embodiments where the node includes or corresponds to multiple elements described above (e.g., multiple transforms), a local transform may be determined by applying these multiple elements successively.

For example, if the node of the web page is subject to a translation transform, a scaling transform, and a rotation transform, the local transform may be determined to be the following symbolic representation: local transform=translation*rotation matrix*scaling. This local transform, when applied to the web page, scales the web page according to the scaling factor(s) (e.g., non-uniform scaling among three axes may be supported), rotates the scaled web page according to the rotation matrix, and then moves the scaled, rotated web page according to the translation matrix.

In some embodiments, OpGL Mathematics (GLM) may be used to accomplish the transforms for the web page, although other mathematics libraries may also be used to accomplish the same. The following pseudo code demonstrates the use of GLM to accomplish the transform of a web page.

```
TransformNode::getCurrentVolumeTransform( );
TransformNode::setVolumeTransform(const glm::vec3* aPos, const glm::quat*
    aRot, const glm::vec3* aScale, PropagateMode aPropagate);
```

With the set of transforms for the web page determined at 208M, the orientation data for the web page (or its panel) may be determined at 210M by applying the set of transforms to the web page. With the orientation data, the browser engine may calculate the graphical coordinates of the contents to be rendered and invoke a renderer (e.g., RenderWidget or other renderer) to render the contents. The rendered contents may then be displayed in the prism at 212M based in whole or in part upon the orientation data.

Figure 2N:
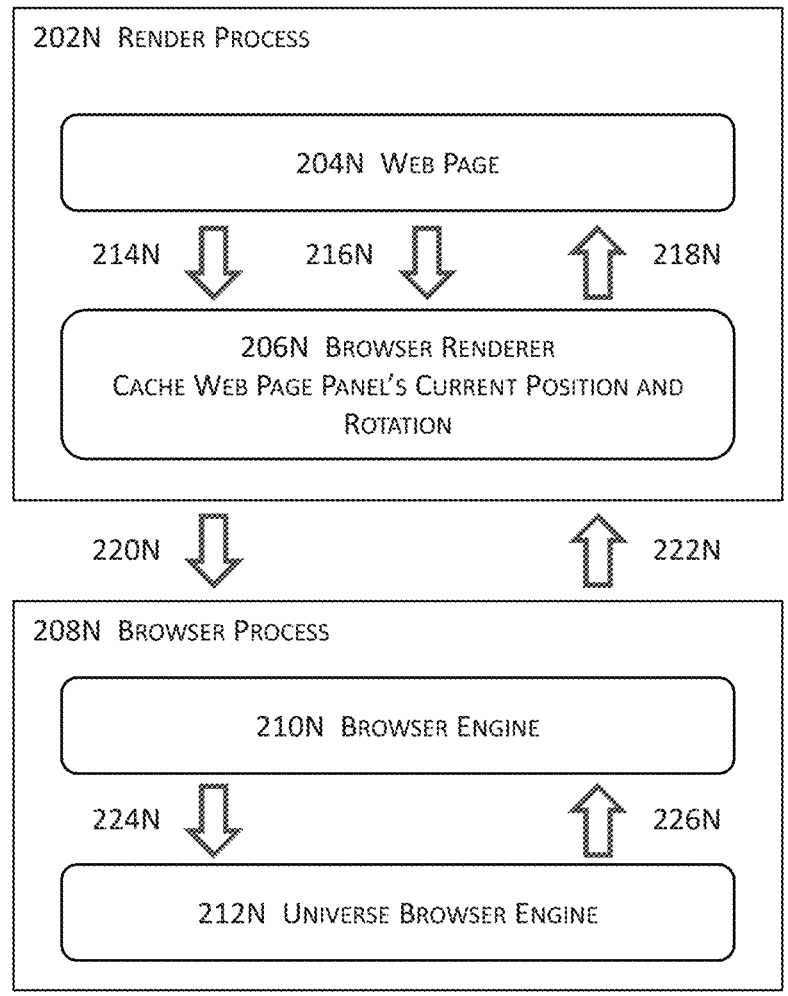
FIG. 2N illustrates a simplified high-level architecture architectural diagram of an example render process and an example browser process in some embodiments.

FIG. 2N illustrates a simplified high-level architecture architectural diagram of an example render process and an example browser process in some embodiments. In these embodiments, the render process 202N includes an instance of a web page 204N and an instance of a web browser renderer 206N. A web browser renderer may cache a web page panel's current position and/or rotation data in, for example, cache memory in some embodiments. The web browser renderer 206N may return the current position and/or rotation data to the web page 204N at 218N. The web page may also get the position and/or rotation data from the web browser renderer 206N at 216N. Moreover, the web page may also set the position and/or rotation data for the web browser renderer 206N at 214N.

The web browser renderer 206N may be operatively coupled to a browser 210M and send communications (e.g., one or more inter-process communication or IPC messages) to the web browser 210M to set the position and/or rotation. For example, a web browser renderer 206N may send FrameHostMsg_SetVirtualPosition to the browser engine 210N to set the web page panel's 3D position and/or may send FrameHostMsg_SetVirtualRotation to the browser engine 210N to set the web page panel's 3D rotation at 220N. Furthermore, the browser engine 210N may also send communications (e.g., one or more inter-process communication or IPC messages) to the web browser renderer 206N to update the position and/or rotation data of the web page panel. For example, a browser engine 210NN may send ViewMsg_UpdateCachedVirtualPosition to the web browser renderer 206N to update the cached web page panel's 3D position and/or may send ViewMsg_Update- CachedVirtualRotation to the browser renderer 206N to update the cached web page panel's 3D rotation at 222N.

The browser engine 210N may also be operatively coupled to a universe browser engine 212N to set the position and/or rotation data for a web page panel at 224N. The universe browser engine 212N may also initialize or update a web page panel's position and/or rotation data and communicate the web page panel's position and/or rotation data to the browser engine 210N at 226N. For example, a user may change the position and/or rotation of a web page panel. In response to the user's manipulation of the web page panel's position and/or rotation, the universe browser engine 212N may send the web page panel's position and/or rotation data to the browser engine 210N at 226N. As another example, a universe browser engine 212N may initialize a web page panel with certain position and rotation data and communication this position and rotation data to the browser engine 210N at 226N.

System Architecture Overview

Figure 3:
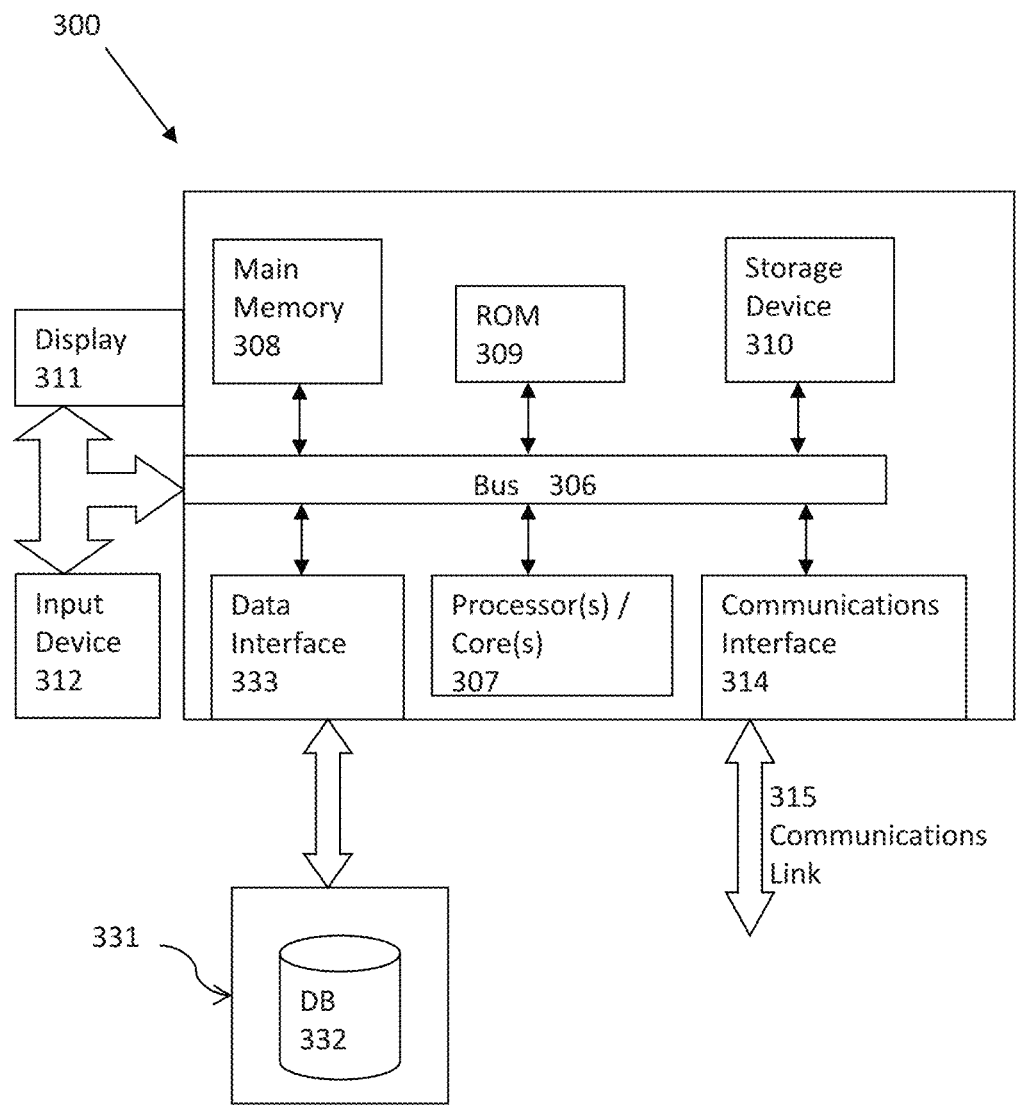
FIG. 3 illustrates a computerized system on which a method for managing and displaying web pages and web resources in a three-dimensional virtual space with a mixed reality system may be implemented.

FIG. 3 illustrates a computerized system on which a method for managing and displaying web pages and web resources in a three-dimensional virtual space with a mixed reality system may be implemented. Computer system 300 includes a bus 306 or other communication module for communicating information, which interconnects subsystems and devices, such as processor 307, system memory 308 (e.g., RAM), static storage device 309 (e.g., ROM), disk drive 310 (e.g., magnetic or optical), communication interface 314 (e.g., modem or Ethernet card), display 311 (e.g., CRT or LCD), input device 312 (e.g., keyboard), and cursor control (not shown). The illustrative computing system 300 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 300 may include or may be a part of a cloud computing platform in some embodiments.

According to one embodiment, computer system 300 performs specific operations by one or more processor or processor cores 307 executing one or more sequences of one or more instructions contained in system memory 308. Such instructions may be read into system memory 308 from another computer readable/usable storage medium, such as static storage device 309 or disk drive 310. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 307, where the one or more processors, one or more processor cores, or combination thereof executes one or more threads. For example, various acts of determination, identification, synchronization, calculation of graphical coordinates, rendering, transforming, translating, rotating, generating software objects, placement, assignments, association, etc. may be performed by one or more processors, one or more processor cores, or combination thereof.

The term "computer readable storage medium" or "computer usable storage medium" as used herein refers to any non-transitory medium that participates in providing instructions to processor 307 for execution. Such a medium may take many forms, including but not limited to, non-volatile media and volatile media. Non-volatile media includes, for example, optical or magnetic disks, such as disk drive 310. Volatile media includes dynamic memory, such as system memory 308. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 300. According to other embodiments, two or more computer systems 300 coupled by communication link 315 (e.g., LAN, PTSN, or wireless network) may perform the sequence of instructions required to practice the invention in coordination with one another.

Computer system 300 may transmit and receive messages, data, and instructions, including program (e.g., application code) through communication link 315 and communication interface 314. Received program code may be executed by processor 307 as it is received, and/or stored in disk drive 310, or other non-volatile storage for later execution. In an embodiment, the computer system 300 operates in conjunction with a data storage system 331, e.g., a data storage system 331 that includes a database 332 that is readily accessible by the computer system 300. The computer system 300 communicates with the data storage system 331 through a data interface 333. A data interface 333, which is coupled to the bus 306 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 333 may be performed by the communication interface 314.

Some embodiments are directed to a non-transitory computer readable medium having stored thereon a sequence of instructions which, when stored in memory and executed by a processor causes the processor to perform a set of acts, the set of acts comprising receiving, at a browser engine, an input for three-dimensional (3D) transform for a web page or a web page panel therefor; in response to the input, determining, by at least a browser engine coupled to a micro-processor of an extended reality system, 3D transform data for the web page based at least in part upon the 3D transform of the web page or the web page panel therefor, wherein the 3D transform comprises a change in 3D position, rotation, or scale of the web page or the web page panel therefor; and presenting, by at least a universe browser engine coupled to the browser engine of the extended reality system, contents of the web page in a virtual 3D space based at least in part upon the 3D transform data.

In some of these embodiments, the set of acts further comprises identifying, at the browser engine, a web page to be displayed in the virtual 3D space, wherein the virtual 3D space has a virtual three-dimensional volume; storing, by the browser engine, the 3D transform data in a non-transitory computer readable medium that is accessible by the browser engine; and transmitting the 3D transform data from the browser engine to the universe browser engine.

In some of the immediately preceding embodiments, the set of acts further comprises transmitting the 3D transform data from the browser engine to the universe browser engine; receiving, at the universe browser engine, the change in the 3D position, rotation, or scale of the web page or the web page panel therefor; updating, by the universe browser engine, the 3D transform data into updated 3D transform data; and synchronizing the 3D transform data, which is accessible to the browser engine, with the updated 3D transform data.

In addition or in the alternative, the set of acts further comprises at least one of receiving, from the web page or a website hosting the web page, the input for the 3D transform for the web page, wherein a boundary of the web page is constrained by a web browser application instance that is configurable to be displayed or suppressed in the virtual 3D space; receiving, from a user, the input for 3D transform for the web page, wherein the boundary of the web page is constrained by the web browser that is configurable to be displayed or suppressed in the virtual 3D space; or identifying, from code of the web page, the input for 3D transform for the web page, wherein a developer of the web page constrains the 3D position, rotation, or scale of the web page to be displayed by the browser engine.

In some embodiments, the set of acts further comprises identifying a transform tree structure and a node in the transform tree structure for the web page or the web page panel therefor; determining whether the node has a parent node in the transform tree structure; receiving, from the browser engine, the 3D position, rotation, or scale data for the web page or the web page panel; and receiving a 3D position, rotation, or scale input for the web page or the web page panel from the universe browser engine.

In addition or in the alternative, the set of acts further comprises receiving, at the browser engine, data pertaining to the 3D position, rotation, or scale of the web page or the web page panel from a website; and transmitting, from the browser engine to the universe browser engine, the data or the 3D transform data pertaining to the 3D position, rotation, or scale of the web page or the web page panel.

In some of the immediately preceding embodiments, the set of acts further comprises determining, at the universe browser engine, an existing prism or generating a new prism in the virtual 3D space; modifying, at the universe browser engine, the data or the 3D transform data into updated 3D transform data; and synchronizing the 3D transform data determined by the browser engine with the updated 3D transform data.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. An extended reality system, comprising:
a display device configured for displaying three-dimensional virtual content within a physical environment, thereby presenting a mixed reality landscape to a user; and
at least one processor configured for receiving a web page or web page panel containing additional three-dimensional virtual content from a web site, generating and anchoring a first bounded prism at a first location within the mixed reality landscape, and rendering the additional three-dimensional virtual content of the web page or web page panel within the anchored first bounded prism for display by the display device to the user.

2. The extended reality system of claim 1, wherein the at least one processor is configured for selecting the first location within the mixed reality landscape, such that the additional three-dimensional virtual content of the web page or web page panel does not interpenetrate the mixed reality landscape.

3. The extended reality system of claim 1, wherein the at least one processor is further configured for translating, rotating, scaling, or transforming the first bounded prism within the mixed reality landscape in response to input from the user.

4. The extending reality system of claim 1, wherein the first bounded prism comprises one or more handles, and wherein the input from the user comprises interacting with the one or more handles.

5. The extended reality system of claim 1, wherein the additional three-dimensional virtual content of the web page or web page panel comprises a parent virtual object and a plurality of children virtual objects, wherein the first bounded prism is a bounded parent prism, and wherein the at least one processor is further configured for generating a plurality of bounded children prisms, anchoring the parent bounded prism at the first location within the mixed reality landscape, rendering the parent virtual object within the bounded parent prism for display by the display device to the user, and rendering the children virtual objects respectively within the bounded children prisms for display by the display device to the user.

6. The extended reality system of claim 5, wherein the at least one processor is further configured for translating, rotating, scaling, or transforming each of the plurality of children virtual objects relative to the parent virtual object in response to input from the user.

7. The extended reality system of claim 5, wherein the at least one processor is further configured for translating, rotating, scaling, or transforming the parent virtual object and the plurality of children virtual objects together in response to input from the user.

8. The extended reality system of claim 1, wherein the at least one processor comprises a universe browser engine configured for generating and anchoring the first bounded prism at the first location within the mixed reality landscape, and an application configured for rendering the additional three-dimensional virtual content of the web page or web page panel within the anchored first bounded prism for display by the display device to the user.

9. The extended reality system of claim 8, wherein the universe browser engine is configured generating and anchoring the first bounded prism at the first location within the mixed reality landscape in response to receiving a request from the application.

10. The extended reality system of claim 1, wherein the at least one processor is further configured for receiving a three-dimensional (3D) transform for the web page or web page panel, determining 3D transform data for the web page or the web page panel therefor based at least in part upon the 3D transform, and determining a 3D boundary for the first bounded prism based at least in part upon the 3D transform data.

11. The extended reality system of claim 10, wherein the at least one processor is further configured for determining a 3D position, rotation, or scale for the web page or web page panel based at least in part upon the 3D transform, and rendering the first three-dimensional virtual content of the web page or web page panel within the anchored first bounded prism with the 3D position, rotation, or scale for the web page or web page panel.

12. The extended reality system of claim 11, wherein the at least one processor is further configured for modifying the 3D transform data into updated 3D transform data in response to a user moving and/or rotating the web page or web page panel, and transmitting the updated 3D transform data to the web site.

13. A computer implemented method, comprising:
displaying three-dimensional virtual content within a physical environment, thereby presenting a mixed reality landscape to a user;
receiving a web page or web page panel containing additional three-dimensional virtual content from a web site;
generating and anchoring a first bounded prism at a first location within the mixed reality landscape; and
rendering the additional three-dimensional virtual content of the web page or web page panel within the anchored first bounded prism for display to the user.

14. The computer implemented method of claim 13, further comprising:
receiving a three-dimensional (3D) transform for the web page or web page panel;
determining 3D transform data for the web page or the web page panel therefor based at least in part upon the 3D transform; and
determining a 3D boundary for the first bounded prism based at least in part upon the 3D transform data.

15. The computer implemented method of claim 14, further comprising:
determining a 3D position, rotation, or scale for the web page or web page panel based at least in part upon the 3D transform; and
rendering the first three-dimensional virtual content of the web page or web page panel within the anchored first bounded prism with the 3D position, rotation, or scale for the web page or web page panel.

16. The computer implemented method of claim 15, further comprising:
modifying the 3D transform data into updated 3D transform data in response to a user moving and/or rotating the web page or web page panel; and
transmitting the updated 3D transform data to the web site.

17. A computer program product embodied on a non-transitory computer readable medium, the computer readable medium having stored thereon a sequence of instructions which, when executed by a processor causes the processor to execute a method comprising:
displaying three-dimensional virtual content within a physical environment, thereby presenting a mixed reality landscape to a user;
receiving a web page or web page panel containing additional three-dimensional virtual content from a web site;
generating and anchoring a first bounded prism at a first location within the mixed reality landscape; and
rendering the additional three-dimensional virtual content of the web page or web page panel within the anchored first bounded prism for display to the user.

18. The computer program product of claim 17, wherein the method further comprises:
receiving a three-dimensional (3D) transform for the web page or web page panel;
determining 3D transform data for the web page or the web page panel therefor based at least in part upon the 3D transform; and
determining a 3D boundary for the first bounded prism based at least in part upon the 3D transform data.

19. The computer program product of claim 18, wherein the method further comprises:
determining a 3D position, rotation, or scale for the web page or web page panel based at least in part upon the 3D transform; and
rendering the first three-dimensional virtual content of the web page or web page panel within the anchored first bounded prism with the 3D position, rotation, or scale for the web page or web page panel.

20. The computer program product of claim 19, wherein the method further comprises:
modifying the 3D transform data into updated 3D transform data in response to a user moving and/or rotating the web page or web page panel; and
transmitting the updated 3D transform data to the web site.

* * * * *